United States Patent
Suwa et al.

(10) Patent No.: US 10,451,239 B2
(45) Date of Patent: Oct. 22, 2019

(54) HEADLIGHT MODULE AND HEADLIGHT DEVICE

(71) Applicant: Mitsubishi Electric Corporation, Tokyo (JP)

(72) Inventors: Masashige Suwa, Tokyo (JP); Ritsuya Oshima, Tokyo (JP); Kuniko Kojima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 319 days.

(21) Appl. No.: 15/315,327

(22) PCT Filed: Nov. 14, 2014

(86) PCT No.: PCT/JP2014/080214
§ 371 (c)(1),
(2) Date: Nov. 30, 2016

(87) PCT Pub. No.: WO2016/006138
PCT Pub. Date: Jan. 14, 2016

(65) Prior Publication Data
US 2017/0198877 A1    Jul. 13, 2017

(30) Foreign Application Priority Data

Jul. 8, 2014  (JP) ................................. 2014-140113
Oct. 23, 2014 (JP) ................................. 2014-216347

(51) Int. Cl.
*F21S 41/27*  (2018.01)
*F21S 41/32*  (2018.01)
(Continued)

(52) U.S. Cl.
CPC ................ *F21S 41/27* (2018.01); *B60Q 1/04* (2013.01); *B60Q 1/076* (2013.01); *B60Q 1/12* (2013.01);
(Continued)

(58) Field of Classification Search
CPC ...... F21S 41/635; F21S 41/663; F21S 41/147; F21S 41/27; F21S 41/322; F21S 41/36;
(Continued)

(56) References Cited

U.S. PATENT DOCUMENTS 6,983,306 B1   1/2006 Sameshima et al.
7,261,449 B2 * 8/2007 Albou ..................... B60Q 1/26
                                                        359/364
(Continued)

FOREIGN PATENT DOCUMENTS

EP        1 666 787 A1   6/2006
JP      2001-145174 A    5/2001
(Continued)

*Primary Examiner* — Anh T Mai
*Assistant Examiner* — Nathaniel J Lee
(74) *Attorney, Agent, or Firm* — Birch, Stewart, Kolasch & Birch, LLP

(57) ABSTRACT

A headlight module includes: a light source for emitting light; a condensing optical element for concentrating the light; and an optical element including an incident surface for receiving the concentrated light, a reflecting surface for reflecting the received light, and an emitting surface for emitting the reflected light. The condensing optical element changes a divergence angle of the light to form a light distribution pattern. The reflected light and light that enters the optical element and is not reflected by the reflecting surface are superposed on a plane including a point located at a focal position of the emitting surface in a direction of an optical axis of the emitting surface and being perpendicular to the optical axis, thereby forming a high luminous intensity region in the light distribution pattern on the plane. The emitting surface has positive refractive power and projects the light distribution pattern formed on the plane.

20 Claims, 27 Drawing Sheets

(51) Int. Cl.
*F21S 41/63* (2018.01)
*F21S 41/147* (2018.01)
*F21S 41/43* (2018.01)
*F21S 41/36* (2018.01)
*B60Q 1/076* (2006.01)
*B60Q 1/12* (2006.01)
*B60Q 1/04* (2006.01)
*B62J 6/02* (2006.01)
*F21S 41/663* (2018.01)
*F21S 41/365* (2018.01)
*F21W 102/18* (2018.01)

(52) U.S. Cl.
CPC .............. *B62J 6/02* (2013.01); *F21S 41/147* (2018.01); *F21S 41/32* (2018.01); *F21S 41/322* (2018.01); *F21S 41/36* (2018.01); *F21S 41/43* (2018.01); *F21S 41/635* (2018.01); *F21S 41/663* (2018.01); *B60Q 2300/122* (2013.01); *B60Q 2300/134* (2013.01); *B60Q 2300/41* (2013.01); *B60Q 2300/42* (2013.01); *B60Q 2300/45* (2013.01); *F21S 41/365* (2018.01); *F21W 2102/18* (2018.01)

(58) Field of Classification Search
CPC .. F21S 41/43; F21S 41/32; B60Q 1/04; B60Q 1/12; B60Q 1/076; B62J 6/02
See application file for complete search history.

(56) References Cited

U.S. PATENT DOCUMENTS

| | | | |
|---|---|---|---|
| 9,945,528 B2* | 4/2018 | Suwa | F21S 41/143 |
| 2004/0156209 A1 | 8/2004 | Ishida | |
| 2007/0124424 A1 | 5/2007 | Matsuda | |
| 2009/0257240 A1 | 10/2009 | Koike | |
| 2013/0272011 A1 | 10/2013 | Fedosik et al. | |
| 2014/0362596 A1* | 12/2014 | Nakaya | G02B 19/0028 362/511 |

FOREIGN PATENT DOCUMENTS

| | | |
|---|---|---|
| JP | 2004-241349 A | 8/2004 |
| JP | 2006-164980 A | 6/2006 |
| JP | 2007-110388 A | 4/2007 |
| JP | 2009-199938 A | 9/2009 |
| JP | 2010-74651 A | 4/2010 |
| JP | 2010-93393 A | 4/2010 |
| JP | 2010-108639 A | 5/2010 |
| JP | 2010-170836 A | 8/2010 |
| JP | 2012-119277 A | 6/2012 |
| JP | 2012-190572 A | 10/2012 |
| JP | 2013-109871 A | 6/2013 |
| JP | 2013-544426 A | 12/2013 |

* cited by examiner

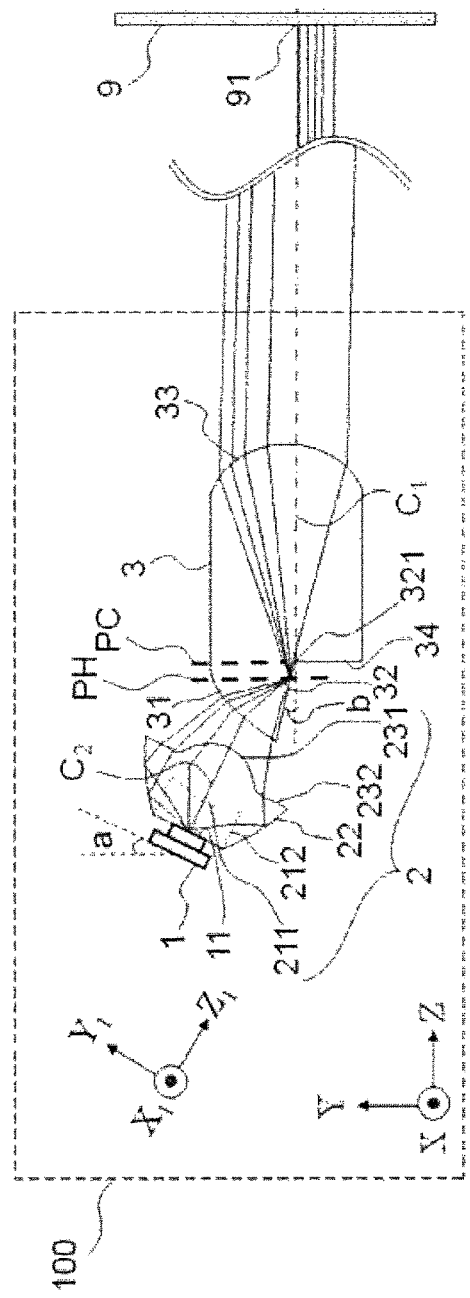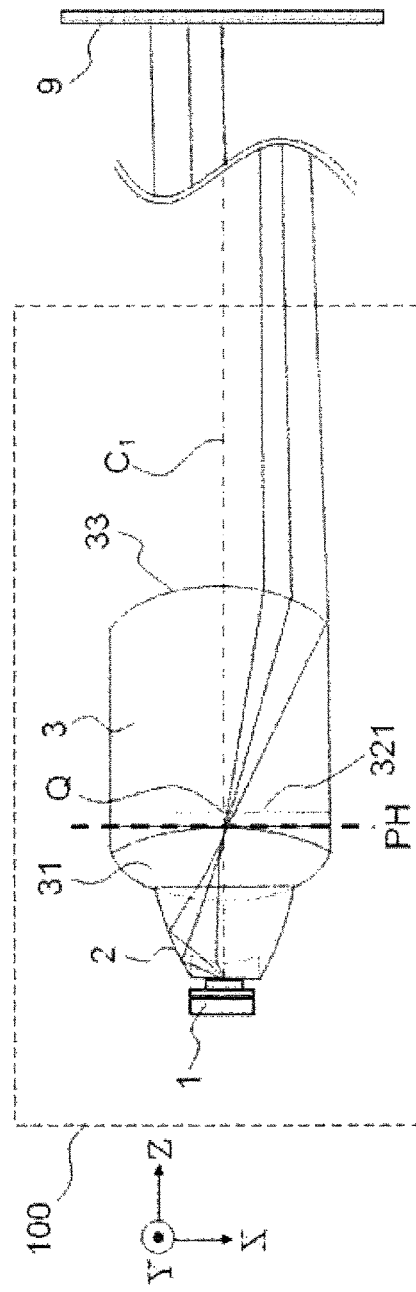

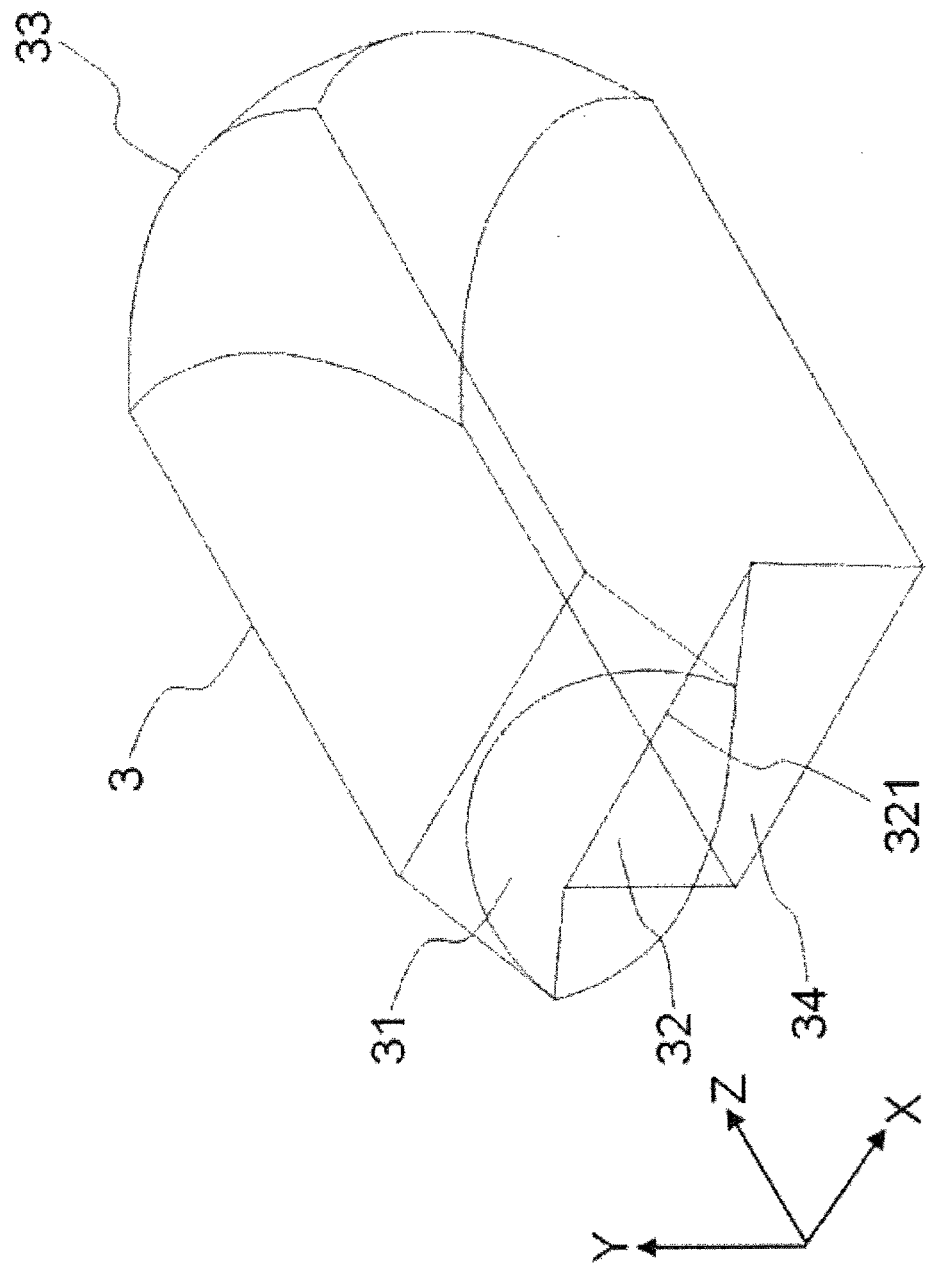

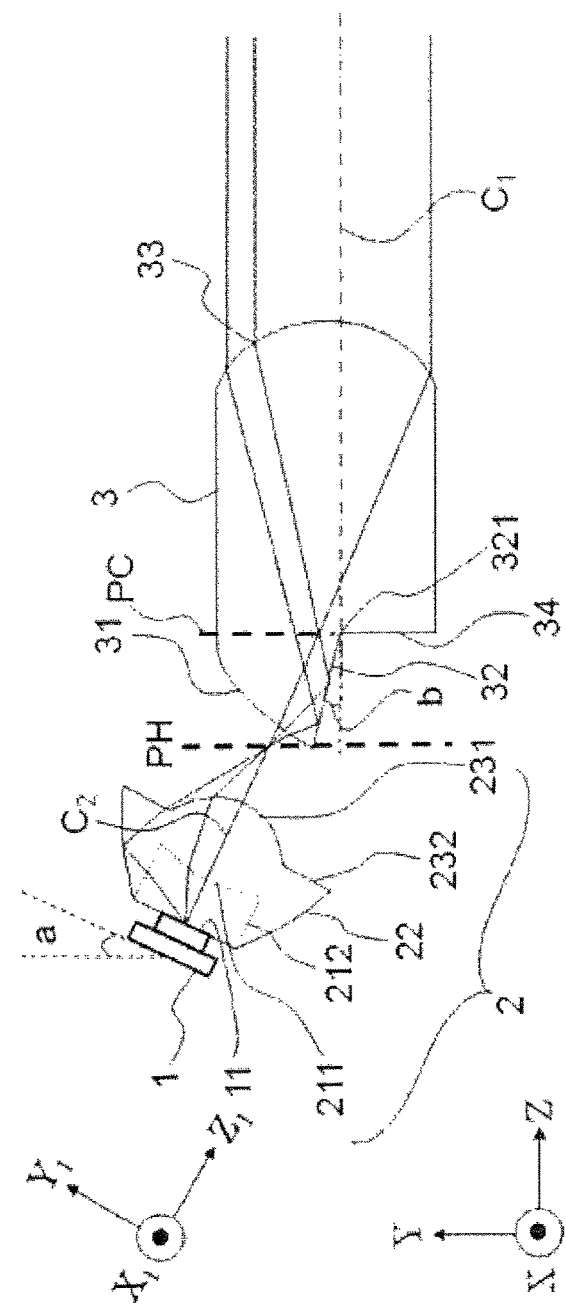
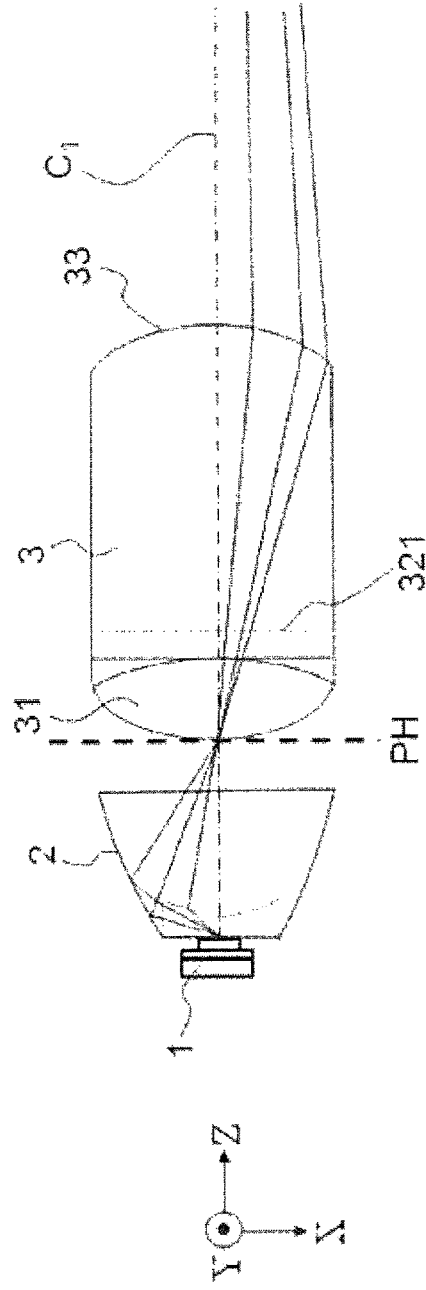
FIG. 3A
FIG. 3B

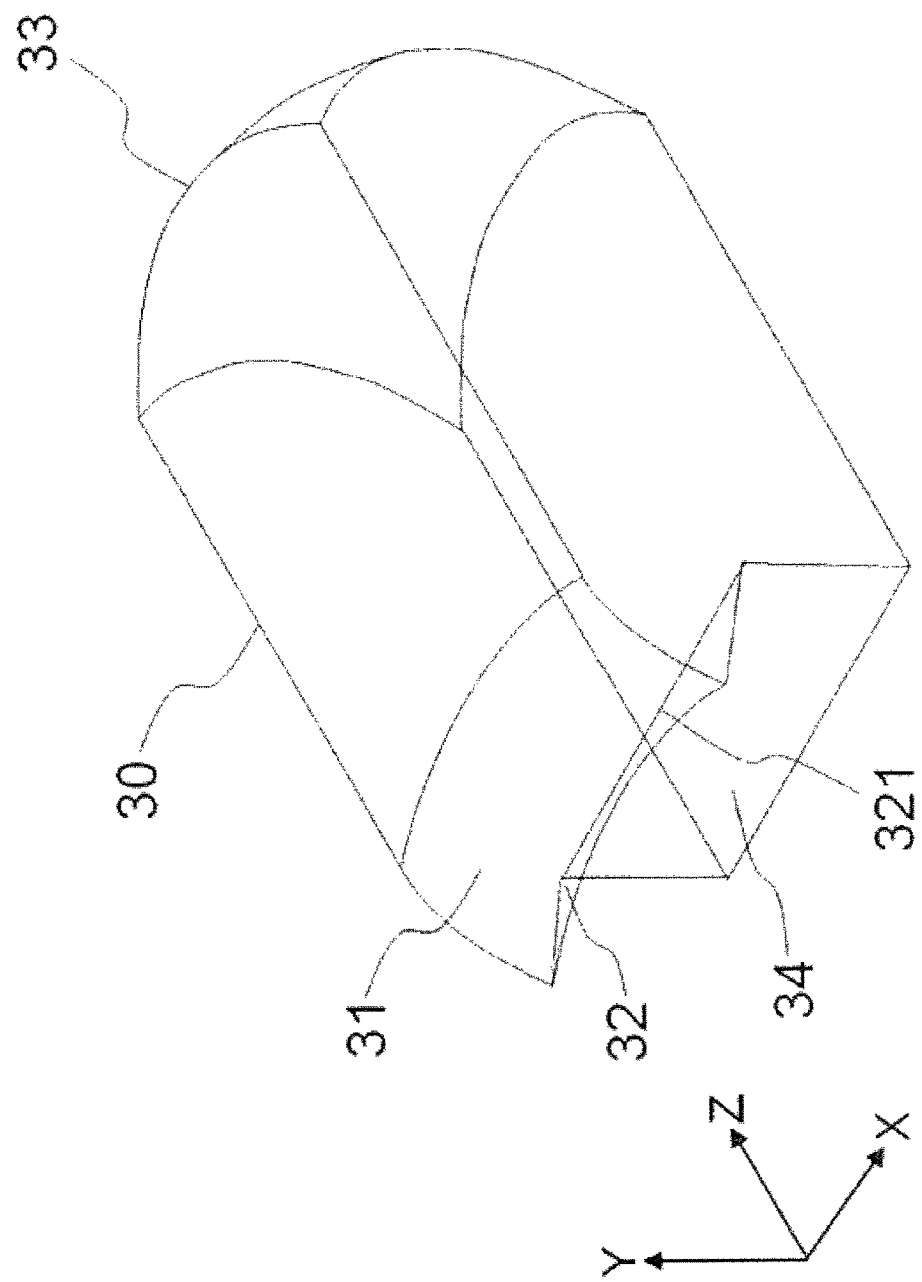

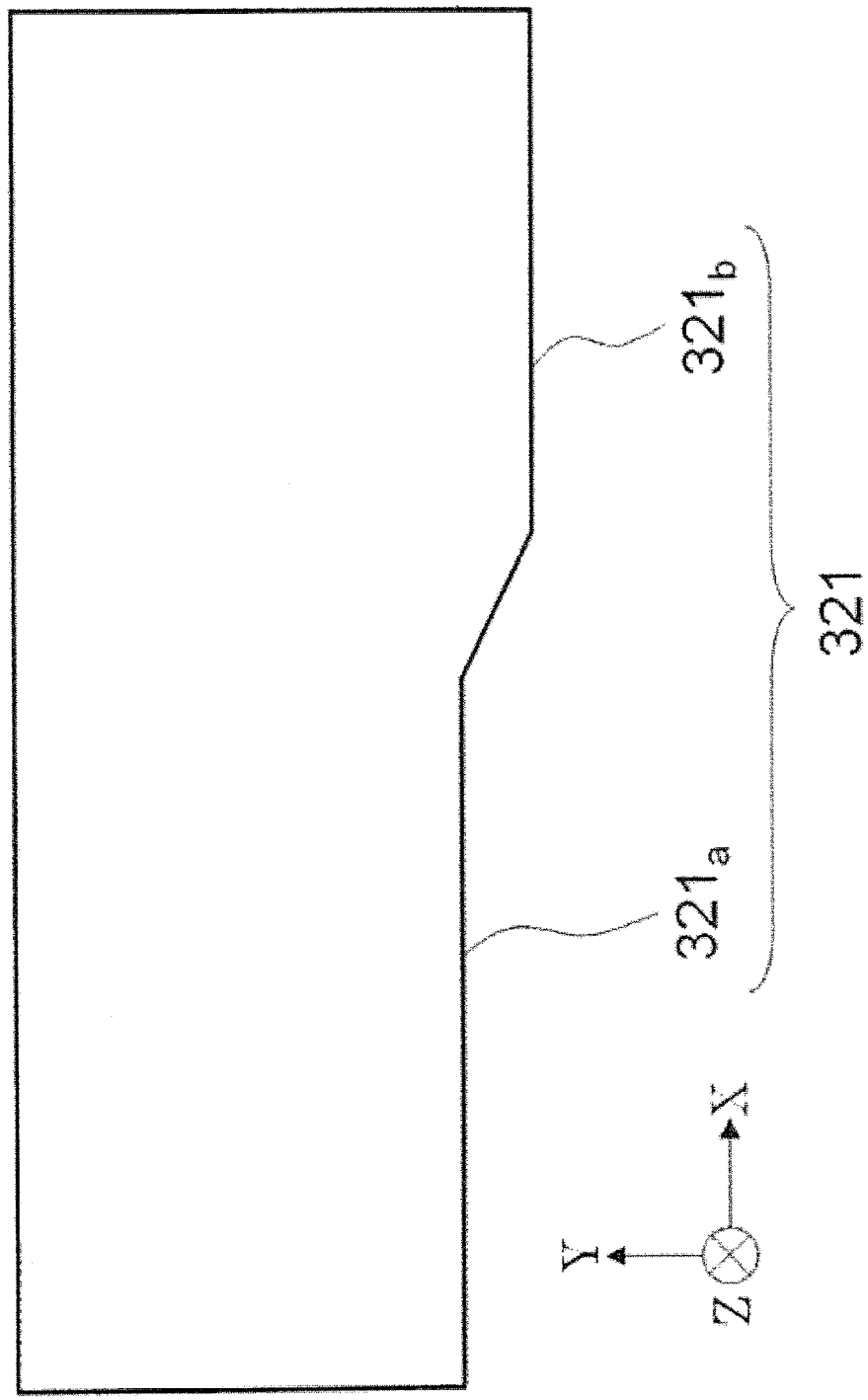

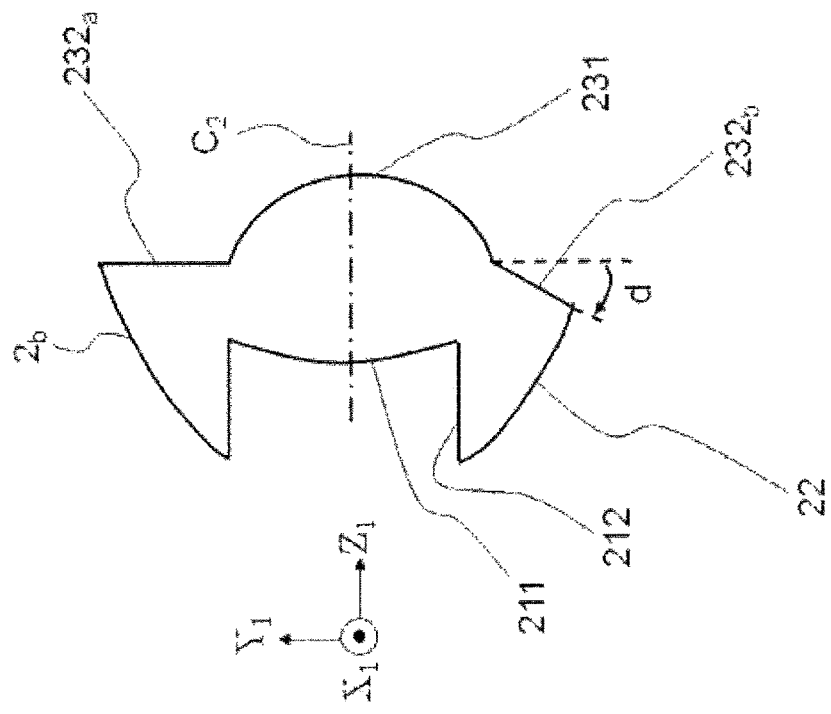
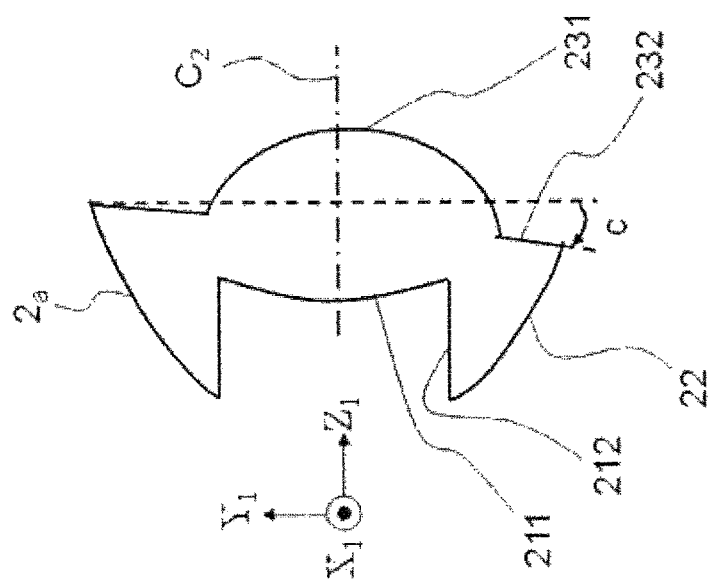

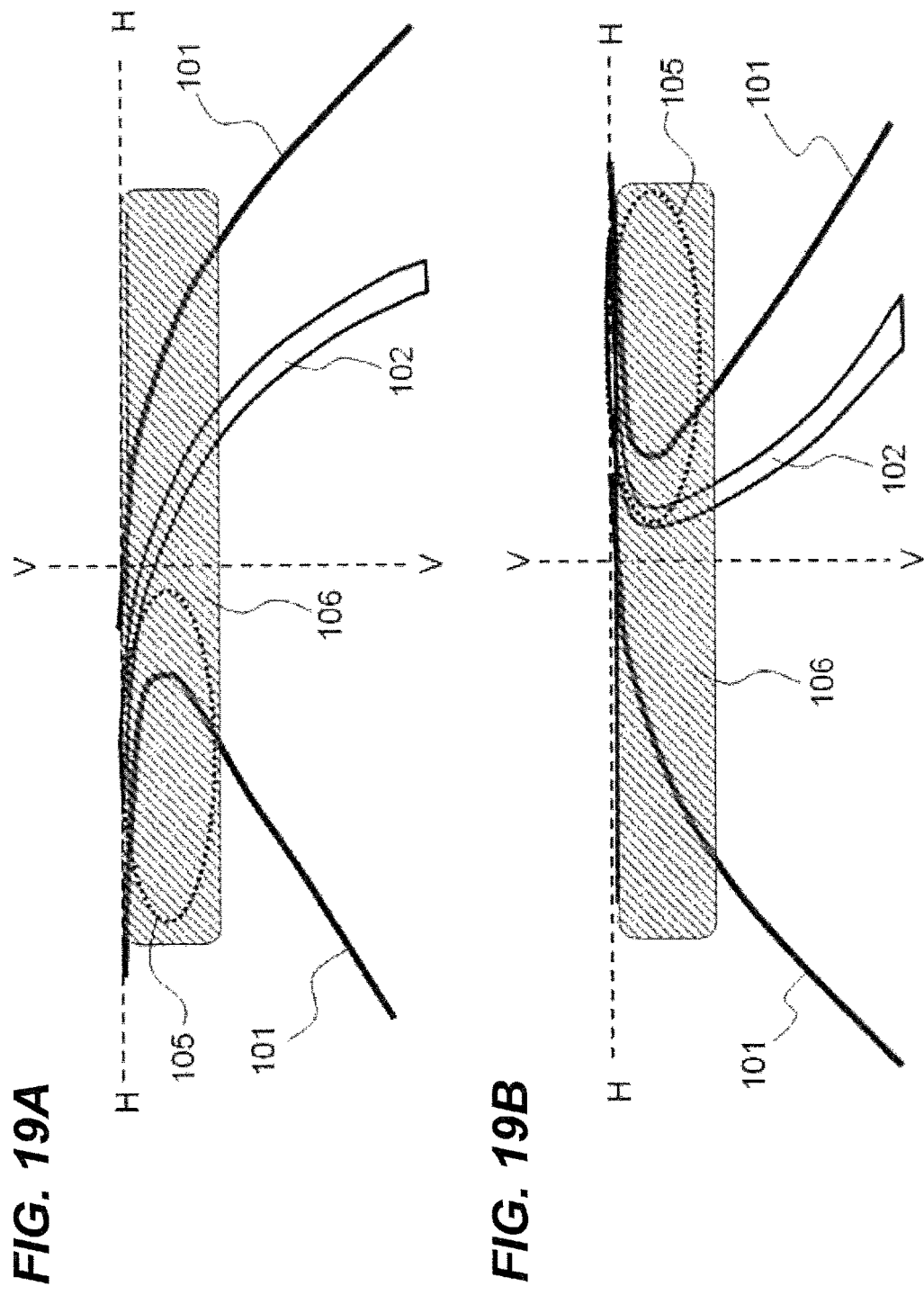

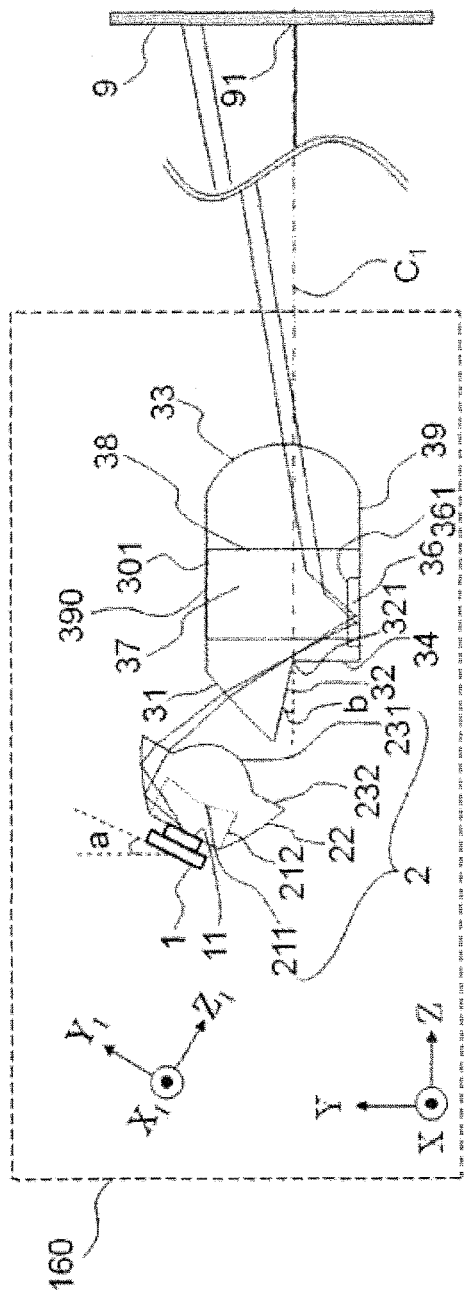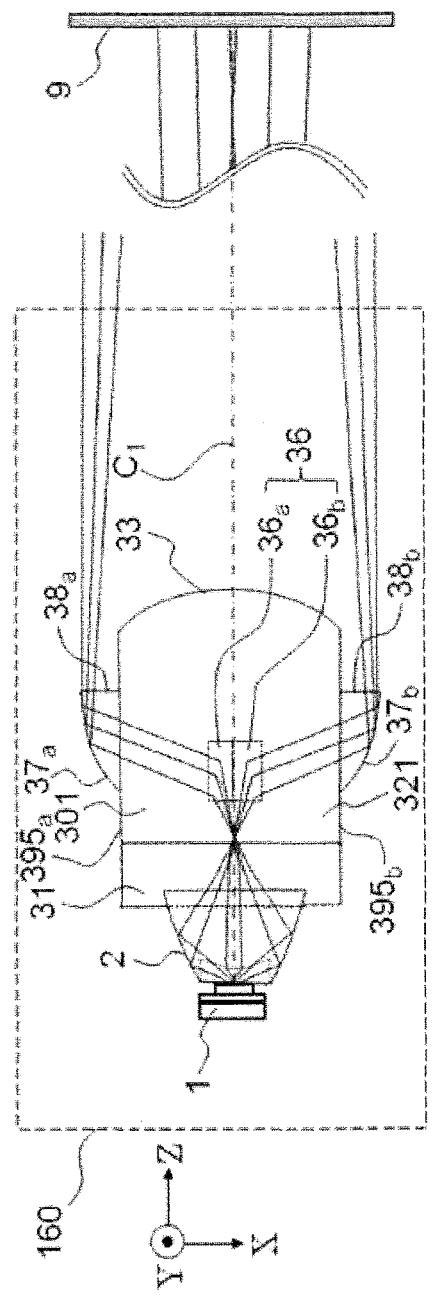

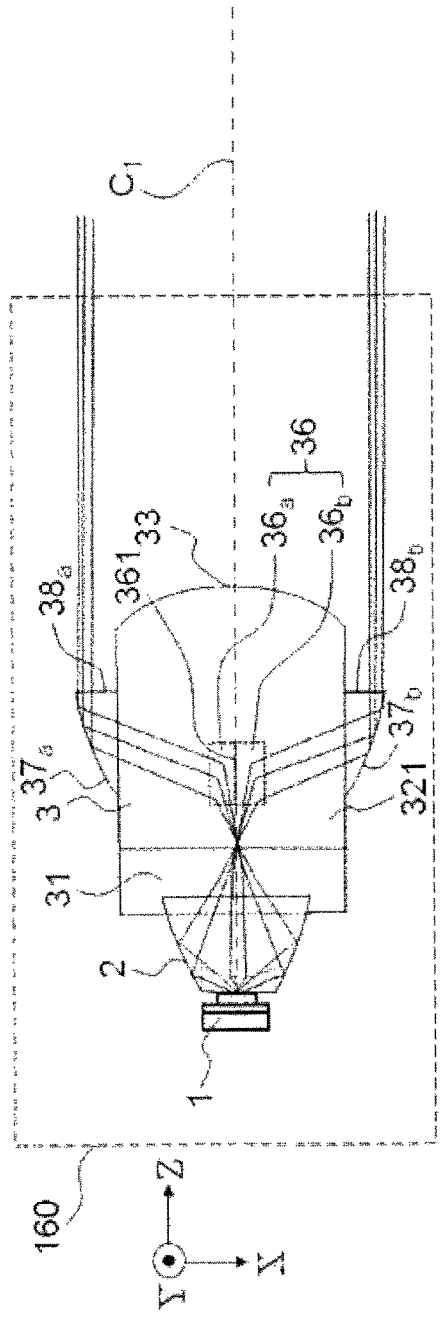
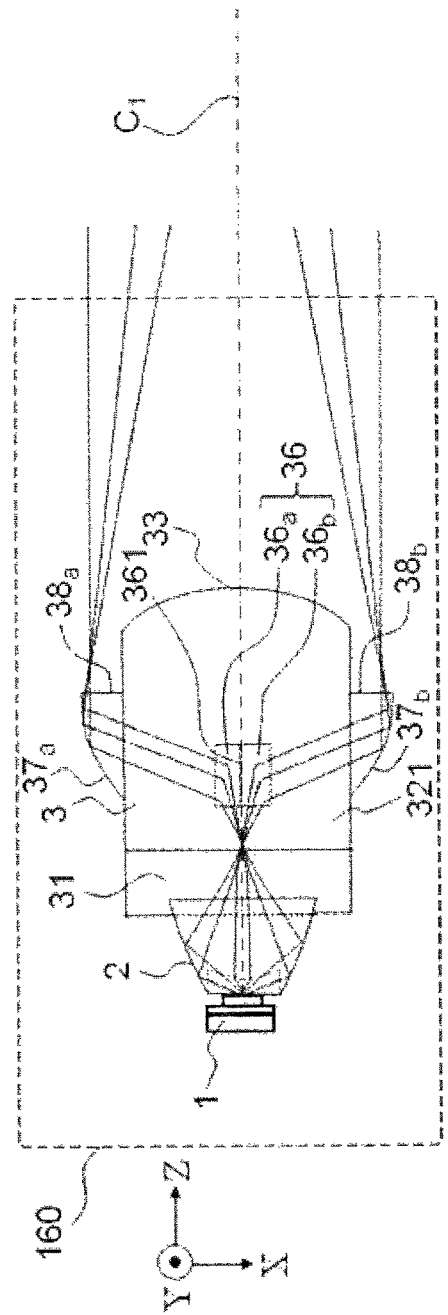

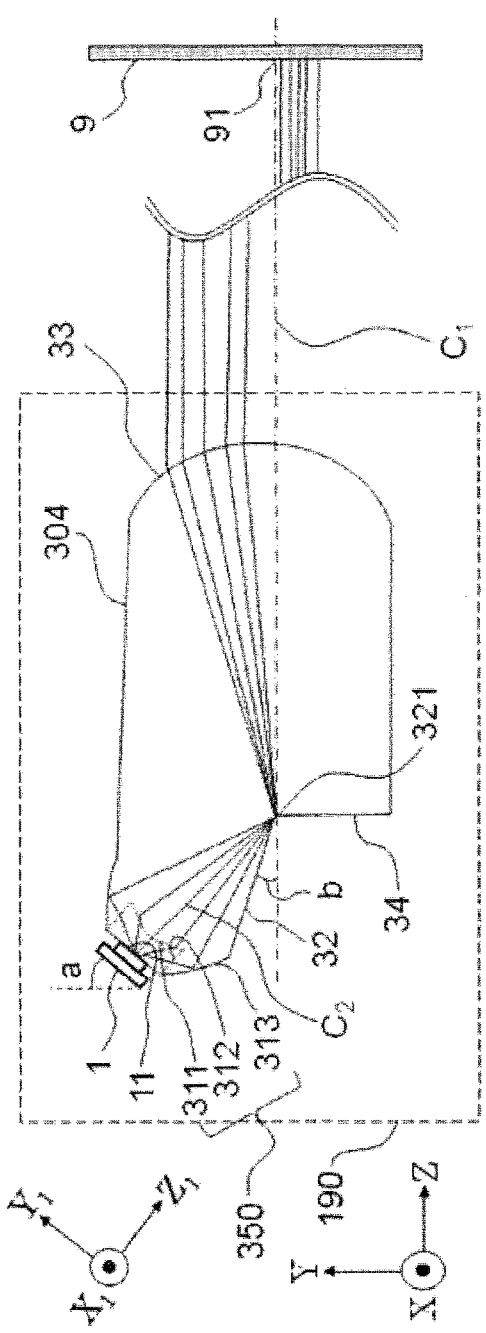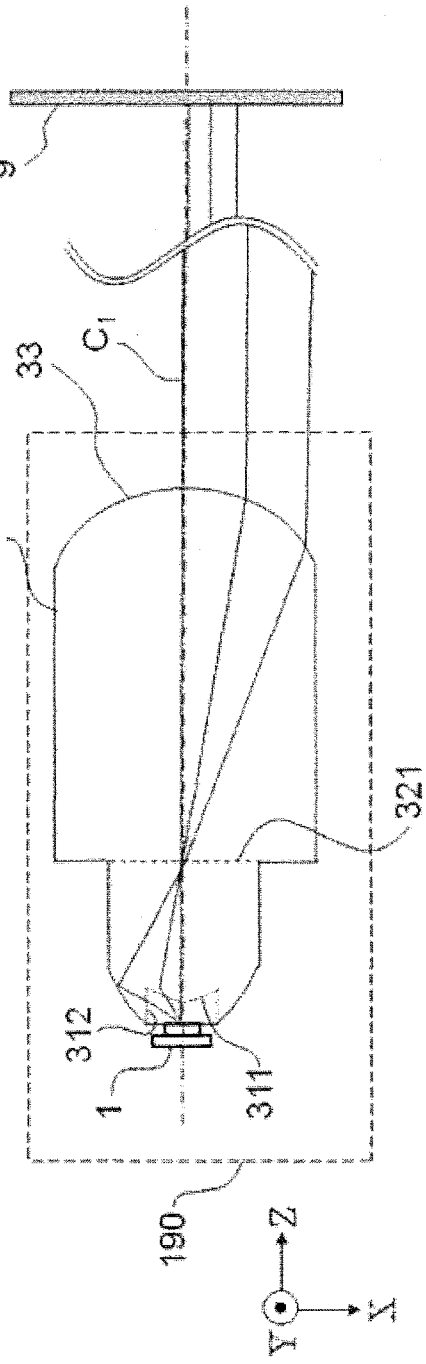

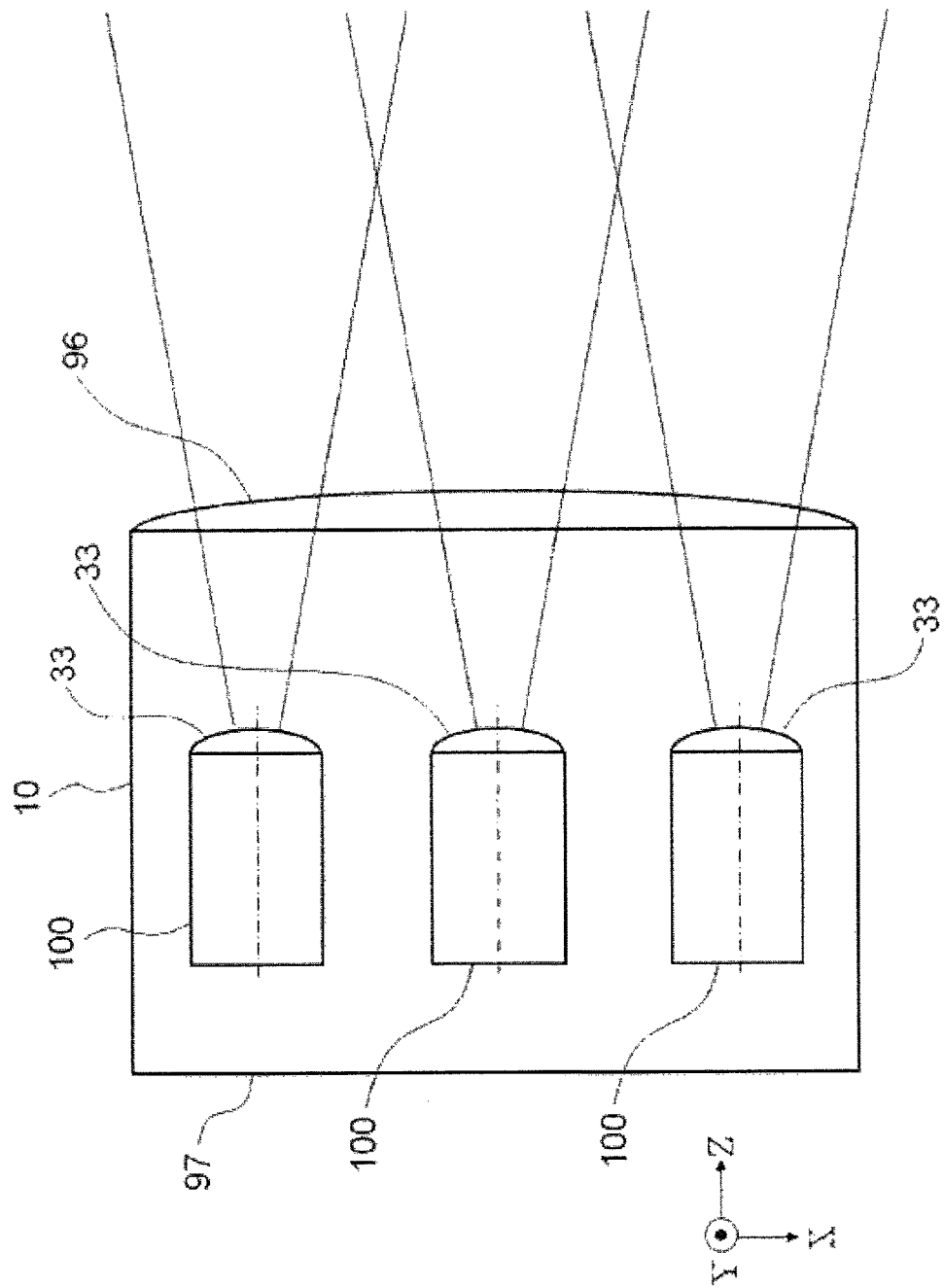

HEADLIGHT MODULE AND HEADLIGHT DEVICE

TECHNICAL FIELD

The present invention relates to a headlight module and a headlight device for irradiating an area in front of a vehicle body.

BACKGROUND ART

Headlight devices need to have a predetermined light distribution pattern specified by road traffic rules or the like. "Light distribution" refers to a luminous intensity distribution of a light source with respect to space. That is, it refers to a spatial distribution of light emitted from a light source. Further, "luminous intensity" indicates the degree of intensity of light emitted by a luminous body and is obtained by dividing the luminous flux passing through a small solid angle in a given direction by the small solid angle.

As one of the road traffic rules, for example, a predetermined light distribution pattern for an automobile low beam has a horizontally long-shape narrow in an up-down direction. To prevent an oncoming vehicle from being dazzled, a boundary (cutoff line) of light on the upper side of the light distribution pattern is required to be sharp. That is, a sharp cutoff line with a dark area above the cutoff line (outide the light distribution pattern) and a bright area below the cutoff line (inside the light distribution pattern) is required.

"Cutoff line" here refers to a light/dark borderline formed when a wall or screen is irradiated with light from a headlight, and a borderline on the upper side of the light distribution pattern. That is, it refers to a light/dark borderline on the upper side of the light distribution pattern. It refers to a borderline on the upper side of the light distribution pattern and between a bright area (inside of the light distribution pattern) and a dark area (outside of the light distribution pattern). Cutoff line is a term used when an irradiating direction of a headlight for passing each other is adjusted. The headlight for passing each other is also referred to as a low beam.

The illuminance is required to be highest at a region on the lower side of the cutoff line (inside the light distribution pattern). The region of highest illuminance is referred to as the "high illuminance region." Here, "region on the lower side of the cutoff line" refers to an upper part of the light distribution pattern, and corresponds to a part for irradiating a distant area, in a headlight device. To achieve such a sharp cutoff line, large chromatic aberration, blur, or the like must not occur on the cutoff line. "Blur occurs on the cutoff line" indicates that the cutoff line is unclear.

To provide such a complicated light distribution pattern, an optical system configuration using a combination of a reflector, a light blocking plate, and a projection lens is commonly used (e.g., Patent Literature 1). The light blocking plate is disposed at a focal position of the projection lens.

In the headlight disclosed in Patent Literature 1, a semiconductor light source is disposed at a first focal point of the reflector with an ellipsoid of revolution. Light emitted from the semiconductor light source is concentrated at a second focal point. The headlight disclosed in Patent Literature 1 blocks part of the light by the shade (light blocking plate) and then emits parallel light through the projection lens.

CITATION LIST

Patent Literature

Patent Literature 1: Japanese Patent Application Publication No. 2009-199938

SUMMARY OF INVENTION

Technical Problem

However, to form a light distribution pattern complying with road traffic rules or the like, the light blocking plate needs to be disposed with high accuracy relative to the focal position of the projection lens. In the optical system configuration of Patent Literature 1, to form a cutoff line, high accuracy of placement of the light blocking plate relative to the projection lens is required. Downsizing the optical system typically increases the placement accuracy required for the reflector, light blocking plate, and projection lens. These reduce manufacturability of the headlight device. Downsizing the headlight device further reduces the manufacturability.

In the optical system configuration of Patent Literature 1, since the cutoff line is formed by using the light blocking plate, the light use efficiency is low. Part of the light emitted from the light source is blocked by the light blocking plate and is not used as projection light. "Light use efficiency" refers to use efficiency of light.

The present invention is made in view of the problems of the prior art, and is intended to provide a headlight device having improved manufacturability while preventing reduction in the light use efficiency.

Solution to Problem

A headlight module includes: a first light source for emitting first light; and an optical element including a first reflecting surface for reflecting the first light and a first emitting surface for emitting the light reflected by the first reflecting surface, wherein the first emitting surface has positive refractive power, and wherein in a direction of an optical axis of the first emitting surface, an end portion on the first emitting surface side of the first reflecting surface includes a point located at a focal position of the first emitting surface.

Advantageous Effects of Invention

According to the present invention, it is possible to provide a headlight device having improved manufacturability while preventing reduction in the light use efficiency.

BRIEF DESCRIPTION OF DRAWINGS

FIGS. 1A and 1B are configuration diagrams illustrating a configuration of a headlight module 100 according to a first embodiment.

FIG. 2 is a perspective view of a light guide projection optical element 3 of the headlight module 100 according to the first embodiment.

FIGS. 3A and 3B are explanatory diagrams for explaining a light concentration position PH of the headlight module 100 according to the first embodiment.

FIG. 9 is a perspective view of a light guide projection optical element 30 of the headlight module 100 according to the first embodiment.

FIG. 10 is a schematic diagram illustrating a cross-sectional shape in a conjugate plane PC of the light guide projection optical element 3 of the headlight module 100 according to the first embodiment.

FIGS. 11A and 11B are diagrams illustrating shapes of a condensing optical element 2 of the headlight module 100 according to the first embodiment.

FIGS. 19A and 19B are schematic diagrams illustrating cases in which a light distribution pattern is corrected by the headlight module 150 according to the third embodiment.

FIGS. 20A and 20B are configuration diagrams illustrating a configuration of a headlight module 160 according to a fourth embodiment.

FIGS. 23A and 23B are explanatory diagrams for explaining control of divergence angles of reflecting surfaces 37 of the headlight module 160 according to the fourth embodiment.

FIGS. 26A and 26B are configuration diagrams illustrating a configuration of a headlight module 170 according to a fifth embodiment.

FIG. 27 is a configuration diagram illustrating a configuration of a headlight device 10 according to a sixth embodiment.

DESCRIPTION OF EMBODIMENTS

Figures 4A, 4B:
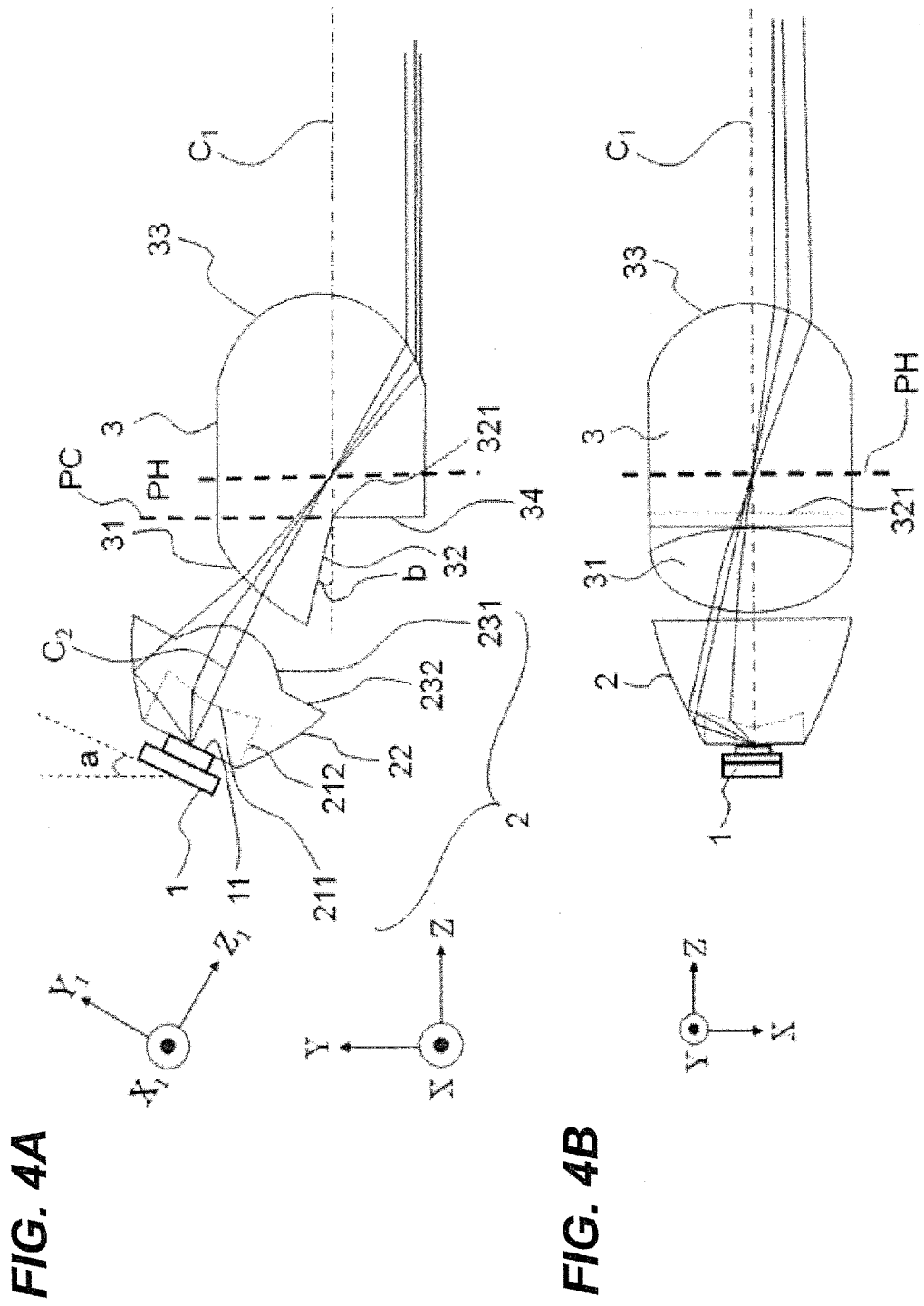
FIGS. 4A and 4B are explanatory diagrams for explaining a light concentration position PH of the headlight module 100 according to the first embodiment.

Examples of embodiments of the present invention will be described below with reference to the drawings. In the following description of the embodiments, to facilitate explanation, xyz-coordinates will be used. It will be assumed that a left-right direction of a vehicle is the X axis direction; the right direction with respect to a forward direction of the vehicle is the +X axis direction; the left direction with respect to the forward direction of the vehicle is the −X axis direction. Here, "forward direction" refers to a traveling direction of the vehicle. That is, "forward direction" refers to a direction in which the headlight radiates light. It will be assumed that an up-down direction of the vehicle is the Y axis direction; the upward direction is the +Y axis direction; the downward direction is the −Y axis direction. The "upward direction" is a direction toward the sky; the "downward direction" is a direction toward the ground (road surface or the like). It will be assumed that the traveling direction of the vehicle is the Z axis direction; the traveling direction is the +Z axis direction; the opposite direction is the −Z axis direction. The +Z axis direction will be referred to as the "forward direction"; the −Z axis direction will be referred to as the "backward direction". That is, the +Z axis, direction is the direction in which the headlight radiates light.

As described above, in the following embodiments, a Z-X plane is a plane parallel to a road surface. This is because the road surface is usually considered to be a "horizontal plane." Thus, a Z-X plane is considered as a "horizontal plane." "Horizontal plane" refers to a plane perpendicular to the direction of gravity. However, the road surface may be inclined with respect to the traveling direction of the vehicle. Specifically, it is an uphill, a downhill, or the like. In these cases, the "horizontal plane" is considered as a plane parallel to the road surface. That is, the "horizontal plane" is not a plane perpendicular to the direction of gravity.

On the other hand, a typical road surface is seldom inclined in the left-right direction with respect to the traveling direction of the vehicle. "Left-right direction" refers to a width direction of a road. In these cases, the "horizontal plane" is considered as a plane perpendicular to the direction of gravity. For example, even if a road surface is inclined in the left-right direction and the vehicle is upright with respect to the left-right direction of the road surface, this is considered to be equivalent to a state in which the vehicle is tilted with respect to the "horizontal plane" in the left-right direction.

To simplify explanation, the following description will be made on the assumption that the "horizontal plane" is a plane perpendicular to the direction of gravity. That is, the description will be made on the assumption that a Z-X plane is a plane perpendicular to the direction of gravity.

As a light source of the present invention, a bulb light source, such as an incandescent lamp, a halogen lamp, or a fluorescent lamp, may be used. As the light source of the present invention, a semiconductor light source, such as a light emitting diode (LED) or a laser diode (LD), may also be used. The light source of the present invention is not particularly limited and may be any light source.

However, from the viewpoint of reducing the burden on the environment, such as reducing emission of carbon dioxide ($CO_2$) and consumption of fuel, it is desirable to employ a semiconductor light source as a light source of a headlight device. Semiconductor light sources have higher luminous efficiency than conventional halogen bulbs (lamp light sources).

Also from the viewpoint of downsizing or weight reduction, it is desirable to employ a semiconductor light source. Semiconductor light sources have higher directivity than conventional halogen bulbs (lamp light sources) and allow downsizing or weight reduction of the optical system.

In the following description of the present invention, it will be assumed that the light source is an LED, which is a semiconductor light source.

"Light distribution pattern" refers to a shape of a light beam and an intensity distribution of light due to the direction of light emitted from a light source. "Light distribution pattern" will also be used to mean an illuminance pattern on an irradiated surface 9 described below. "Light distribution" refers to a distribution of intensity of light emitted from a light source with respect to the direction of the light. "Light distribution" will also be used to mean an illuminance distribution on the irradiated surface 9 described below.

The present invention is applicable to a low beam, a high beam, or the like of a headlight device. The present invention is also applicable to a low beam, a high beam, or the like of a motorcycle headlight device. The present invention is also applicable to other headlight devices for three-wheelers, four-wheelers, or the like.

However, in the following description, a case where a light distribution pattern of a low beam of a motorcycle headlight is formed will be described as an example. The light distribution pattern of the low beam of the motorcycle headlight has a cutoff line that is a straight line parallel to the left-right direction (X axis direction) of the vehicle. Further, it is brightest at a region on the lower side of the cutoff line (inside the light distribution pattern).

The three-wheelers include, for example, a motor tricycle called a gyro. "Motor tricycle called a gyro" refers to a scooter with three wheels including one front wheel and two rear wheels about one axis. In Japan, it corresponds to a motorbike. It has a rotational axis near the center of the vehicle body and allows most of the vehicle body including the front wheel and a driver seat to be tilted in the left-right direction. This mechanism allows the center of gravity to move inward during turning, similarly to a motorcycle.

First Embodiment

FIGS. 1A and 1B are configuration diagrams illustrating a configuration of a headlight module 100 according to a first embodiment. FIG. 1A is a diagram as viewed from the right (+X axis direction) with respect to the forward direction of the vehicle. FIG. 1B is a diagram as viewed from the top (+Y axis direction).

As illustrated in FIGS. 1A and 1B, the headlight module 100 according to the first embodiment includes a light source 1 and a light guide projection optical element 3. The headlight module 100 according to the first embodiment may include a condensing optical element 2. In the headlight module 100, the condensing optical element 2 may be mounted to the light source 1 to form a unit.

The light source 1 and condensing optical element 2 are disposed with their optical axes inclined in the −Y axis direction by an angle a. "With their optical axes inclined in the −Y axis direction" indicates that when viewed from the +X axis direction, the optical axes parallel to the Z axis are rotated clockwise about the X axis.

To facilitate explanation of the light source 1 and condensing optical element 2, $X_1Y_1Z_1$-coordinates will be used as a new coordinate system. The $X_1Y_1Z_1$-coordinates are coordinates obtained by rotating the XYZ-coordinates clockwise about the X axis by the angle a as viewed from the +X axis direction.

In the first embodiment, the optical axis $C_2$ of the condensing optical element 2 is parallel to the $Z_1$ axis. The optical axis $C_2$ of the condensing optical element 2 also coincides with the optical axis of the light source 1.

<Light Source 1>

The light source 1 includes a light emitting surface 11. The light source 1 emits light for illuminating an area in front of the vehicle from the light emitting surface 11.

The light source 1 is located on the $-Z_1$ axis side of the condensing optical element 2. The light source 1 is located on the −Z axis side (in back) of the light guide projection optical element 3. The light source 1 is located on the +Y axis side (upper side) of the light guide projection optical element 3.

In FIGS. 1A and 1B, the light source 1 emits light in the $+Z_1$ axis direction. The light source 1 may be of any type, but the following description will be made on the assumption that the light source 1 is an LED, as described above.

<Condensing Optical Element 2>

The condensing optical element 2 is located on the $+Z_1$ axis side of the light source 1. The condensing optical element 2 is also located on the $-Z_1$ axis side of the light guide projection optical element 3. The condensing optical element 2 is located on the −Z axis side (in back) of the light guide projection optical element 3. The condensing optical element 2 is located on the +Y axis side (upper side) of the light guide projection optical element 3.

The condensing optical element 2 receives light emitted from the light source 1. The condensing optical element 2 concentrates light at an arbitrary position in the forward direction ($+Z_1$ axis direction). The condensing optical element 2 is an optical element having a condensing function. The light concentration position of the condensing optical element 2 will be described with reference to FIGS. 3 and 4.

In FIGS. 1A and 1B, the condensing optical element 2 is illustrated to be an optical element having positive power.

The inside of the condensing optical element 2 described in the first embodiment is filled with refractive material, for example.

In FIGS. 1A and 1B, the condensing optical element 2 consists of a single optical element, but may use multiple optical elements. However, use of multiple optical elements reduces manufacturability due to reasons, such as ensuring the accuracy of positioning of each optical element.

The light source 1 and condensing optical element 2 are disposed above (on the +Y axis direction side of) the light guide projection optical element 3. The light source 1 and condensing optical element 2 are also disposed in back (−Z axis direction side) of the light guide projection optical element 3.

With respect to a reflecting surface 32, the light source 1 and condensing optical element 2 are located on a light reflecting side of the reflecting surface 32. That is, with respect to the reflecting surface 32, the light source 1 and condensing optical element 2 are located on a front surface side of the reflecting surface 32. With respect to the reflecting surface 32, the light source 1 and condensing lens 2 are located in a normal direction of the reflecting surface 32 and on the front surface side of the reflecting surface 32. The condensing optical element 2 is disposed to face the reflecting surface 32.

FIGS. 1A and 1B, the optical axis of the light source 1 coincides with the optical axis of the condensing optical element 2. The optical axes of the light source 1 and condensing optical element 2 have an intersection on the reflecting surface 32. When light is refracted at an incident surface 31, a central light ray emitted from the condensing optical element 2 reaches the reflecting surface 32. That is, the optical axis or central light ray of the condensing optical element 2 has an intersection on the reflecting surface 32.

The condensing optical element 2 includes, for example, incident surfaces 211 and 212, a reflecting surface 22, and emitting surfaces 231 and 232.

The condensing optical element 2 is disposed immediately after the light source 1. "After" here refers to a side toward which light emitted from the light source 1 travels. Here, "immediately after" indicates that light emitted from the light emitting surface 11 is directly incident on the condensing optical element 2.

A light emitting diode emits light with a Lambertian light distribution. "Lambertian light distribution" refers to a light distribution in which the luminance of a light emitting surface is constant regardless of the viewing direction. That is, the directivity of light distribution of a light emitting diode is wide. Thus, by reducing the distance between the light source 1 and the condensing optical element 2, it is possible to increase the amount of light incident on the condensing optical element 2.

The condensing optical element 2 is made of, for example, transparent resin, glass, or silicone. The material of the condensing optical element 2 may be any material having transparency, and may be transparent resin or the like. However, from the viewpoint of light use efficiency, materials having high transparency are appropriate as the material of the condensing optical element 2. Further, since the condensing optical element 2 is disposed immediately after the light source 1, the material of the condensing optical element 2 preferably has excellent heat resistance.

The incident surface 211 is an incident surface formed at a central part of the condensing optical element 2. "A central part of the condensing optical element 2" indicates that the optical axis $C_2$ of the condensing optical element 2 has an intersection on the incident surface 211.

The incident surface 211 has, for example, a convex shape having positive power. The convex shape of the incident surface 211 is a shape projecting in the $-Z_1$ axis direction. The power is also referred to as the "refractive power." The incident surface 211 has, for example, a shape rotationally symmetric about an optical axis $C_2$.

The incident surface 212 has, for example, a shape that is a part of the surface shape of a solid of revolution obtained by rotating an ellipse about its major or minor axis. A solid of revolution obtained by rotating an ellipse about its major or minor axis is referred to as a "spheroid." The rotational axis of the spheroid coincides with the optical axis $C_2$. The incident surface 212 has a surface shape obtained by cutting off both ends of the spheroid in the direction of the rotational axis. Thus, the incident surface 212 has a tubular shape.

One end (end on the $+Z_1$ axis direction side) of the tubular shape of the incident surface 212 is connected to the outer periphery of the incident surface 211. The tubular shape of the incident surface 212 is formed on the light source 1 side ($-Z_1$ axis side) of the incident surface 211. That is, the tubular shape of the incident surface 212 is formed on the light source 1 side of the incident surface 211.

The reflecting surface 22 has a tubular shape whose cross-sectional shape in an $X_1$-$Y_1$ plane is, for example, a circular shape centered on the optical axis $C_2$. In the tubular shape of the reflecting surface 22, the diameter of the circular shape in the $X_1$-$Y_1$ plane at the end on the $-Z_1$ axis direction side is smaller than the diameter of the circular shape in the $X_1$-$Y_1$ plane at the end on the $+Z_1$ axis direction side. The diameter of the reflecting surface 22 increases in the $+Z_1$ axis direction.

The reflecting surface 22 has, for example, the shape of the side surface of a circular truncated cone. The shape of the side surface of the circular truncated cone in a plane including the central axis is a linear shape. However, the shape of the reflecting surface 22 in a plane including the optical axis $C_2$ may be a curved line shape. "Plane including the optical axis $C_2$" indicates that the line of the optical axis $C_2$ can be drawn on the plane.

One end (end on the $-Z_1$ axis direction side) of the tubular shape of the reflecting surface 22 is connected to the other end (end on the $-Z_1$ axis direction side) of the tubular shape of the incident surface 212. The reflecting surface 22 is located on the outer peripheral side of the incident surface 212.

The emitting surface 231 is located on the +Z axis direction side of the incident surface 211. The emitting surface 231 has a convex shape having positive power. The convex shape of the emitting surface 231 is a shape projecting in the +Z axis direction. The optical axis $C_2$ of the condensing optical element 2 has an intersection on the emitting surface 231. The emitting surface 231 has, for example, a shape rotationally symmetric about the optical axis $C_2$.

The emitting surface 232 is located on the outer peripheral side of the emitting surface 231. The emitting surface 232 has, for example, a planar shape parallel to an $X_1$-$Y_1$ plane. An inner periphery and an outer periphery of the emitting surface 232 have circular shapes.

The inner periphery of the emitting surface 232 is connected to an outer periphery of the emitting surface 231. The outer periphery of the emitting surface 232 is connected to the other end (end on the $+Z_1$ axis direction side) of the tubular shape of the reflecting surface 22.

In the light emitted from the light emitting surface 11, light rays having small emission angles are incident on the incident surface 211. The light rays having small emission angles have, for example, a divergence angle of 60 degrees or less. The light rays having small emission angles are incident on the incident surface 211 and emitted from the emitting surface 231. The light rays with small emission angles emitted from the emitting surface 231 are concentrated at an arbitrary position in front ($+Z_1$ axis direction) of the condensing optical element 2. As described above, the light concentration position will be described later.

In the light emitted from the light emitting surface 11, light rays having large emission angles are incident on the incident surface 212. The light rays having large emission angles have, for example, a divergence angle greater than 60 degrees. The light rays incident on the incident surface 212 are reflected by the reflecting surface 22. The light rays reflected by the reflecting surface 22 travel in the $+Z_1$ axis direction. The light rays reflected by the reflecting surface 22 are emitted from the emitting surface 232. The light rays with large emission angles emitted from the emitting surface 232 are concentrated at an arbitrary position in front ($+Z_1$ axis direction) of the condensing optical element 2. As described above, the light concentration position will be described later.

In each of the following embodiments, as an example, the condensing optical element 2 will be described as an optical element having the following functions: the condensing optical element 2 concentrates, due to refraction, light rays emitted from the light source 1 at small emission angles; and the condensing optical element 2 concentrates, due to reflection, light rays emitted from the light source 1 at large emission angles.

For example, the light concentration position of the light emitted from the emitting surface 231 has a shape similar to a pattern of the light source 1 (shape of the light emitting surface 11). Thus, projection of the shape of the light emitting surface 11 of the light source 1 may cause light distribution unevenness. In such a case, by making the light concentration position of the light emitted from the emitting surface 232 different from the light concentration position of the light emitted from the emitting surface 231 as described above, it becomes possible to reduce the light distribution unevenness due to the light emitted from the emitting surface 231.

The light concentration position of the light rays emitted from the emitting surface 232 and the light concentration position of the light rays emitted from the emitting surface 231 need not coincide. For example, the light concentration position of the light emitted from the emitting surface 232 may be closer to the condensing optical element 2 than the light concentration position of the light emitted from the emitting surface 231.

Further, in the first embodiment, each of the incident surfaces 211 and 212, reflecting surface 22, and emitting surfaces 231 and 232 of the condensing optical element 2 has a shape rotationally symmetric about the optical axis $C_2$. However, the shapes are not limited to rotationally symmetric shapes as long as the condensing optical element 2 can concentrate light emitted from the light source 1.

For example, by changing the cross-sectional shape of the reflecting surface 22 in an $X_1$-$Y_1$ plane to an elliptical shape, it is possible to form a light concentration spot at the light concentration position into an elliptical shape. This facilitates formation of a wide light distribution pattern by the headlight module 100.

Even when the shape of the light emitting surface 11 of the light source 1 is a rectangular shape, the condensing optical element 2 can be downsized by changing the cross-sectional shape of the reflecting surface 22 in an $X_1$-$Y_1$ plane to an elliptical shape, for example.

Further, it is sufficient that the condensing optical element 2 totally have positive power. Each of the incident surfaces 211 and 212, reflecting surface 22, and emitting surfaces 231 and 232 may have any power.

As described above, if a bulb light source is employed as the light source 1, a reflecting mirror may be used as the condensing optical element.

<Light Guide Projection Optical Element 3>

The light guide projection optical element 3 is located on the $+Z_1$ axis side of the condensing optical element 2. The light guide projection optical element 3 is located on the +Z axis side of the condensing optical element 2. The light guide projection optical element 3 is located on the −Y axis side of the condensing optical element 2.

The light guide projection optical element 3 receives light emitted from the condensing optical element 2. The light guide projection optical element 3 emits light in the forward direction (+Z axis direction).

The light guide projection optical element 3 has a function of guiding light by the reflecting surface 32. The light guide projection optical element 3 also has a function of projecting light from an emitting surface 33. To facilitate understanding, the optical element 3 will be described as the light guide projection optical element 3.

FIG. 2 is a perspective view of the light guide projection optical element 3. The light guide projection optical element 3 includes the reflecting surface 32 and emitting surface 33. The light guide projection optical element 3 may include the incident surface 31. The light guide projection optical element 3 may include an incident surface 34.

The light guide projection optical element 3 is made of, for example, transparent resin, glass, silicone, or the like.

The inside of the light guide projection optical element 3 described in the first embodiment is filled with refractive material, for example.

The incident surface 31 is provided at an end portion on the −Z axis direction side of the light guide projection optical element 3. The incident surface 31 is provided on a portion on the +Y axis direction side of the light guide projection optical element 3.

In FIGS. 1A, 1B, and 2, the incident surface 31 of the light guide projection optical element 3 has a curved surface shape. The curved surface shape of the incident surface 31 is, for example, a convex shape having positive power in both the horizontal direction (X axis direction) and vertical direction (Y axis direction).

When light is incident on the incident surface 31 having the curved surface shape, the divergence angle of the light changes. The incident surface 31 can form a light distribution pattern by changing the divergence angle of the light. That is, the incident surface 31 has a function of forming the shape of the light distribution pattern. That is, the incident surface 31 functions as a light distribution pattern shape forming portion.

Further, for example, by providing the incident surface 31 with a light condensing function, the condensing optical element 2 can be omitted. The incident surface 31 functions as a light condensing portion.

The incident surface 31 can be considered as an example of a light distribution pattern shape forming portion. The incident surface 31 can also be considered as an example of a light condensing portion.

However, the shape of the incident surface 31 is not limited to a curved surface shape, and may be, for example, a planar shape.

The first embodiment first describes a case where the shape of the incident surface 31 of the light guide projection optical element 3 is a convex shape having positive power.

The reflecting surface 32 is disposed at an end portion on the −Y axis direction side of the incident surface 31. The reflecting surface 32 is located on the −Y axis direction side of the incident surface 31. The reflecting surface 32 is located on the +Z axis direction side of the incident surface 31. In the first embodiment, an end portion on the −Z axis direction side of the reflecting surface 32 is connected to an end portion on the −Y axis direction side of the incident surface 31.

The reflecting surface 32 reflects light reaching the reflecting surface 32. The reflecting surface 32 has a function of reflecting light. The reflecting surface 32 functions as a light reflecting portion. The reflecting surface 32 is an example of the light reflecting portion.

The reflecting surface 32 is a surface facing in the +Y axis direction. A front surface of the reflecting surface 32 is a surface facing in the +Y axis direction. The front surface of the reflecting surface 32 is a surface for reflecting light. A back surface of the reflecting surface 32 is a surface facing in the −Y axis direction.

The reflecting surface 32 is a surface rotated clockwise about an axis parallel to the X axis with respect to a Z-X plane, as viewed from the +X axis direction. In FIGS. 1A and 1B, the reflecting surface 32 is a surface rotated by an angle b with respect to the Z-X plane.

In FIGS. 1A and 1B, the reflecting surface 32 is planar. However, the reflecting surface 32 need not be planar. The reflecting surface 32 may have a curved surface shape.

The reflecting surface 32 may be a mirror surface obtained by mirror deposition. However, the reflecting surface 32 desirably functions as a total reflection surface, without mirror deposition. This is because a total reflection surface is higher in reflectance than a mirror surface, contributing improvement in light use efficiency. Further, elimination of the step of mirror deposition can simplify the manufacturing process of the light guide projection optical element 3, contributing reduction in the manufacturing cost of the light guide projection optical element 3. In particular, the configuration illustrated in the first embodiment has a feature that the incident angles of light rays on the reflecting surface 32 are shallow, thus allowing the reflecting surface 32 to be used as a total reflection surface, without mirror deposition. "Incident angles are shallow" indicates that the incident angles are great.

The incident surface 34 is, for example, a surface parallel to an X-Y plane. However, the incident surface 34 may have a curved surface shape. By changing the shape of the incident surface 34 to a curved surface shape, it is possible to change the light distribution of incident light.

The incident surface 34 is located on the −Y axis direction side of the reflecting surface 32. The incident surface 34 is located on the back surface side of the reflecting surface 32. In FIGS. 1A and 1B, an end portion on the +Y axis direction side of the incident surface 34 is connected to an end portion on the +Z axis direction side of the reflecting surface 32.

In FIGS. 1A and 1B, the incident surface 34 is located at a position optically conjugate to the irradiated surface 9. "Optically conjugate" refers to a relation in which light emitted from one point is imaged at another point. The shape of light on the incident surface 34 and a conjugate plane PC extending from the incident surface 34 is projected onto the irradiated surface 9. In FIGS. 1A and 1B, no light enters through the incident surface 34. Thus, the shape of light entering through the incident surface 31 on the conjugate plane PC is projected onto the irradiated surface 9.

The image of light on the conjugate plane PC is formed on a part of the conjugate plane PC in the light guide projection optical element 3. A light distribution pattern can be formed within the conjugate plane PC in the light guide projection optical element 3 into a shape appropriate for the headlight module 100. In particular, if a single light distribution pattern is formed by using multiple headlight modules, as described later, light distribution patterns corresponding to the roles of the respective headlight modules are formed.

The irradiated surface 9 is a virtual surface defined at a predetermined position in front of the vehicle. The irradiated surface 9 is a surface parallel to an X-Y plane. The predetermined position in front of the vehicle is a position at which the luminous intensity or illuminance of the headlight device is measured, and is specified in road traffic rules or the like. For example, in Europe, United Nations Economic Commission for Europe (UNECE) specifies a position 25 m from a light source as the position at which the luminous intensity of an automobile headlight device is measured. In Japan, Japanese Industrial Standards Committee (JIS) specifies a position 10 m from a light source as the position at which the luminous intensity is measured.

A ridge line portion 321 is an edge on the −Y axis direction side of the reflecting surface 32. The ridge line portion 321 is an edge on the +Z axis direction side of the reflecting surface 32. The ridge line portion 321 is located at a position optically conjugate to the irradiated surface 9.

In general, "ridge line" refers to a boundary between one surface and another surface. However, "ridge line" here includes an end portion of a surface. In the first embodiment, the ridge line portion 321 is a portion joining the reflecting surface 32 and the incident surface 34. That is, the portion where the reflecting surface 32 and the incident surface 34 are connected to each other is the ridge line portion 321.

However, for example, if the light guide projection optical element 3 is hollow and the incident surface 34 is an opening portion, the ridge line portion 321 is an end portion of the reflecting surface 32. The ridge line portion 321 includes a boundary between one surface and another surface. The ridge line portion 321 also includes an end portion of a surface. As described above, in the first embodiment, the inside of the light guide projection optical element 3 is filled with refractive material.

Further, "ridge line" is not limited to a straight line, and includes a curved line or the like. For example, the ridge line may have a "rising line" shape described later. In the first embodiment, the ridge line portion 321 has a straight line shape. In the first embodiment, the ridge line portion 321 has a straight line shape parallel to the X axis.

Further, in the first embodiment, the ridge line portion 321 is an edge on the +Y axis direction side of the incident surface 34. Since the ridge line portion 321 is on the incident surface 34, it is also located at a position optically conjugate to the irradiated surface 9.

Further, in the first embodiment, the ridge line portion 321 intersects with the optical axis $C_1$ of the light guide projection optical element 3. The ridge line portion 321 intersects at a right angle with the optical axis of the light guide projection optical element 3.

The optical axis $C_1$ is a normal passing through a surface apex of the emitting surface 33. In the case of FIGS. 1A and 1B, the optical axis $C_1$ is an axis passing through the surface apex of the emitting surface 33 and being parallel to the Z axis. When the surface apex of the emitting surface 33 moves parallel to the X axis direction or Y axis direction in an X-Y plane, the optical axis $C_1$ also moves parallel to the X axis direction or Y axis direction similarly. Further, when the emitting surface 33 tilts with respect to an X-Y plane, the normal at the surface apex of the emitting surface 33 also tilts with respect to the X-Y plane and thus the optical axis $C_1$ also tilts with respect to the X-Y plane.

The ridge line portion 321 forms the shape of a cutoff line 91 of the light distribution pattern. This is because the ridge line portion 321 is located at a position optically conjugate to the irradiated surface 9. The light distribution pattern on the irradiated surface 9 has a shape similar to that of the light distribution pattern on the conjugate plane PC including the ridge line portion 321. Thus, the ridge line portion 321 is preferably formed into the shape of the cutoff line 91.

"Cutoff line" refers to a light/dark borderline formed on the upper side of the light distribution pattern when a wall or screen is irradiated with light from a headlight. "Cutoff line" is a part of a borderline between a bright section and a dark section formed on the outline portion of the light distribution pattern. "Cutoff line" refers to a borderline between a bright section and a dark section on the upper side of the light distribution pattern. The area above the cutoff line (outside the light distribution pattern) is dark and the area below the cutoff line (inside the light distribution pattern) is bright.

Cutoff line is a term used in adjustment of the emitting direction of a headlight for passing each other. The headlight for passing each other is also referred to as a low beam. The "cutoff line" is required to be sharp. Here, "sharp" indicates that large chromatic aberration, blur, or the like must not occur on the cutoff line.

The emitting surface 33 is disposed at an end portion on the +Z axis direction side of the light guide projection optical element 3. The emitting surface 33 has a curved surface shape having positive power. The emitting surface 33 has a convex shape projecting in the +Z axis direction.

<Behavior of Light Rays>

As illustrated in FIGS. 1A and 1B, the light concentrated by the condensing optical element 2 enters the light guide projection optical element 3 through the incident surface 31.

The incident surface 31 is a refractive surface. The light incident on the incident surface 31 is refracted at the incident surface 31. The incident surface 31 has a convex shape projecting in the −Z axis direction.

The curvature of the incident surface 31 in the X axis direction contributes a "width of a light distribution" in a direction parallel to a road surface. The curvature of the incident surface 31 in the Y axis direction contributes a "height of the light distribution" in a direction perpendicular to the road surface.

<Behavior of Light Rays on Z-X Plane>

When viewed in a Z-X plane, the incident surface 31 has a convex shape. That is, the incident surface 31 has positive power with respect to a horizontal direction (X axis direction). Here, "when viewed in a Z-X plane" refers to being viewed from the Y axis direction. That is, it refers to being projected onto a Z-X plane and viewed. The light incident on the incident surface 31 propagates while further concentrated by the incident surface 31 of the light guide projection optical element 3. Here, "propagate" refers to traveling of light in the light guide projection optical element 3.

When viewed in a Z-X plane, the light propagating in the light guide component 3 is concentrated at an arbitrary light concentration position PH in the light guide component 3 by the condensing optical element 2 and the incident surface 31 of the light guide component 3, as illustrated in FIG. 1B. The light concentration position PH is indicated by a dashed line in FIG. 1B. In FIG. 1B, the position of the ridge line portion 321 is the position of the conjugate plane PC.

As illustrated in FIG. 1A, the conjugate plane PC is located on the +Z axis direction side of the light concentration position PH. Thus, the light after passing through the light concentration position PH diverges. Thus, the conjugate plane PC emits light wide in the horizontal direction (X axis direction) as compared to the light concentration position PH.

The conjugate plane PC is located at a position conjugate to the irradiated surface 9. Thus, the width of the light on the conjugate plane PC in the horizontal direction corresponds to the "width of the light distribution" on the irradiated surface 9. By changing the curvature of the curved surface shape of the incident surface 31, it is possible to control the width of the light beam on the conjugate plane PC in the X axis direction. Thereby, it is possible to change the width of the light distribution pattern of light emitted by the headlight module 100.

Further, the headlight module 100 need not necessarily have the light concentration position PH before (on the −Z axis side of) the ridge line portion 321 in the light guide projection optical element 3. FIGS. 3 and 4 are explanatory diagrams for explaining the light concentration position PH of the headlight module 100 according to the first embodiment.

In FIGS. 3A and 3B, the light concentration position PH is located before (on the −Z axis direction side of) the incident surface 31. The light concentration position PH is located in a gap between the condensing optical element 2 and the light guide projection optical element 3. "Gap" refers to a space.

In the configuration of FIGS. 3A and 3B, as in the configuration of FIGS. 1A and 1B, light after passing through the light concentration position PH diverges. The divergence angle of the diverged light decreases at the incident surface 31. However, since the distance from the light concentration position PH to the conjugate plane PC can be made large, the width of the light beam on the conjugate plane PC in the x axis direction can be controlled. Thus, the conjugate plane PC emits light wide in the horizontal direction (x axis direction).

In FIGS. 4A and 4B, the light concentration position PH is located after (on the +Z axis direction side of) the ridge line portion 321. In FIGS. 4A and 4B, the conjugate plane PC is located on the −Z axis direction side of the light concentration position PH. The light concentration position PH is located between the ridge line portion 321 (conjugate plane PC) and the emitting surface 33.

Light passing through the conjugate plane PC concentrates at the light concentration position PH. By controlling the distance from the conjugate plane PC to the light concentration position PH, it is possible to control the width of the light beam on the conjugate plane PC in the X axis direction. Thus, the conjugate plane PC emits light wide in the horizontal direction (X axis direction).

Figure 5:
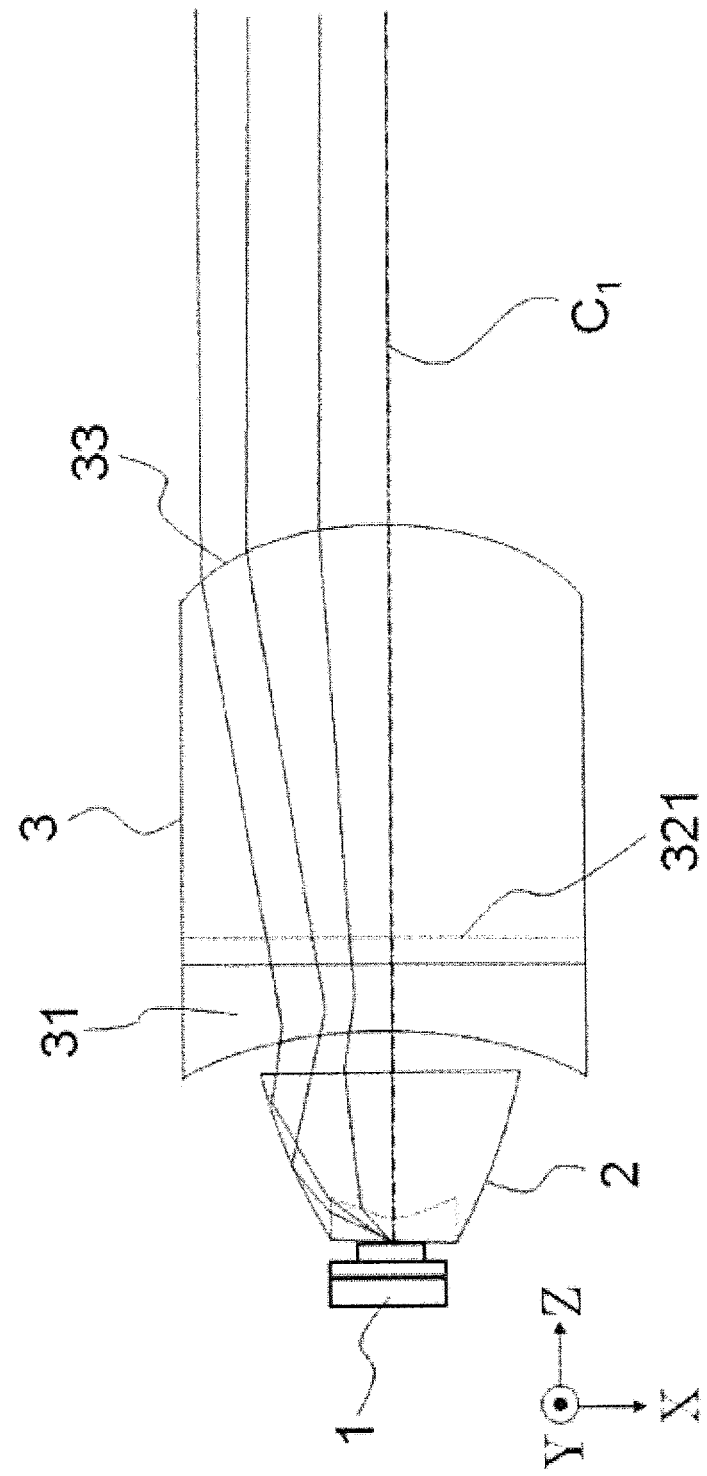
FIG. 5 is an explanatory diagram for explaining a light concentration position PH of the headlight module 100 according to the first embodiment.

FIG. 5 is an explanatory diagram for explaining the light concentration position PH of the headlight module 100 according to the first embodiment. However, as illustrated in FIG. 5, the headlight module 100 has no light concentration position PH.

In the headlight module 100 illustrated in FIG. 5, for example, a curved surface of the incident surface 31 in the horizontal direction (X axis direction) is a concave surface having negative power. This can spread light in the horizontal direction at the ridge line portion 321. The headlight module 100 illustrated in FIG. 5 has no light concentration position PH.

Thus, the width of the light beam on the conjugate plane PC is larger than the width of the light beam on the incident surface 31. The concave incident surface 31 can control the width of the light beam on the conjugate plane PC in the X axis direction, providing a light distribution pattern wide in the horizontal direction at the irradiated surface 9.

The light concentration position PH indicates that light density per unit area on an X-Y plane is high. Thus, if the light concentration position PH coincides with the conjugate plane PC (position of the ridge line portion 321 in the Z axis direction), the width of the light distribution on the irradiated surface 9 is minimum, and the illuminance of the light distribution on the irradiated surface 9 is maximum.

Further, as the light concentration position PH separates from the conjugate plane PC (position of the ridge line portion 321 in the Z axis direction), the width of the light distribution on the irradiated surface 9 increases, and the illuminance of the light distribution on the irradiated surface 9 decreases. "Illuminance" refers to a physical quantity indicating brightness of light radiated to a planar object. It is equal to a luminous flux radiated per unit area.

<Behavior of Light Rays on Z-Y Plane>

On the other hand, when the light entering through the incident surface 31 is viewed in a Y-Z plane, the light refracted at the incident surface 31 propagates in the light guide projection optical element 3 and is guided to the reflecting surface 32. Here, "propagate" refers to traveling of light in the light guide component 3.

Light entering the light guide projection optical element 3 and reaching the reflecting surface 32 enters the light guide projection optical element 3 and directly reaches the reflecting surface 32. "Directly reach" refers to reaching without being reflected by another surface or the like. Light entering the light guide projection optical element 3 and reaching the reflecting surface 32 reaches the reflecting surface 32 without being reflected by another surface or the like. That is, light reaching the reflecting surface 32 undergoes the first reflection in the light guide projection optical element 3.

Further, the light reflected by the reflecting surface 32 is directly emitted from the emitting surface 33. That is, the light reflected by the reflecting surface 32 reaches the emitting surface 33 without being reflected by another surface or the like. That is, the light undergoing the first reflection at the reflecting surface 32 reaches the emitting surface 33 without undergoing further reflection.

In FIGS. 1A and 1B, light emitted from the part of the emitting surfaces 231 and 232 of the condensing optical element 2 on the $+Y_1$ axis direction side of the optical axis $C_2$ of the condensing optical element 2 is guided to the reflecting surface 32. Further, light emitted from the part of the emitting surfaces 231 and 232 of the condensing optical element 2 on the $-Y_1$ axis direction side of the optical axis $C_2$ of the condensing optical element 2 is emitted from the emitting surface 33 without being reflected by the reflecting surface 32.

That is, part of the light entering the light guide projection optical element 3 reaches the reflecting surface 32. The light reaching the reflecting surface 32 is reflected by the reflecting surface 32 and emitted from the emitting surface 33.

By setting the inclination angle a of the light source 1 and condensing optical element 2, it is possible to cause all the light emitted from the condensing optical element 2 to be reflected by the reflecting surface 32. Further, by setting the inclination angle b of the reflecting surface 32, it is possible to cause all the light emitted from the condensing optical element 2 to be reflected by the reflecting surface 32.

Further, by setting the inclination angle a of the light source 1 and condensing optical element 2, it is possible to reduce the length of the light guide projection optical element 3 in the direction of the optical axis $C_1$ (Z axis direction), and shorten the depth (length in the Z axis direction) of an optical system. Here, "optical system" refers to, in the first embodiment, an optical system including, as its components, the condensing optical element 2 and light guide projection optical element 3.

Further, by setting the inclination angle a of the light source 1 and condensing optical element 2, it becomes easy to guide light emitted from the condensing optical element 2 to the reflecting surface 32. Thus, it becomes easy to efficiently concentrate light at a region on the inner side (+Y axis direction side) of the ridge line portion 321 on the conjugate plane PC.

By concentrating light emitted from the condensing optical element 2 on the conjugate plane PC side of the reflecting surface 32, it is possible to increase the emission amount of light emitted from a region on the +Y axis side of the ridge line portion 321. In this case, an intersection between a central light ray emitted from the condensing optical element 2 and the reflecting surface 32 is located on the conjugate plane PC side of the reflecting surface 32.

Thus, it becomes easy to brighten a region on the lower side of the cutoff line 91 of the light distribution pattern projected on the irradiated surface 9. Further, the reduction in the length of the light guide projection optical element 3 in the optical axis direction (Z axis direction) reduces internal absorption of light in the light guide projection optical element 3, improving the light use efficiency. "Internal absorption" refers to light loss inside the material excepting loss due to surface reflection when light passes through a light guide component (in this embodiment, the light guide projection optical element 3). The internal absorption increases as a length of the light guide component increases.

For a typical light guide element, light travels inside the light guide element while being repeatedly reflected by a side surface of the light guide element. Thereby, the intensity distribution of the light is equalized. In the present application, light entering the light guide projection optical element 3 is reflected by the reflecting surface 32 once and emitted from the emitting surface 33. In this respect, the way of using the light guide projection optical element 3 in the present application differs from the conventional way of using a light guide element.

In a light distribution pattern specified in road traffic rules or the like, a region on the lower side (−Y axis direction side) of the cutoff line 91 has the highest illuminance, for example. As described above, the ridge line portion 321 of the light guide projection optical element 3 is in conjugate relation with the irradiated surface 9. Thus, to make a region on the lower side (−Y axis direction side) of the cutoff line 91 have the highest illuminance, it is required to make a region on the upper side (+Y axis direction side) of the ridge line portion 321 of the light guide projection optical element 3 have the highest luminous intensity. "Luminous intensity" refers to a physical quantity indicating how strong light emitted from a light source is.

If the ridge line portion 321 is not linear, the plane (conjugate plane PC) passing through a position (point Q) at which the ridge line portion 321 intersects with the optical axis $C_1$ and being parallel to an X-Y plane is in conjugate relation with the irradiated surface 9, for example. It is not necessarily required that the edge 321 and the optical axis of the light guide projection optical element 3 intersect with each other.

To produce a light distribution pattern in which a region on the lower side (−Y axis direction side) of the cutoff line 91 has the highest illuminance, it is effective that, when viewed in a Y-Z plane, part of the light entering through the incident surface 31 of the light guide projection optical element 3 is reflected by the reflecting surface 32, as illustrated in FIG. 1A.

This is because light entering through the incident surface 31 and reaching a region on the +Y axis direction side of the ridge line portion 321 without being reflected by the reflecting surface 32 and light entering through the incident surface 31 and reflected by the reflecting surface 32 are superposed on the conjugate plane PC.

The light reaching the conjugate plane PC without being reflected by the reflecting surface 32 and the light reaching the conjugate plane PC after being reflected by the reflecting surface 32 are superposed in a region on the conjugate plane PC corresponding to the high illuminance region on the irradiated surface 9. Such a configuration makes it possible to make a region on the upper side (+Y axis direction side)

of the ridge line portion 321 have the highest luminous intensity on the conjugate plane PC.

A region having high luminous intensity is formed by superposing, on the conjugate plane PC, the light reaching the conjugate plane PC without being reflected by the reflecting surface 32 and the light reaching the conjugate plane PC after being reflected by the reflecting surface 32. The position of the region having high luminous intensity on the conjugate plane PC can be changed by changing the reflection position of the light on the reflecting surface 32.

By setting the reflection position of the light on the reflecting surface 32 near the conjugate plane PC, it is possible to set the region having high luminous intensity near the ridge line portion 321 on the conjugate plane PC. Thus, it is possible to set a region having high illuminance on the lower side of the cutoff line 91 on the irradiated surface 9.

Further, the amount of the superposed light can be adjusted by arbitrarily changing the curvature of the incident surface 31 in a vertical direction (Y axis direction), as in the case of adjusting the width of the light distribution in the horizontal direction. "Amount of the superposed light" refers to the amount of light resulting from the superposition of the light reaching a region on the +Y axis direction side of the ridge line portion 321 (on the conjugate plane PC) without being reflected by the reflecting surface 32 and the light reflected by the reflecting surface 32.

In this manner, by adjusting the curvature of the incident surface 31, a light distribution can be adjusted. By adjusting the curvature of the incident surface 31, a desired light distribution can be obtained. Here, "desired light distribution" refers to, for example, a predetermined light distribution or the like specified in road traffic rules or the like. If a single light distribution pattern is formed by using multiple headlight modules, as described later, "desired light distribution" refers to a light distribution required for each headlight module.

Further, by adjusting the geometric relationship between the condensing optical element 2 and the light guide projection optical element 3, a light distribution can be adjusted. By adjusting the geometric relationship between the condensing optical element 2 and the light guide projection optical element 3, a desired light distribution can be obtained. Here, "desired light distribution" refers to, for example, a predetermined light distribution or the like specified in road traffic rules or the like. If a single light distribution pattern is formed by using multiple headlight modules, as described later, "desired light distribution" refers to a light distribution required for each headlight module.

"Geometric relationship" refers to, for example, the positional relationship between the condensing optical element 2 and the light guide projection optical element 3 in the optical axis direction. As the distance from the condensing optical element 2 to the light guide projection optical element 3 decreases, the amount of light reflected by the reflecting surface 32 decreases, and the dimension of the light distribution in the vertical direction (Y axis direction) decreases. That is, the height of the light distribution pattern decreases. Conversely, as the distance from the condensing optical element 2 to the light guide projection optical element 3 increases, the amount of light reflected by the reflecting surface 32 increases, and the dimension of the light distribution in the vertical direction (Y axis direction) increases. That is, the height of the light distribution pattern increases.

Further, the position of the superposed light can be changed by adjusting the position of the light reflected by the reflecting surface 32. "Position of the superposed light" refers to the position at which the light reaching a region on the +Y axis direction side of the ridge line portion 321 (on the conjugate plane PC) without being reflected by the reflecting surface 32 and the light reflected by the reflecting surface 32 are superposed on the conjugate plane PC. That is, it refers to a high luminous intensity region on the conjugate plane PC. The high luminous intensity region is a region on the conjugate plane PC corresponding to the high illuminance region on the irradiated surface 9.

Further, by adjusting a light concentration position of the light reflected by the reflecting surface 32, the height of a high luminous intensity region on the emitting surface 33 can be adjusted. Specifically, if the light concentration position is near the conjugate plane PC, the dimension of the high luminous intensity region in the height direction is small. Conversely, if the light concentration position is far from the conjugate plane PC, the dimension of the high luminous intensity region in the height direction is large.

In the above description, the high illuminance region is described as a region on the lower side (−Y axis direction side) of the cutoff line 91. This is the position of the high illuminance region in the light distribution pattern on the irradiated surface 9.

As described later, for example, a single light distribution pattern may be formed on the irradiated surface 9 by using multiple headlight modules. In such a case, the high luminous intensity region on the conjugate plane PC of each headlight module is not necessarily a region on the +Y axis direction side of the ridge line portion 321. For each headlight module, the high luminous intensity region is formed, on the conjugate plane PC, at a position appropriate for the light distribution pattern of the headlight module.

As described above, by adjusting the light concentration position PH in the horizontal direction, a width of the light distribution pattern can be controlled. Further, by adjusting a light concentration position in the vertical direction, the height of the high illuminance region can be controlled. As such, the light concentration position PH in the horizontal direction and the light concentration position in the vertical direction need not necessarily coincide. By independently setting the light concentration position PH in the horizontal direction and the light concentration position in the vertical direction, it is possible to control the shape of the light distribution pattern or the shape of the high illuminance region.

Further, by changing the shape of the ridge line portion 321 of the light guide projection optical element 3, it is possible to easily form the shape of the cutoff line 91. The cutoff line 91 can be easily formed by forming the ridge line portion 321 of the light guide projection optical element 3 into the shape of the cutoff line 91. Thus, there is an advantage that the light use efficiency is high as compared to a conventional case where it is formed by using a light blocking plate. This is because the cutoff line 91 can be formed without blocking light.

An image of the light distribution pattern formed on the conjugate plane PC is magnified and projected by the light guide projection optical element 3 onto the irradiated surface 9 in front of the vehicle.

A focal position of the emitting surface 33 coincides with the position of the ridge line portion 321 on the optical axis $C_1$ (position in the Z axis direction). That is, the focal position of the emitting surface 33 is located at an intersection between the ridge line portion 321 and the optical axis $C_1$.

In another aspect, the position of a focal point of the emitting surface 33 in the Z axis direction (direction of the optical axis $C_1$) coincides with a position of the ridge line portion 321 in the Z axis direction.

In a conventional headlight, since a light blocking plate and a projection lens are used, positional variation between the components causes variation, such as deformation of the cutoff line or variation of light distribution. However, for the light guide projection optical element 3, depending on the accuracy of the shape of the single component, it is possible to make a focal position of the emitting surface 33 coincide with a position of the ridge line portion 321 in the direction of the optical axis $C_1$.

Thereby, the headlight module 100 can reduce variation, such as deformation of the cutoff line or variation of light distribution. This is because, in general, the accuracy of the shape of a single component can be improved more easily than the positional accuracy between two components.

Figure 6:
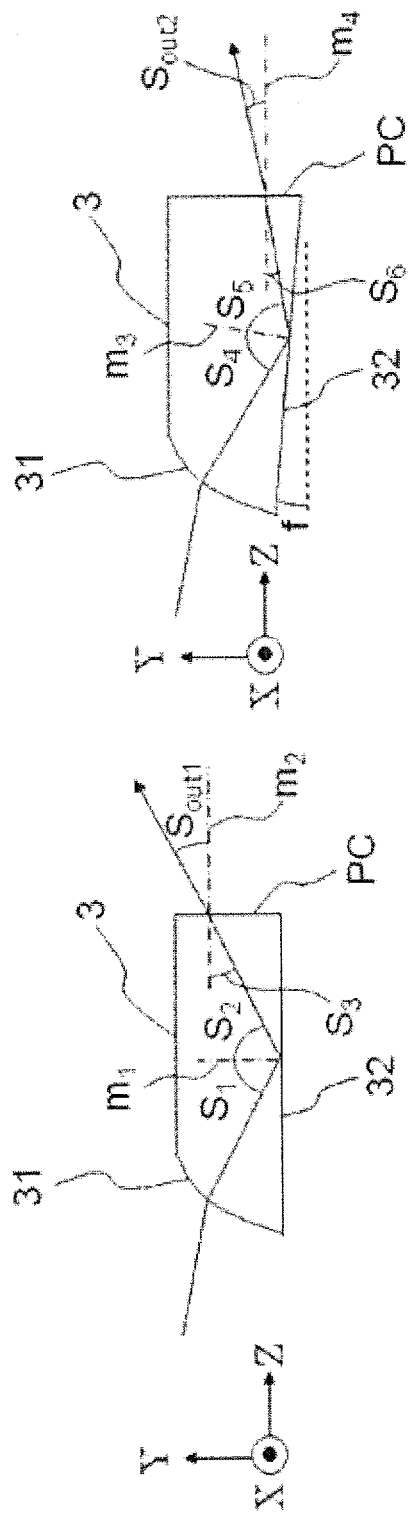
FIGS. 6A and 6B are diagrams for explaining a shape of a reflecting surface 32 of the light guide projection optical element 3 of the headlight module 100 according to the first embodiment.

FIGS. 6A and 6B are diagrams for explaining the shape of the reflecting surface 32 of the light guide projection optical element 3 of the headlight module 100 according to the first embodiment. FIGS. 6A and 6B illustrate the part from the incident surface 31 to the conjugate plane PC of the light guide projection optical element 3.

FIG. 6A illustrates, for comparison, a case where the reflecting surface 32 is not inclined with respect to a Z-X plane. FIG. 6B illustrates the shape of the reflecting surface 32 of the light guide projection optical element 3.

The reflecting surface 32 of the light guide projection optical element 3 illustrated in FIG. 6B is not a surface parallel to a Z-X plane. For example, as illustrated in FIG. 6B, the reflecting surface 32 is a flat surface inclined with respect to a Z-X plane with the X axis as a rotational axis. The reflecting surface 32 of the light guide projection optical element 3 is a surface rotated clockwise about the X axis, as viewed from the +X axis direction. In FIG. 6B, the reflecting surface 32 is a surface rotated by an angle f with respect to a Z-X plane. The end portion on the incident surface 31 side of the reflecting surface 32 is located on the +Y axis side of the end portion on the conjugate plane PC side.

The reflecting surface 32 of the light guide projection optical element 3 illustrated in FIG. 6A is a flat surface parallel to an X-Z plane. Light entering through the incident surface 31 is reflected by the reflecting surface 32 and reaches the conjugate plane PC.

The incident angle of the light on the reflecting surface 32 is an incident angle $S_1$. The reflection angle of the light at the reflecting surface 32 is a reflection angle $S_2$. According to the law of reflection, the reflection angle $S_2$ is equal to the incident angle $S_1$. A perpendicular line $m_1$ to the reflecting surface 32 is indicated by a dot-and-dash line in FIG. 6A.

Light is incident on the conjugate plane PC at an incident angle $S_3$. The light is emitted from the conjugate plane PC at an emission angle $S_{out1}$. The emission angle $S_{out1}$ is equal to the incident angle $S_3$. A perpendicular line $m_2$ to the conjugate plane PC is indicated by a dot-and-dash line in FIG. 6A. The perpendicular line $m_2$ to the conjugate plane PC is parallel to the optical axis $C_1$.

Since light is greatly refracted at the incident surface 31, the emission angle $S_{out1}$ of the light emitted from the conjugate plane PC is great. As the emission angle $S_{out1}$ becomes greater, the aperture of the emitting surface 33 becomes larger. This is because light having a great emission angle $S_{out1}$ reaches a position away from the optical axis $C_1$ on the emitting surface 33.

On the other hand, the reflecting surface 32 of the light guide projection optical element 3 illustrated in FIG. 6B is inclined with respect to an X-Z plane. The inclination direction of the reflecting surface 32 is the clockwise rotation direction with respect to an X-Z plane as viewed from the +X axis direction.

The reflecting surface 32 is inclined with respect to the traveling direction (+Z axis direction) of light in a direction such that an optical path in the light guide projection optical element 3 becomes wider. The reflecting surface 32 is inclined so that the optical path in the light guide projection optical element 3 becomes wider in the traveling direction (+Z axis direction) of light. Here, the traveling direction of light is the traveling direction of light in the light guide projection optical element 3. Thus, the traveling direction of light is a direction parallel to the optical axis of the light guide projection optical element 3.

In the direction of the optical axis $C_1$ of the emitting surface 33, the reflecting surface 32 is inclined to face toward the emitting surface 33. "Face toward the emitting surface 33" indicates that the reflecting surface 32 can be seen from the emitting surface 33 side (+Z axis direction side).

Light entering through the incident surface 31 is reflected by the reflecting surface 32 and reaches the conjugate plane PC.

The incident angle of the light on the reflecting surface 32 is an incident angle $S_4$. The reflection angle of the light at the reflecting surface 32 is a reflection angle $S_5$. According to the law of reflection, the reflection angle $S_5$ is equal to the incident angle $S_4$. A perpendicular line $m_3$ to the reflecting surface 32 is indicated by a dot-and-dash line in FIG. 6B.

The light is incident on the conjugate plane PC at an incident angle $S_6$. The light is emitted from the conjugate plane PC at an emission angle $S_{out2}$. The emission angle $S_{out2}$ is equal to the incident angle $S_6$. A perpendicular line $m_4$ to the conjugate plane PC is indicated by a dot-and-dash line in FIG. 6B. The perpendicular line $m_4$ to the conjugate plane PC is parallel to the optical axis $C_1$.

The incident angle $S_4$ is greater than the incident angle $S_1$ because of the inclination of the reflecting surface 32. Further, the reflection angle $S_5$ is greater than the reflection angle $S_2$. Thus, the incident angle $S_6$ is less than the incident angle $S_3$. When the inclination angles of light emitted from the conjugate planes PC with respect to the optical axes $C_1$ are compared, the emission angle $S_{out2}$ is less than the emission angle $S_{out1}$.

The reflecting surface 32 is inclined so that the optical path in the light guide projection optical element 3 becomes wider in the traveling direction (+Z axis direction), which can reduce the aperture of the emitting surface 33.

The reflecting surface 32 is inclined to face toward the emitting surface 33 in the direction of the optical axis of the emitting surface 33, which can reduce the aperture of the emitting surface 33.

To make the emission angle $S_{out2}$ less than the emission angle $S_{out1}$, it is also possible to form the reflecting surface 32 into a curved surface shape. Specifically, the reflecting surface 32 is formed by a curved surface such that the optical path becomes wider in the traveling direction (+Z axis direction) of light.

In the direction of the optical axis of the emitting surface 33, the reflecting surface 32 is formed by a curved surface facing toward the emitting surface 33.

The inclination of the reflecting surface 32 functions to decrease the emission angle $S_{out}$ at which light reflected by the reflecting surface 32 is emitted from the conjugate plane PC. Thus, the inclination of the reflecting surface 32 can reduce the aperture of the emitting surface 33, downsizing the headlight module 100. In particular, it contributes to thinning the headlight module 100 in the height direction (Y axis direction).

<Light Distribution Pattern>

In the light distribution pattern of the low beam of the motorcycle headlight device, the cutoff line 91 has a horizontal linear shape. The cutoff line 91 has a linear shape extending in the left-right direction (X axis direction) of the vehicle.

Further, it is necessary that the light distribution pattern of the low beam of the motorcycle headlight device is brightest in a region on the lower side of the cutoff line 91. That is, a region on the lower side of the cutoff line 91 is a high illuminance region.

The conjugate plane PC of the light guide projection optical element 3 and the irradiated surface 9 are in optically conjugate relation with each other. The ridge line portion 321 is located at the lower end (−Y axis direction side) of the region in the conjugate plane PC through which light passes. Thus, the ridge line portion 321 corresponds to the cutoff line 91 of the irradiated surface 9.

The headlight module 100 according to the first embodiment directly projects the light distribution pattern formed on the conjugate plane PC onto the irradiated surface 9. Thus, the light distribution on the conjugate plane PC is projected onto the irradiated surface 9 as it is. Hence, to achieve a light distribution pattern that is brightest in a region on the lower side of the cutoff line 91, it is necessary to form, on the conjugate plane PC, a luminous intensity distribution in which the luminous intensity is highest in a region on the +Y axis direction side of the ridge line portion 321.

Figure 7:
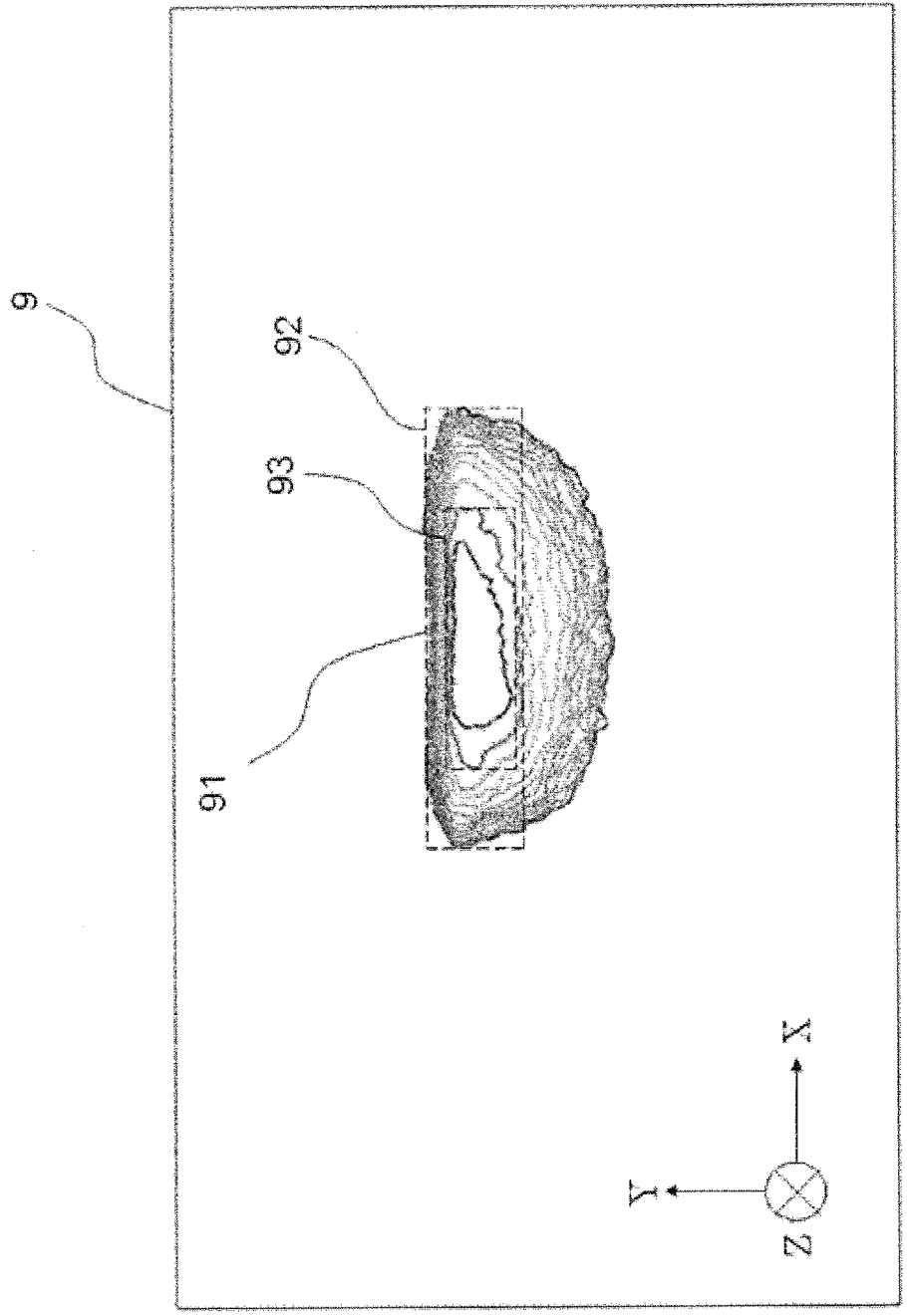
FIG. 7 is a diagram illustrating, in contour display, an illuminance distribution of the headlight module 100 according to the first embodiment.
Figure 8:
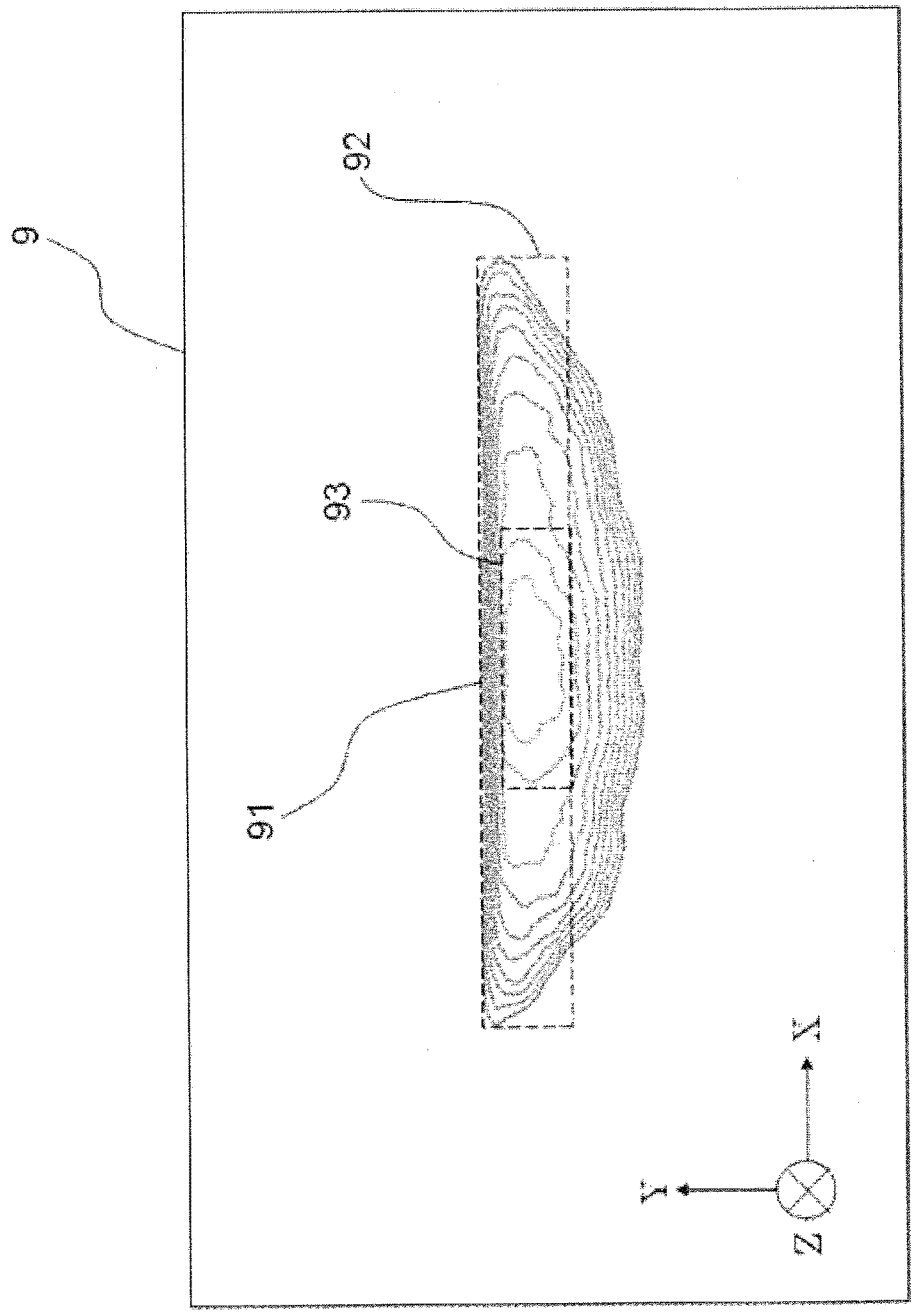
FIG. 8 is a diagram illustrating, in contour display, an illuminance distribution of the headlight module 100 according to the first embodiment.

FIGS. 7 and 8 are diagrams illustrating, in contour display, illuminance distributions of the headlight module 100 according to the first embodiment. FIG. 7 is an illuminance distribution when the light guide projection optical element 3 illustrated in FIG. 2 is used. FIG. 8 is an illuminance distribution when a light guide projection optical element 30 illustrated in FIG. 9 is used. This illuminance distribution is an illuminance distribution projected on the irradiated surface 9 located 25 m ahead (+Z axis direction). Further, this illuminance distribution is obtained by simulation. "Contour display" refers to displaying by means of a contour plot. "Contour plot" refers to a diagram depicting a line joining points of equal value.

As can be seen from FIG. 7, the cutoff line 91 of the light distribution pattern is a sharp straight line. Intervals between contour lines are small on the lower side of the cutoff line 91. The light distribution has a region having the highest illuminance (high illuminance region) 93 near the cutoff line 91.

In FIG. 7, a center of the high illuminance region 93 is located on the +Y axis direction side of a center of the light distribution pattern. In FIG. 7, the entire high illuminance region 93 is on the +Y axis direction side of the center of the light distribution pattern. The center of the light distribution pattern is a center of the light distribution pattern in its width direction and is a center of the light distribution pattern in its height direction.

It can be seen that a region 92 on the lower side (−Y axis direction side) of the cutoff line 91 in the light distribution pattern is brightest. The region 92 on the lower side of the cutoff line 91 in the light distribution pattern includes the brightest region 93 in the light distribution pattern.

FIG. 9 is a perspective view of the light guide projection optical element 30 of the headlight module 100 according to the first embodiment. The incident surface 31 of the light guide projection optical element 30 illustrated in FIG. 9 has negative power in the horizontal direction (X axis direction). The incident surface 31 has a concave shape in the horizontal direction (X axis direction). Also, the incident surface 31 has positive power in the vertical direction (Y axis direction). The incident surface 31 has a convex shape in the vertical direction (Y axis direction).

FIG. 8 is a diagram illustrating, in contour display, an illuminance distribution obtained by using the light guide projection optical element 30 illustrated in FIG. 9. The incident surface 31 has negative power in the horizontal direction. Thus, in the light distribution pattern illustrated in FIG. 8, the width (in the X axis direction) of the light distribution is wide, as compared to the light distribution pattern illustrated in FIG. 7.

Further, in the light distribution pattern illustrated in FIG. 8, the cutoff line 91 is a sharp straight line. Intervals between contour lines are small on the lower side of the cutoff line 91. The light distribution has a region having the highest illuminance (high illuminance region) 93 near the cutoff line 91.

In FIG. 8, a center of the high illuminance region 93 is located on the +Y axis direction side of a center of the light distribution pattern. In FIG. 8, the entire high illuminance region 93 is on the +Y axis direction side of the center of the light distribution pattern.

In the light distribution pattern illustrated in FIG. 8, a region 92 on the lower side (−Y axis direction side) of the cutoff line 91 is illuminated most brightly. The region 92 on the lower side of the cutoff line 91 in the light distribution pattern includes the brightest region 93 in the light distribution pattern.

In FIGS. 7 and 8, the region 92 on the lower side of the cutoff line 91 is located between the center of the light distribution pattern and the cutoff line 91.

As above, by changing the curved surface shape of the incident surface 31 of the light guide projection optical element 3, it is possible to easily form a light distribution pattern. In particular, it is possible to make a region on the lower side of the cutoff line 91 brightest while keeping the sharp cutoff line 91.

To form the cutoff line 91, the headlight module 100 need not use a light blocking plate, which causes reduction in the light use efficiency, as in the conventional headlight device. Further, to provide the high illuminance region in the light distribution pattern, the headlight module 100 needs no complicated optical system. Thus, the headlight module 100 can provide a small and simple headlight device having improved light use efficiency.

The headlight module 100 according to the first embodiment of the present invention is described by taking a low beam of a motorcycle headlight device as an example. However, the present invention is not limited to this. For example, the headlight module 100 is also applicable to a low beam of a headlight device for a motor tricycle or a low beam of a headlight device for a four-wheeled automobile.

FIG. 10 is a schematic diagram illustrating an example of the cross-sectional shape of the light guide projection optical element 3 in the conjugate plane PC. The shape of the ridge line portion 321 may be, for example, a stepped shape as illustrated in FIG. 10. The shape of the ridge line portion 321 illustrated in FIG. 10 is a bent line shape described above.

When viewed from the rear side (−Z axis direction), a ridge line portion $321_a$ on the left side (−X axis direction side) is located above (+Y axis direction) a ridge line portion $321_b$ on the right side (+X axis direction side).

The conjugate plane PC and the irradiated surface 9 are in optically conjugate relation with each other. Thus, the shape of the light distribution pattern on the conjugate plane PC is inverted in the up-down direction and left-right direction and projected on the irradiated surface 9. Thus, on the irradiated surface 9, a cutoff line on the left side in the traveling direction of the vehicle is high and a cutoff line on the right side is low.

This makes it possible to easily form a "rising line" along which the irradiation on a walkway side (left side) rises for identification of pedestrians and signs. This description assumes that the vehicle travels on the left side of a road.

Further, in some vehicles, multiple headlight modules are arranged, and the light distribution patterns of the respective modules are combined to form a light distribution pattern. A light distribution pattern may be formed by arranging multiple headlight modules and combining the light distribution patterns of the respective modules. Even in such a case, the headlight module 100 according to the first embodiment can be easily applied.

In the headlight module 100, by adjusting the curved surface shape of the incident surface 31 of the light guide projection optical element 3, it is possible to change the width and height of the light distribution pattern. It is also possible to change the light distribution.

Further, in the headlight module 100, by adjusting the optical positional relationship between the condensing optical element 2 and the light guide projection optical element 3 or the shape of the incident surface 31 of the light guide projection optical element 3, it is possible to change the width and height of the light distribution pattern. It is also possible to change the light distribution.

Further, by using the reflecting surface 32, it is possible to easily change the light distribution. For example, by changing the inclination angle b of the reflecting surface 32, it is possible to change the position of the high illuminance region.

Further, in the headlight module 100, the shape of the cutoff line 91 can be defined by the shape of the ridge line portion 321 of the light guide projection optical element 3. The light distribution pattern can be formed depending on the shape of the light guide projection optical element 3.

Thus, in particular, it is not necessary that the shapes or the like of the condensing optical elements 2 vary between multiple headlight modules. The condensing optical elements 2 can be common parts. This can reduce the number of types of parts, improving ease of assembly, and reducing manufacturing cost.

Further, the function of arbitrarily adjusting the width and height of the light distribution pattern and the function of arbitrarily adjusting the light distribution may be provided by the headlight module 100 as a whole. The optical components of the headlight module 100 include the condensing optical element 2 and light guide projection optical element 3. The functions can be shared by optical surfaces of the condensing optical element 2 and light guide projection optical element 3 constituting the headlight module 100.

For example, the reflecting surface 32 of the light guide projection optical element 3 may be formed into a curved surface shape to have power and form a light distribution.

However, regarding the reflecting surface 32, it is not necessary that all the light reaches the reflecting surface 32. Thus, when the reflecting surface 32 is shaped, a limited amount of light contributes to the formation of the light distribution pattern. That is, a limited amount of light is reflected by the reflecting surface 32 and gives the effect of the shape of the reflecting surface 32 to the light distribution pattern. To optically affecting all the light to easily change the light distribution pattern, it is preferable to provide the incident surface 31 with power to form the light distribution.

The headlight module 100 includes the light source 1, condensing optical element 2, and light guide projection optical element 3. The light source 1 emits light. The condensing optical element 2 concentrates light emitted from the light source 1. The light guide projection optical element 3 receives light emitted from the condensing optical element 2 through the incident surface 31, reflects the received light by the reflecting surface 32, and emits it from the emitting surface 33. The incident surface 31 is formed by a curved surface for changing the divergence angle of the incident light.

The headlight module 100 includes the light source 1 and optical element 3. The light source 1 emits light. The optical element 3 includes the reflecting surface 32 for reflecting light emitted from the light source 1 and the emitting surface 33 for emitting light reflected by the reflecting surface 32. The emitting surface 33 has positive refractive power. In the direction of the optical axis $C_1$ of the emitting surface 33, the edge portion 321 of the reflecting surface 32 on the emitting surface 33 side includes the point Q located at a focal position of the emitting surface 33.

In the first embodiment, as an example, the optical element 3 is described as the light guide projection optical element 3. Further, as an example, the edge portion 321 is described as the ridge line portion 321.

In the direction of the optical axis $C_1$ of the emitting surface 33, the edge portion 321 of the reflecting surface 32 in the traveling direction of the reflected light includes the point Q located at the focal position of the emitting surface 33.

The reflected light reflected by the reflecting surface 32 has undergone no reflection after entering the optical element 3, except for the reflection by the reflecting surface 32.

The reflected light reflected by the reflecting surface 32 reaches the emitting surface 33 without undergoing further reflection.

The reflected light reflected by the reflecting surface 32 and the light that enters the optical element 3 and is not reflected by the reflecting surface 32 are superposed on the plane PC passing through the point Q located at the focal position on the edge portion 321 and being perpendicular to the optical axis $C_1$ of the emitting surface 33. Thereby, the headlight module 100 forms a high luminous intensity region on the plane PC.

In the direction of the optical axis $C_1$, the reflecting surface 32 is inclined to face toward the emitting surface 33.

The optical element 3 includes the incident portion 31 for receiving light emitted from the light source 1. The incident portion 31 has refractive power.

The incident portion 31 includes a refractive surface 31 having refractive power.

As an example, the incident portion 31 is described as the incident surface 31.

The reflected light reflected by the reflecting surface 32 directly reaches the emitting surface 33.

The reflecting surface 32 is a total reflection surface.

The incident portion 34 is connected to the edge portion 321.

As an example, the incident portion 34 is described as the incident surface 34.

The inside of the optical element 3 is filled with refractive material.

<First Modification Example>

Further, in the headlight module 100 according to the first embodiment of the present invention, the emitting surface 232 of the condensing optical element 2 is a flat surface parallel to a plane perpendicular to the optical axis $C_2$ of the condensing optical element 2. However, the shape of the emitting surface 232 is not limited to the flat surface parallel to the plane perpendicular to the optical axis $C_2$ of the condensing optical element 2.

Figure 12:
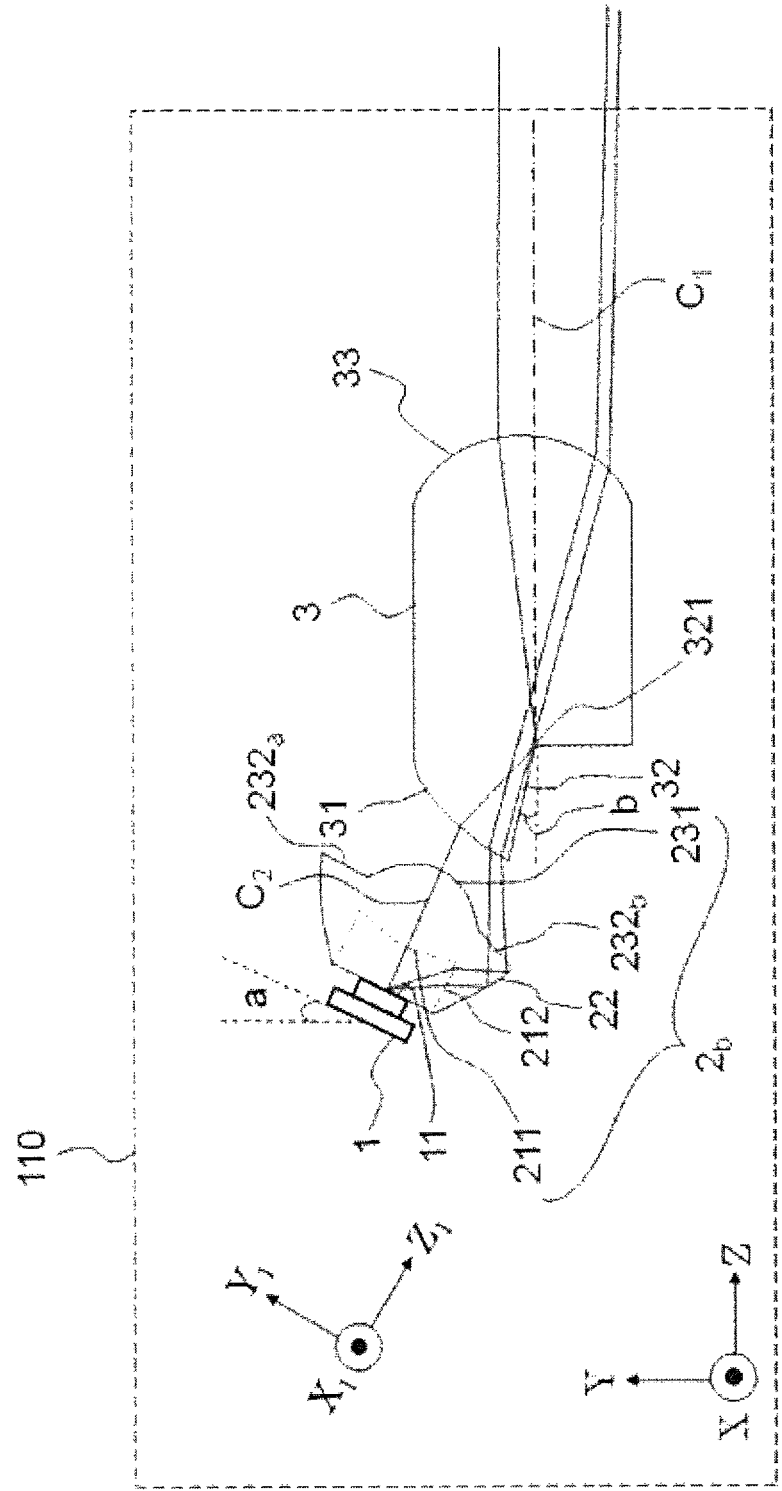
FIG. 12 is a configuration diagram illustrating a configuration of a headlight module 110 according to the first embodiment.

FIGS. 11A and 11B are diagrams illustrating shapes of the condensing optical element 2. FIG. 12 is a configuration diagram illustrating a configuration of a headlight module 110. FIG. 12 illustrates, as an example, a condensing optical element $2_b$ illustrated in FIG. 11B. In the configuration of FIG. 12, a condensing optical element $2_a$ illustrated in FIG. 11A may be employed. In FIGS. 11A, 11B, and 12, the optical axis $C_2$ is parallel to the $Z_1$ axis, and a plane perpendicular to the optical axis $C_2$ is an $X_1$-$Y_1$ plane.

For example, as illustrated in FIG. 11A, the whole of the emitting surface 232 may be inclined with respect to the plane perpendicular to the optical axis $C_2$. Also, as illustrated in FIG. 11B, a part of the emitting surface 232 may be inclined with respect to the plane perpendicular to the optical axis $C_2$.

In FIG. 11A, the emitting surface 232 of the condensing optical element $2_a$ is formed on the same plane. The emitting surface 232 on the same plane is inclined by an angle c with respect to the optical axis $C_2$ of the condensing optical element $2_a$. The emitting surface 232 of FIG. 11A is inclined to face in the $-Y_1$ axis direction. That is, when viewed from the $+X_1$ axis direction, the emitting surface 232 is rotated clockwise by the angle c about an axis parallel to the $X_1$ axis. The dashed line in FIG. 11A represents a plane parallel to an $X_1$-$Y_1$ plane. The $X_1$-$Y_1$ plane is a plane perpendicular to the optical axis $C_2$ of the condensing optical element $2_a$.

In FIG. 11B, the emitting surface 232 of the condensing optical element $2_b$ is not formed on the same plane. The emitting surface 232 has regions $232_a$ and $232_b$.

The region $232_a$ of the emitting surface 232 is formed by a flat surface perpendicular to the optical axis $C_2$. The region $232_a$ is, for example, a region of the emitting surface 232 on the $+Y_1$ axis direction side of the optical axis $C_2$.

The region $232_a$ will be described in a more limited way. When the region $232_a$ is a flat surface perpendicular to the optical axis $C_2$, light emitted from the region $232_a$ reaches the front surface side of the reflecting surface 32. Light reflected by the front surface of the reflecting surface 32 is emitted from the emitting surface 33. Further, light emitted from the emitting surface $232_a$ reaches the incident surface 31.

The front surface of the reflecting surface 32 is a surface for reflecting light of the reflecting surface 32. In the direction of a perpendicular line to the reflecting surface 32, the front surface of the reflecting surface 32 is a surface on the side on which the condensing optical element 2 is located.

On the other hand, the region $232_b$ of the emitting surface 232 is formed by a flat surface inclined by an angle d with respect to a plane perpendicular to the optical axis $C_2$.

The region $232_b$ is, for example, a region of the emitting surface 232 on the $-Y_1$ axis direction side of the optical axis $C_2$.

The region $232_b$ will be described in a more limited way. If the region $232_b$ is a flat surface perpendicular to the optical axis $C_2$, light emitted from the region $232_b$ reaches the back surface side of the reflecting surface 32. Further, light emitted from the emitting surface $232_a$ does not reach the incident surface 31.

The back surface of the reflecting surface 32 is a surface opposite the surface for reflecting light of the reflecting surface 32. In the direction of a perpendicular line to the reflecting surface 32, the back surface of the reflecting surface 32 is a surface on the opposite side of the condensing optical element 2.

The region $232_b$ on the $-Y_1$ axis side of the emitting surface 232 is inclined to face in the $-Y_1$ axis direction. That is, when viewed from the $+X_1$ axis direction, the region $232_b$ on the $-Y_1$ axis side of the emitting surface 232 is rotated clockwise by the angle d about an axis parallel to the $X_1$ axis. The dashed line in FIG. 11B represents a plane parallel to an $X_1$-$Y_1$ plane. The $X_1$-$Y_1$ plane is a plane perpendicular to the optical axis $C_2$ of the condensing optical element $2_b$.

For example, as illustrated in FIGS. 1A and 1B, the light source 1 and condensing optical element 2 are arranged so that the respective optical axes are inclined in the $-Y$ axis direction with respect to the Z axis. When viewed from the $+X$ axis direction, the light source 1 and condensing optical element 2 are rotated clockwise about an axis parallel to the X axis. In the first embodiment, to facilitate explanation, the optical axis of the light source 1 and the optical axis $C_2$ of the condensing optical element 2 are coaxial. That is, the optical axis of the light source 1 and the optical axis $C_2$ of the condensing optical element 2 coincide with each other.

In such a case, it is difficult to cause all of the light emitted from the region corresponding to the region $232_b$ of the condensing optical element 2 to enter the light guide projection optical element 3. This is because, for example, in the case of FIGS. 1A and 1B, the position in the Y axis direction of the end portion on the $-Y_1$ axis direction side of the region corresponding to the region $232_b$ is located on the $-Y$ axis direction side of the position in the Y axis direction of the end portion on the $-Z$ axis direction side of the reflecting surface 32. The region $232_b$ is a region of the emitting surface 232 on the $-Y_1$ axis direction side of the optical axis $C_2$. The region $232_b$ is a region located at a lower end portion (end portion on the $-Y_1$ axis side) of the condensing optical element 2.

However, as illustrated in FIG. 12, by inclining the region $232_b$ of the condensing optical element 2 with respect to the optical axis $C_2$, light is refracted in the $+Y_1$ axis direction. A light concentration position of light emitted from the region $232_b$ is shorter than a light concentration position of light emitted from the region $232_a$. "Light concentration position" refers to a position at which a light beam emitted from an emitting surface is smallest.

That is, a light concentration position of light emitted from the emitting surface 232 (region $232_a$) located on the front surface side of the reflecting surface 32 of the emitting surface 232 of the condensing optical element 2 is closer to the condensing optical element 2 than a light concentration position of light emitted from the emitting surface 232 (region $232_b$) located on the back surface side of the reflecting surface 32.

It is possible to cause light, which would not enter the light guide projection optical element 3 if the region $232_b$ were not provided, to enter the light guide projection optical element 3. This can improve the light use efficiency.

The region $232_b$ of the first modification example is rotated clockwise by the angle d about an axis parallel to the $X_1$ axis, as viewed from the $+X_1$ axis direction. However, this is not mandatory, and the region $232_b$ may be rotated counterclockwise by an angle d about an axis parallel to the $X_1$ axis, as viewed from the $+X_1$ axis direction.

For example, suppose that the position in the Y axis direction of the end portion on the $-Y_1$ axis direction side of the region $232_b$ is located on the $+Y$ axis direction side of the position in the Y axis direction of the end portion on the $-Z$ axis direction side of the reflecting surface 32. That is, suppose that the end portion on the $-Y_1$ axis direction side of the region $232_b$ is located on the +Y axis direction side of the end portion on the −Z axis direction side of the reflecting surface 32.

To irradiate the reflecting surface 32 with a large amount of light to improve the light use efficiency, the region $232_b$ needs to be rotated counterclockwise by an angle d about an axis parallel to the $X_1$ axis, as viewed from the $+X_1$ axis direction. This is because light is refracted in the $-Y_1$ axis direction when exiting the region $232_b$, and thus a large amount of light reaches the reflecting surface 32.

The headlight module 100 includes the condensing optical element 2 for concentrating light emitted from the light source 1. In a light beam entering the optical element 3 from the condensing optical element 2, in a normal direction of the reflecting surface 32, a focal length of the condensing optical element 2 with respect to a first light ray at the end on the front surface side of the reflecting surface 32 is longer than a focal length of the condensing optical element 2 with respect to a second light ray at the end on the side opposite to the first light ray.

In the first embodiment, as an example, the optical element 3 is described as the light guide projection optical element 3. Further, as an example, the light beam entering the optical element 3 from the light source 1 enters through the incident surface 31.

In the first embodiment, the front surface of the reflecting surface 32 is a surface for reflecting light. Further, in the first modification example, the first light ray is described as a light ray emitted from an end portion on the $+Y_1$ axis side of the region $232_a$. The second light ray is described as a light ray emitted from an end portion on the $-Y_1$ axis side of the region $232_b$.

<Second Modification Example>

Further, the first embodiment of the present invention describes a case where the single headlight module 100 includes the single light source 1 and the single condensing optical element 2. However, the number of light sources 1 in the single headlight module is not limited to one. The number of condensing optical elements 2 in the headlight module is also not limited to one. A light source 1 and a condensing optical element 2 will be collectively referred to as a light source module 15.

Figure 13:
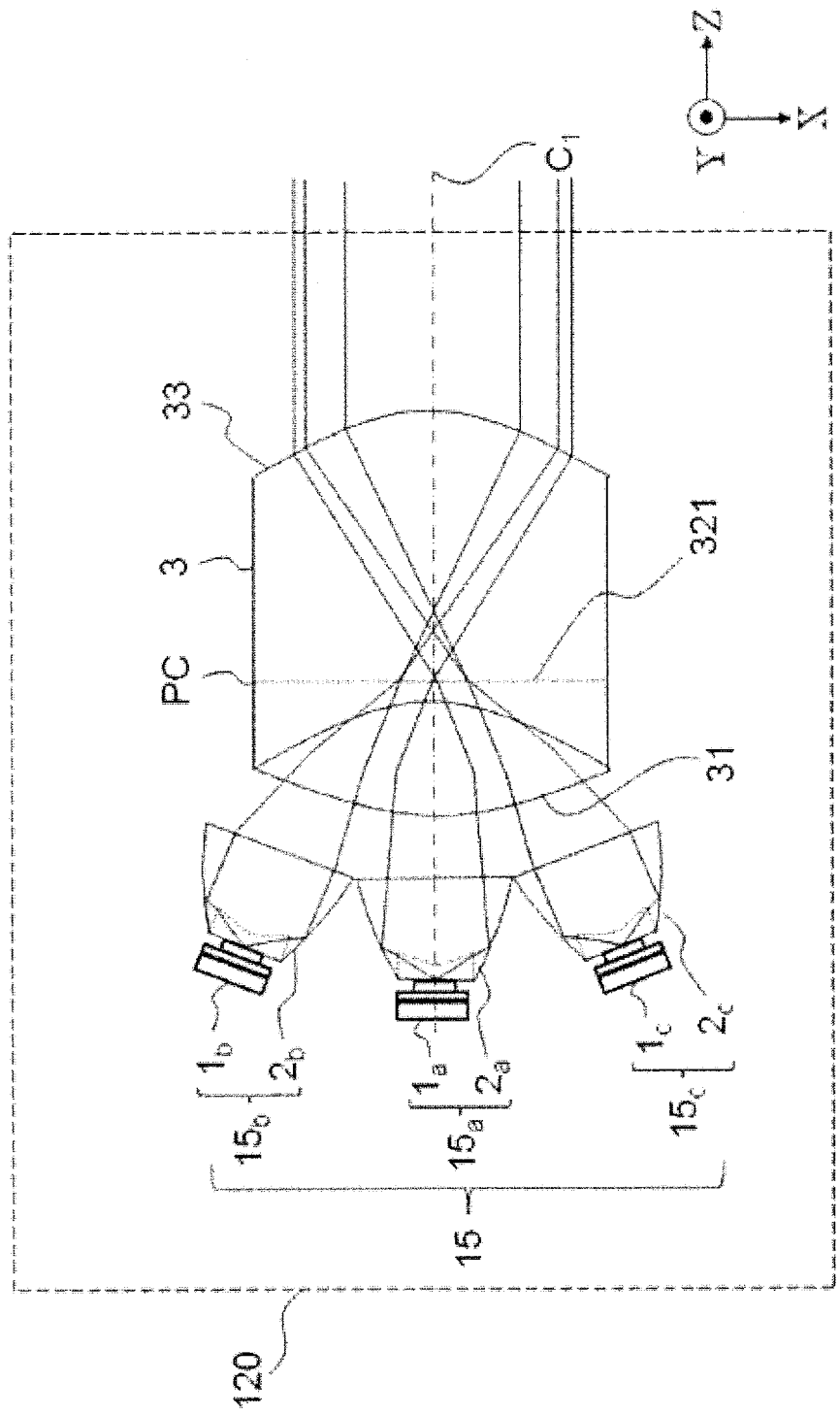
FIG. 13 is a configuration diagram illustrating a configuration of a headlight module 120 according to the first embodiment.

FIG. 13 is a configuration diagram illustrating a configuration of a headlight module 120 according to the first embodiment. FIG. 13 is a diagram of the headlight module 120 as viewed from the +Y axis direction.

For example, the headlight module 120 illustrated in FIG. 13 includes three light source modules 15. A light source module $15_a$ includes a light source $1_a$ and a condensing optical element $2_a$. A light source module $15_b$ includes a light source $1_b$ and a condensing optical element $2_b$. A light source module $15_c$ includes a light source $1_c$ and a condensing optical element $2_c$.

The light source modules $15_a$, $15_b$, and $15_c$ will be collectively referred to as the light source modules 15. Also, when features common to the light source modules $15_a$, $15_b$, and $15_c$ are described, each of them will be referred to as the light source module 15.

When viewed from the Y axis direction, the light source $1_a$ and condensing optical element $2_a$ are disposed on the optical axis $C_1$ of the light guide projection optical element 3. When viewed from the X axis direction, the optical axis $C_2$ of the condensing optical element 2 is inclined with respect to the optical axis $C_1$, so the light source $1_a$ and condensing optical element $2_a$ are not disposed on the optical axis $C_1$. The light source $1_a$ and condensing optical element $2_a$ constitute the light source module $15_a$.

The light source $1_b$ is disposed on the −X axis side of the light source $1_a$. The condensing optical element $2_b$ is disposed on the −X axis side of the condensing optical element $2_a$. The light source $1_b$ and condensing optical element $2_b$ constitute the light source module $15_b$. The light source module $15_b$ is disposed on the −X axis side of the light source module $15_a$.

The light source $1_c$ is disposed on the +X axis side of the light source $1_a$. The condensing optical element $2_c$ is disposed on the +X axis side of the condensing optical element $2_a$. The light source $1_c$ and condensing optical element $2_c$ constitute the light source module $15_c$. The light source module $15_c$ is disposed on the +X axis side of the light source module $15_a$.

Light emitted from the light source $1_a$ passes through the condensing optical element $2_a$ and enters the light guide projection optical element 3 through the incident surface 31. When viewed from the Y axis direction, a position in the X axis direction at which the light is incident on the incident surface 31 coincides with a position of the optical axis $C_1$ of the light guide projection optical element 3. The light entering through the incident surface 31 is reflected by the reflecting surface 32. The light reflected by the reflecting surface 32 is emitted from the emitting surface 33. When viewed from the Y axis direction, a position in the X axis direction at which the light is emitted from the emitting surface 33 coincides with a position of the optical axis $C_1$ of the light guide projection optical element 3.

Light emitted from the light source $1_b$ passes through the condensing optical element $2_b$ and enters the light guide projection optical element 3 through the incident surface 31. When viewed from the Y axis direction, a position in the X axis direction at which the light is incident on the incident surface 31 is on the −X axis side of the optical axis $C_1$ of the light guide projection optical element 3. The light entering through the incident surface 31 is reflected by the reflecting surface 32. The light reflected by the reflecting surface 32 is emitted from the emitting surface 33. When viewed from the Y axis direction, a position in the X axis direction at which the light is emitted from the emitting surface 33 is on the +X axis side of the optical axis $C_1$ of the light guide projection optical element 3.

Light emitted from the light source $1_b$ passes through the condensing optical element $2_b$ and enters the light guide projection optical element 3 through the incident surface 31. When viewed from the Y axis direction, a position in the X axis direction at which the light is incident on the incident surface 31 is on the +X axis side of the optical axis $C_1$ of the light guide projection optical element 3. The light entering through the incident surface 31 is reflected by the reflecting surface 32. The light reflected by the reflecting surface 32 is emitted from the emitting surface 33. When viewed from the Y axis direction, a position in the X axis direction at which the light is emitted from the emitting surface 33 is on the −X axis side of the optical axis $C_1$ of the light guide projection optical element 3.

The configuration illustrated in FIG. 13 can spread the light beam passing through the conjugate plane PC, in the horizontal direction (X axis direction). Since the conjugate plane PC and irradiated surface 9 are in conjugate relation with each other, the width of the light distribution pattern in the horizontal direction can be increased.

Such a configuration makes it possible to increase the amount of light without providing multiple headlight modules 100 or 110. The headlight module 120 can downsize a headlight device 10. The headlight module 120 can also easily achieve a light distribution wide in the horizontal direction.

Further, in FIG. 13, the multiple light source modules 15 are arranged in the horizontal direction (X axis direction). However, the multiple light source modules 15 may be arranged in the vertical direction (Y axis direction). For example, light source modules 15 are arranged in two levels in the Y axis direction. This can increase the amount of light of the headlight module 120.

Further, by performing control for individually turning on or off the light sources $1_a$, $1_b$, and $1_c$, it is possible to select an illuminated area in front of the vehicle. Thus, it is possible to provide the headlight module 120 with a light distribution change function. That is, the headlight module 120 can have a function of changing the light distribution.

For example, when a vehicle turns right or left at an intersection, a light distribution wider in the direction in which the vehicle turns than the light distribution of a typical low beam is required. In such a case, by performing control for individually turning on or off the light sources $1_a$, $1_b$, and $1_c$, it is possible to obtain an optimum light distribution corresponding to the traveling situation. The driver can obtain better visibility in the traveling direction by changing the light distribution of the headlight module 120.

Second Embodiment

Figure 14:
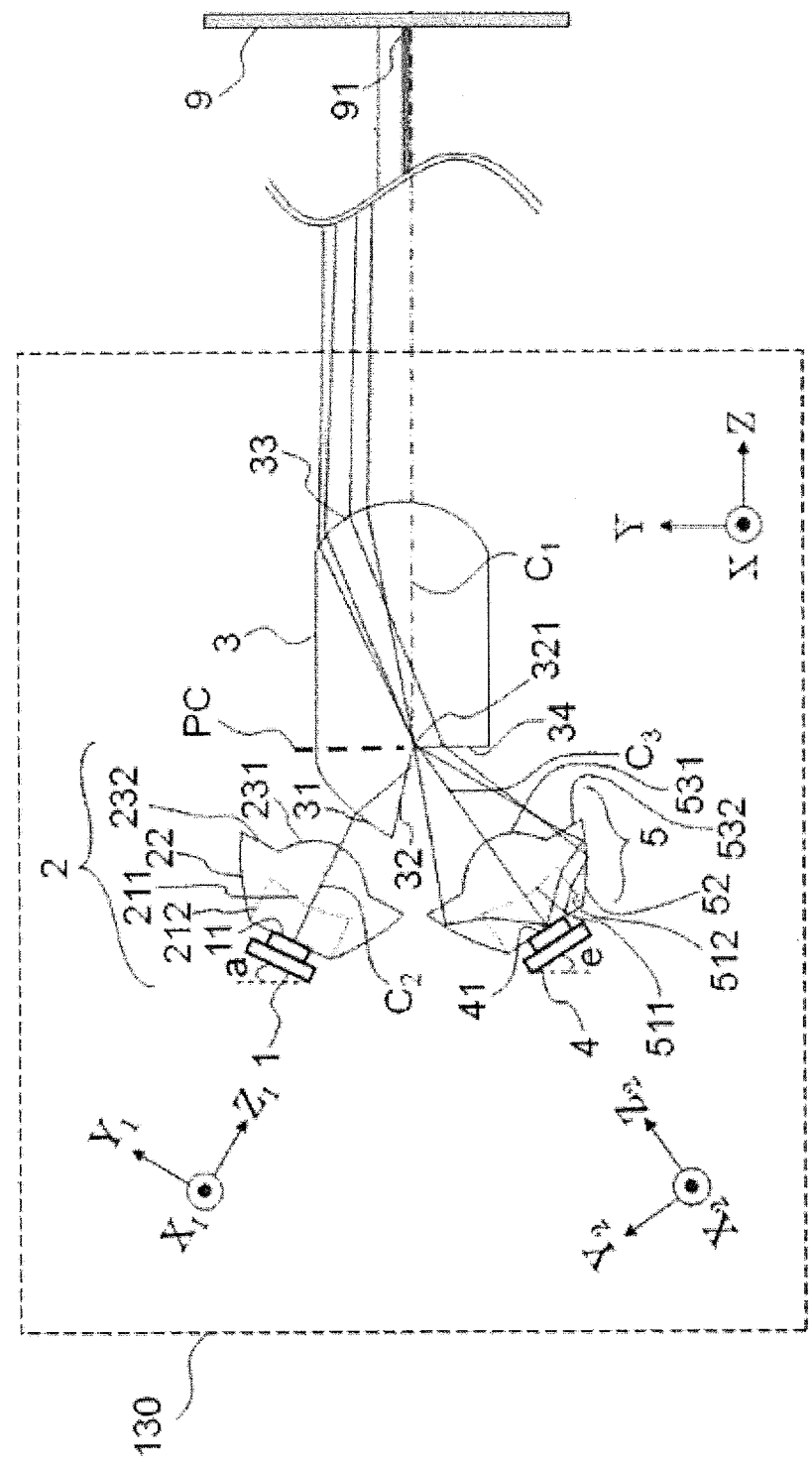
FIG. 14 is a configuration diagram illustrating a configuration of a headlight module 130 according to a second embodiment.

FIG. 14 is a configuration diagram illustrating a configuration of a headlight module 130 according to a second embodiment of the present invention. Elements that are the same as in FIGS. 1A and 1B will be given the same reference characters, and descriptions thereof will be omitted. The elements that are the same as in FIGS. 1A and 1B are the light source 1, condensing optical element 2, and light guide projection optical element 3.

As illustrated in FIG. 14, the headlight module 130 according to the second embodiment includes the light source 1, light guide projection optical element 3, and a light source 4. The headlight module 130 may include the condensing optical element 2 or a condensing optical element 5. The headlight module 130 according to the second embodiment differs from the headlight module 100 according to the first embodiment in having the light source 4 and condensing optical element 5.

In the headlight module 130, the condensing optical element 2 may be mounted to the light source 1 to form a unit. Further, in the headlight module 130, the condensing optical element 5 may be mounted to the light source 4 to form a unit.

As one of the road traffic rules, a predetermined light distribution pattern for a vehicle high beam has a horizontally long shape narrow in an up-down direction. To improve visibility for a driver, it illuminates a road surface (e.g., 100 m or more) in front of the automobile farther than a headlight for passing each other.

Thus, the high beam needs to illuminate an area on the upper side (+Y axis direction side) of the cutoff line 91 of the light distribution pattern of the headlight for passing each other. The headlight for passing each other and headlight for traveling illuminate different areas and thus have different light distribution patterns. The headlight for traveling is also referred to as the high beam.

The low beam and high beam have different light distribution patterns as described above, so they need different optical systems. That is, different headlight modules are required for the low beam and high beam. This enlarges a headlight device.

The headlight module 130 according to the second embodiment solves such a problem. The headlight module 130 provides a small and simple headlight module having a low beam function and a high beam function.

The light source 4 and condensing optical element 5 are arranged so that their optical axes are inclined in the +Y axis direction by an angle e. "Their optical axes are inclined in the +Y axis direction" indicates that when viewed from the +X axis direction, their optical axes are rotated counterclockwise about the X axis.

To facilitate explanation of the light source 4 and condensing optical element 5, $X_2Y_2Z_2$-coordinates will be used as a new coordinate system. The $X_2Y_2Z_2$-coordinates are coordinates obtained by rotating the XYZ-coordinates counterclockwise about the X axis by the angle e when viewed from the +X axis direction.

<Light Source 4>

The light source 4 includes a light emitting surface 41. The light source 4 emits light for illuminating an area in front of the vehicle from the light emitting surface 41.

The light source 4 is located on the $-Z_2$ axis side of the condensing optical element 2. The light source 1 is located on the $-Z$ axis side (in back) of the light guide projection optical element 3. The light source 1 is located on the $-Y$ axis side (lower side) of the light guide projection optical element 3.

In FIG. 14, the light source 4 emits light in the $+Z_2$ axis direction. The light source 4 may be of any type, but the following description will be made on the assumption that the light source 4 is an LED, as described above.

<Condensing Optical Element 5>

The condensing optical element 5 is located on the $+Z_2$ axis side of the light source 4. The condensing optical element 5 is also located on the $-Z_2$ axis side of the light guide projection optical element 3. The condensing optical element 5 is located on the $-Z$ axis side (in back) of the light guide projection optical element 3. The condensing optical element 5 is located on the $-Y$ axis side (lower side) of the light guide projection optical element 3.

The condensing optical element 5 receives light emitted from the light source 4. The condensing optical element 5 concentrates light forward ($+Z_2$ axis direction). In FIG. 14, the condensing optical element 5 has positive power.

The inside of the condensing optical element 5 described in the second embodiment is filled with refractive material, for example.

In FIG. 14, the condensing optical element 5 consists of the single condensing optical element 5, but may use multiple optical elements. However, use of multiple optical elements reduces manufacturability due to reasons, such as ensuring the accuracy of positioning of each optical element.

The condensing optical element 5 includes, for example, incident surfaces 511 and 512, a reflecting surface 52, and emitting surfaces 531 and 532.

In the second embodiment, an optical axis $C_3$ of the condensing optical element 5 is parallel to the $Z_2$ axis. The optical axis $C_3$ of the condensing optical element 5 coincides with an optical axis of the light source 4.

The detailed configuration and function of the condensing optical element 5 are the same as those of the condensing optical element 2. Thus, the description of the condensing optical element 2 in the first embodiment applies to the condensing optical element 5. However, optical properties, such as a focal length, of the condensing optical element 5 may be different from those of the condensing optical element 2.

The light source 4 and condensing optical element 5 are disposed on the lower side (−Y axis direction side) of the light guide projection optical element 3. The light source 4 and condensing optical element 5 are also disposed in back (on the −Z axis direction side) of the light guide projection optical element 3. In the headlight module 130 according to the second embodiment, as illustrated in FIG. 14, the condensing optical element 5 is disposed on the lower side (−Y axis direction side) of the condensing optical element 2. Further, in the headlight module 130, the light source 4 is disposed on the lower side (−Y axis direction side) of the light source 1.

<Behavior of Light Rays>

As illustrated in FIG. 14, light concentrated by the condensing optical element 5 is incident on the incident surface 34 of the light guide projection optical element 3. The incident surface 34 is a refractive surface. In FIG. 14, the incident surface 34 has a planar shape. The light incident on the incident surface 34 is refracted at the incident surface 34. The light incident on the incident surface 34 is emitted from the emitting surface 33.

The inside of the light guide projection optical element 3 described in the second embodiment is filled with refractive material, for example.

The incident surface 34 is in a conjugate relation with the irradiated surface 9. That is, the incident surface 34 is located at a position optically conjugate to the irradiated surface 9. Thus, an image of a light distribution pattern formed on the incident surface 34 by the condensing optical element 5 is magnified and projected by the light guide projection optical element 3 onto the irradiated surface 9 in front of the vehicle.

The incident surface 34 is located on the lower side (−Y axis direction side) of the ridge line portion 321. Thus, the image of the light distribution pattern formed on the incident surface 34 is projected on the upper side (+Y axis direction side) of the cutoff line 91 on the irradiated surface 9. Thus, the light source 4 and condensing optical element 5 can illuminate an area to be illuminated by the high beam.

Further, by adjusting a light concentration position of the light emitted from the condensing optical element 5 as illustrated in FIG. 14, the light distribution of the high beam can be changed. Further, by adjusting the geometric relationship between the condensing optical element 5 and the light guide projection optical element 3, the light distribution of the high beam can be changed.

"Adjusting the geometric relationship" refers to, for example, adjusting the positional relationship between the condensing optical element 5 and the light guide projection optical element 3 in the direction (Z axis direction) of the optical axis $C_1$. Depending on the positional relationship between the condensing optical element 5 and the light guide projection optical element 3 in the direction of the optical axis $C_1$, the size of the light concentration spot of light concentrated by the condensing optical element 5 on the incident surface 34 varies. That is, the light beam diameter of light concentrated by the condensing optical element 5 on the incident surface 34 varies. Accordingly, the light distribution on the irradiated surface 9 varies.

In the above example, the incident surface 34 is located on the conjugate plane PC. However, the incident surface 34 may be located on the −Z axis direction side of the conjugate plane PC. That is, the conjugate plane PC is located on the +Z axis side of the incident surface 34. The conjugate plane PC is located inside the light guide projection optical element 3.

In such a configuration, an image of a light distribution pattern formed on the conjugate plane PC on the lower side (−Y axis direction side) of the ridge line portion 321 can be controlled with the shape of the incident surface 34.

For example, the incident surface 34 has a curved surface shape having positive power. Light emitted from the condensing optical element 5 is concentrated at the ridge line portion 321. In such a case, a light distribution pattern in which a region on the upper side (+Y axis side) of the cutoff line 91 is illuminated most brightly is obtained.

As such, by changing the shape of the incident surface 34, it is possible to easily control the light distribution pattern of the high beam.

As above, according to the headlight module 130 of the second embodiment, both of the light distribution pattern of the low beam and the light distribution pattern of the high beam can be easily formed by a single headlight module. Thus, it is not necessary to separately provide a headlight module for the high beam and a headlight module for the low beam. This makes it possible to provide a small headlight device as compared to a conventional headlight device.

In the above description, the headlight module 130 according to the second embodiment, which is a single headlight module, includes the single light source 4 and the single condensing optical element 5. However, the number of light sources 4 in a single module is not limited to one. Also, the number of condensing optical elements 5 in a single module is not limited to one. As in the case of the headlight module 120 of the second modification example according to the first embodiment, multiple light sources 4 and multiple condensing optical elements 5 may be arranged.

With such a configuration, in which multiple light sources 4 and multiple condensing optical elements 5 are arranged, the amount of light can be increased without providing multiple headlight modules 130. Thus, the entire headlight device 10 can be downsized. In a configuration in which multiple light sources 4 and multiple condensing optical elements 5 are arranged, the horizontal direction (X axis direction) and the vertical direction (Y axis direction) can be selected, as in the first embodiment.

Further, with a configuration in which multiple light sources 4 and multiple condensing optical elements 5 are arranged in the horizontal direction (X axis direction), the headlight module 130 can easily achieve formation of a light distribution wide in the horizontal direction.

Further, by performing control for individually turning on or off the light sources 4, it is possible to select an illuminated area in front of the vehicle. Thus, it is possible to provide the headlight module 130 with an adaptive driving beam (ADB) function. "ADB" refers to a headlight that, when an oncoming vehicle or the like appears in front of the vehicle, detects the position of the vehicle in front by an in-vehicle camera or the like and illuminates the other region with the high beam without illuminating the region. The ADB makes it easy to perceive pedestrians on both sides of the road, without dazzling an oncoming vehicle or a preceding vehicle. When the ADB is used, it looks like an ordinary low beam and is not dazzling as viewed front an oncoming vehicle.

The headlight module 130 includes the light source 4 that emits light, in addition to the headlight module 100. The optical element 3 includes the incident portion 34 located on the back surface side of the reflecting surface 32. Light emitted from the light source 4 enters the optical element 3 through the incident portion 34.

In the second embodiment, as an example, the optical element 3 is described as the light guide projection optical element 3. Further, as an example, the incident portion 34 is described as the incident surface 34.

The incident portion 34 is connected to the edge portion 321.

As an example, the edge portion 321 is described as the ridge line portion 321.

<Modification Example>

In the headlight module 130 according to the second embodiment of the present invention, the incident surface 34 of the light guide projection optical element 3 is a flat surface parallel to a plane perpendicular to the optical axis $C_1$. However, the shape of the incident surface 34 is not limited to such a shape.

Figure 15:
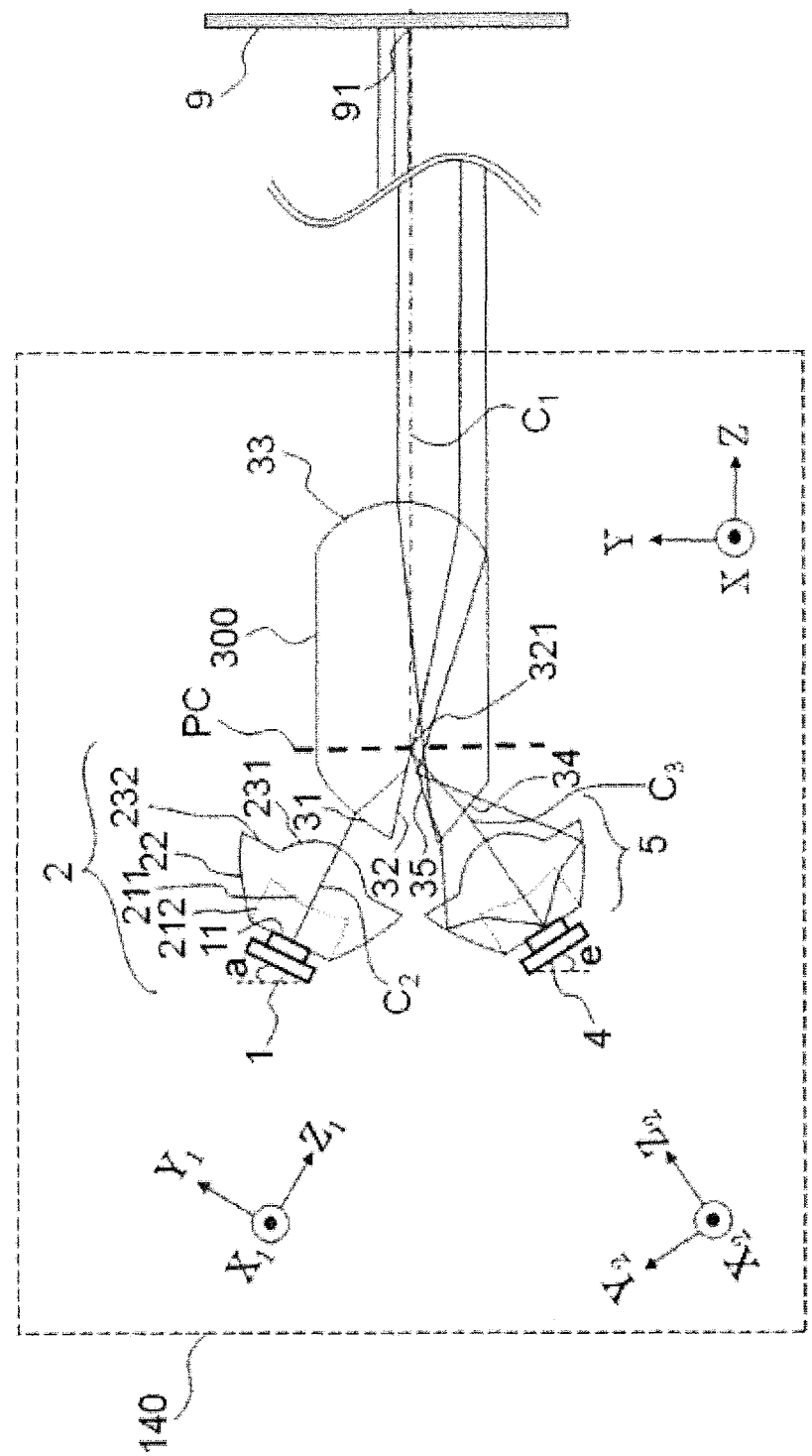
FIG. 15 is a configuration diagram illustrating a configuration of a headlight module 140 according to the second embodiment.

FIG. 15 is a configuration diagram illustrating a configuration of a headlight module 140 according to the second embodiment. FIG. 15 is a diagram of the headlight module 140 as viewed from the +X axis direction.

For example, a light guide projection optical element 300 of the headlight module 140 illustrated in FIG. 15 includes an incident surface 34 and a reflecting surface 35.

In FIG. 15, the reflecting surface 35 is located on the −Y axis direction side of the reflecting surface 32. The reflecting surface 35 is located on the back surface side of the reflecting surface 32.

The reflecting surface 35 is a surface facing in the −Y axis direction. A front surface of the reflecting surface 35 is a surface facing in the −Y axis direction. A back surface of the reflecting surface 35 and the back surface of the reflecting surface 32 face each other.

The reflecting surface 35 is inclined counterclockwise with respect to a Z-X plane, as viewed from the +X axis direction.

In FIG. 15, an end portion on the +Z axis side of the reflecting surface 35 is connected to the ridge line portion 321. An end portion on the +Y axis side of the reflecting surface 35 is connected to the ridge line portion 321.

The incident surface 34 is located at an end portion on the −Z axis direction side of the light guide projection optical element 300. The incident surface 34 is located on a part on the −Y axis direction side of the light guide projection optical element 300.

In FIG. 15, the incident surface 34 is inclined counterclockwise with respect to an X-Y plane, as viewed from the +X axis direction.

In FIG. 15, an end portion on the +Y axis side of the incident surface 34 is connected to an end portion on the −Y axis side of the reflecting surface 35. The end portion on the +Y axis side of the incident surface 34 is also connected to an end portion on the −Z axis side of the reflecting surface 35. An end portion on the −Z axis side of the incident surface 34 is connected to the end portion on the −Z axis side of the reflecting surface 35. The end portion on the −Z axis side of the incident surface 34 is also connected to the end portion on the −Y axis side of the reflecting surface 35.

As illustrated in FIG. 15, light passing through the condensing optical element 5 is incident on the incident surface 34. A position in the X axis direction at which the light is incident on the incident surface 34 coincides with the position of an optical axis $C_1$ of the light guide projection optical element 300, as viewed from the Y axis direction, for example.

Light entering through the incident surface 34 is reflected by the reflecting surface 35. The reflecting surface 35 may reflect part of the light entering through the incident surface 34. The reflecting surface 35 may reflect all of the light entering through the incident surface 34.

The light reflected by the reflecting surface 35 is emitted from the emitting surface 33. A position in the X axis direction at which the light is emitted from the emitting surface 33 coincides with the position of the optical axis $C_1$ of the light guide projection optical element 300, as viewed from the Y axis direction, for example.

With the configuration of the headlight module 140 illustrated in FIG. 15, an image of a light distribution pattern formed on the conjugate plane PC on the lower side (−Y axis direction side) of the ridge line portion 321 can be controlled with the shape of the incident surface 34 and the shape of the reflecting surface 35.

For example, the incident surface 34 has a curved surface shape having positive power. Light emitted from the condensing optical element 5 is concentrated at the ridge line portion 321. In such a case, a light distribution pattern in which a region on the upper side (+Y axis side) of the cutoff line 91 is illuminated most brightly is obtained. As such, by providing the reflecting surface 35 in addition to the incident surface 34, control of the light distribution becomes easy.

As such, by providing the light guide projection optical element 300 with the incident surface 34 and reflecting surface 35 and changing the shapes of the respective surfaces, it is possible to easily control the light distribution pattern of the high beam.

In the above description, the ridge line 321 of the light guide projection optical element 3 or 300 has the shape of a cutoff line specified by a regulation. However, the ridge line 321 is not limited to this.

For example, in the headlight module 130 or 140, to illuminate a region on the lower side (−Y axis side) of the cutoff line 91 by the light source 4, the ridge line 321 of the light guide projection optical element 3 or 300 may be located on the +Y axis direction side of a position corresponding to the position of a cutoff line 91 specified by a regulation.

Thereby, a region to be illuminated by the low beam can be illuminated by the light source 4 for the high beam. Thus, in traveling with the high beam, a road surface originally illuminated by the low beam is illuminated more brightly. Thus, visibility for the driver can be further improved.

The optical element 300 includes the reflecting surface 35 located on the back surface side of the reflecting surface 32. Light entering through the incident portion 34 is reflected by the reflecting surface 35.

In the second embodiment, as an example, the optical element 300 is described as the light guide projection optical element 300. Further, as an example, the incident portion 34 is described as the incident surface 34.

In the second embodiment, the back surface side is described as the −Y axis side.

The reflecting surface 35 is connected to the edge portion 321.

As an example, the edge portion 321 is described as the ridge line portion 321.

Third Embodiment

Figure 16:
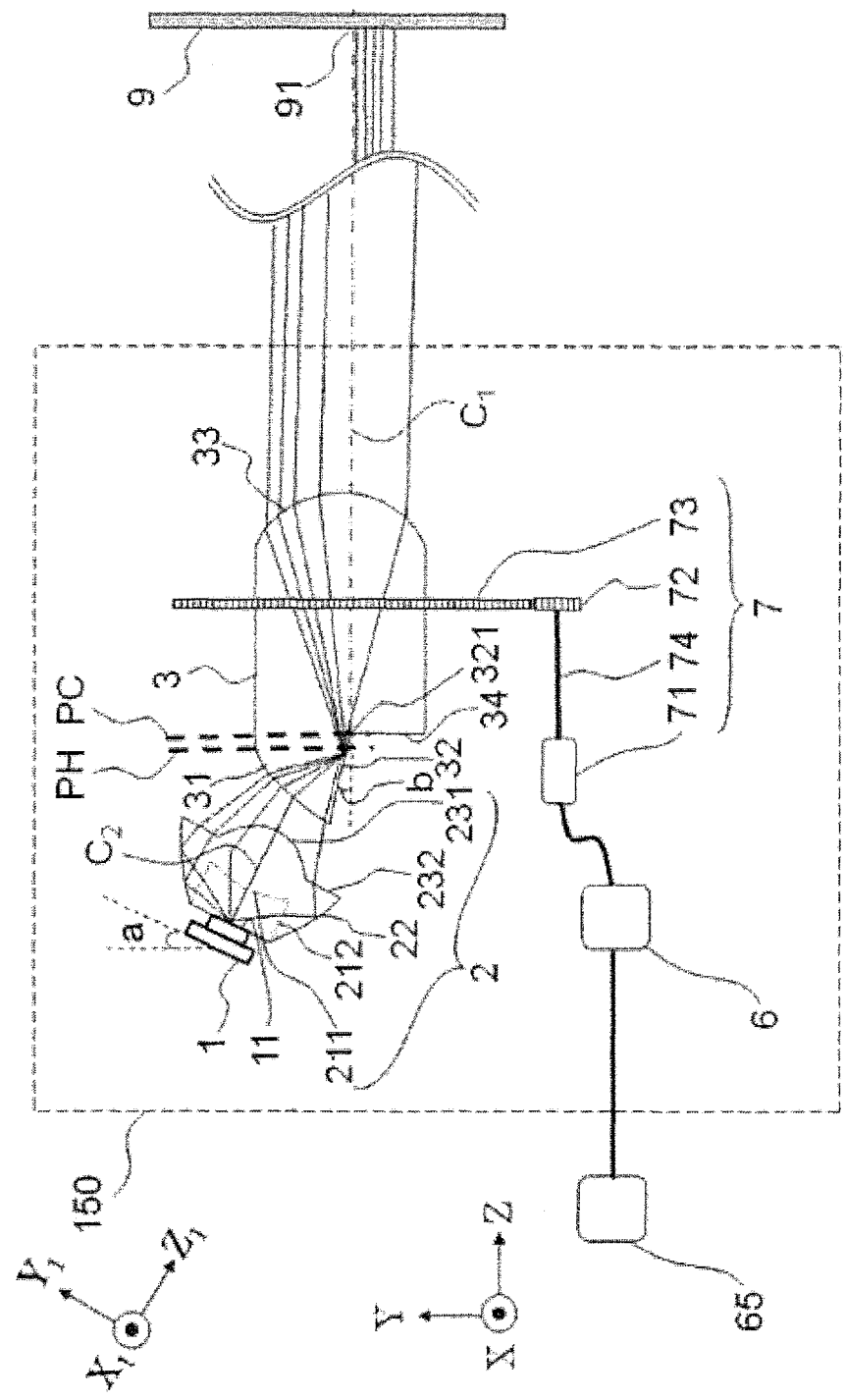
FIG. 16 is a configuration diagram illustrating a configuration of a headlight module 150 according to a third embodiment.

FIG. 16 is a configuration diagram illustrating a configuration of a headlight module 150 according to a third embodiment of the present invention. Elements that are the same as in FIGS. 1A and 1B will be given the same reference characters, and descriptions thereof will be omitted. The elements that are the same as in FIGS. 1A and 1B are the light source 1, condensing optical element 2, and light guide projection optical element 3.

As illustrated in FIG. 16, the headlight module 150 of the third embodiment includes the light source 1, the light guide projection optical element 3, a rotation mechanism 7, and a control circuit 6. The headlight module 150 may include the condensing optical element 2.

The rotation mechanism 7 rotates the light guide projection optical element 3 about the optical axis $C_1$. Alternatively, the rotation mechanism 7 rotates the light source 1, condensing optical element 2, and light guide projection optical element 3 as a unit about the optical axis $C_1$. The headlight module 150 according to the third embodiment differs from the headlight module 100 according to the first embodiment in having the rotation mechanism 7 and control circuit 6.

The rotation mechanism 7 rotates the light guide projection optical element 3 about the optical axis $C_1$. By fixing the light source 1 and condensing optical element 2 to the light guide projection optical element 3, the rotation mechanism 7 can rotate the light source 1 and condensing optical element 2 about the optical axis $C_1$ together with the light guide projection optical element 3.

<Tilt of Vehicle Body and Tilt of Light Distribution Pattern>

In general, when a motorcycle corners, if its vehicle body tilts, the headlight device tilts together with the vehicle body. Thus, there is a problem in that a corner area toward which the driver's gaze is directed is not sufficiently illuminated.

"Corner area" refers to an illumination area in the traveling direction of the vehicle when the vehicle is turning. The corner area is an area in the traveling direction toward which the driver's gaze is directed. Typically, the corner area is an area on the left or right side of an illumination area when the vehicle travels straight.

When the vehicle turns left, the corner area is an area on the left side of an illumination area when the vehicle travels straight. When the vehicle turns right, the corner area is an area on the right side of the illumination area when the vehicle travels straight.

Figure 17A:
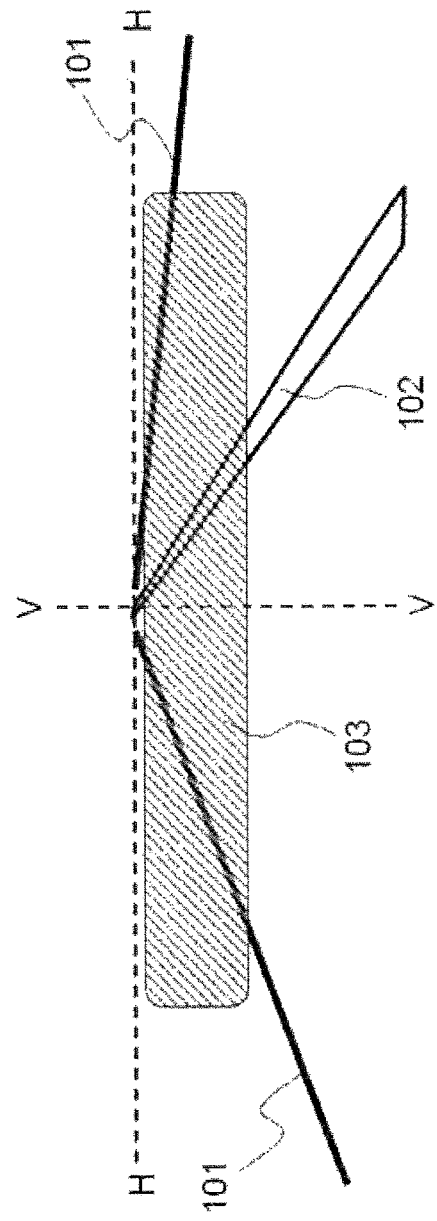
FIGS. 17A and 17B are schematic diagrams illustrating light distribution patterns 103 and 104 of a motorcycle.
Figure 17B:
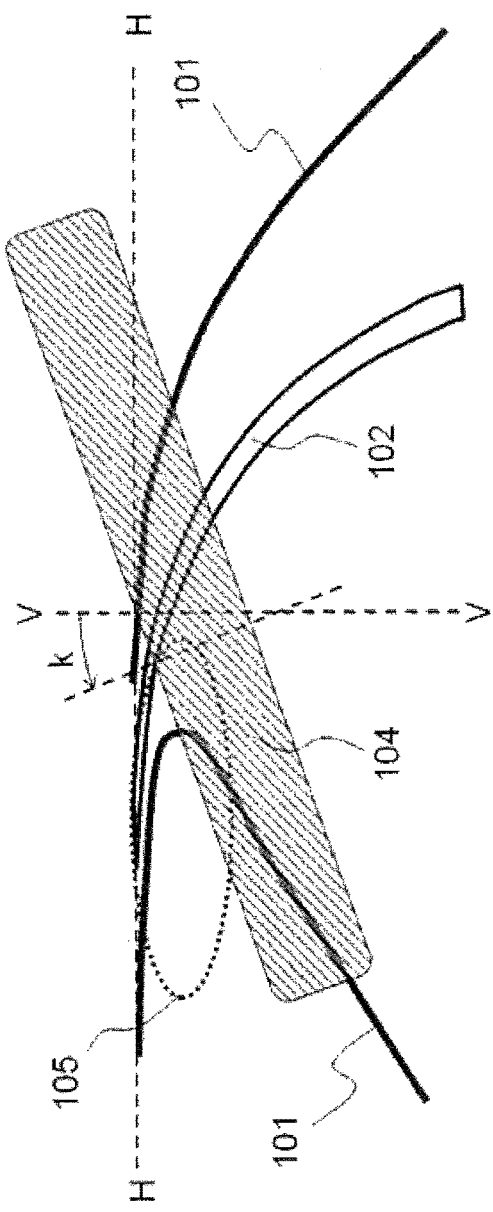

FIGS. 17A and 17B are schematic diagrams illustrating light distribution patterns 103 and 104 of the motorcycle. FIG. 17A illustrates the light distribution pattern 103 in a situation where the motorcycle travels without tilting the vehicle body. That is, FIG. 17A illustrates the light distribution pattern 103 in a situation where the motorcycle travels straight. FIG. 17B illustrates the light distribution pattern 104 in a situation where the motorcycle travels while tilting the vehicle body to the left. That is, FIG. 17B illustrates the light distribution pattern 104 in a situation where the motorcycle turns left.

In FIGS. 17A and 17B, the motorcycle is traveling in a left lane. The line H-H represents the horizon line. The line V-V represents a line perpendicular to the line H-H (horizon line) at a position of the vehicle body. Since the motorcycle travels in the left lane, the center line 102 is located on the right side of the line V-V. Further, the lines 101 represent parts of the left edge and right edge of the road surface. The motorcycle illustrated in FIG. 17B is cornering while tilting the vehicle body to the left by a tilt angle k with respect to the line V-V.

The light distribution pattern 103 illustrated in FIG. 17A is wide in the horizontal direction and illuminates a predetermined area without waste. Here, "predetermined area" refers to, for example, a light distribution area or the like specified by road traffic rules or the like. However, the light distribution pattern 104 illustrated in FIG. 17B is radiated while being tilted in such a manner that the left side is down and the right side is up. At this time, an area in the traveling direction toward which the driver's gaze is directed is a corner area 105. In FIG. 17B, the corner area 105 is on the left side of the line V-V and in contact with the line H-H below the line H-H. In FIG. 17B, the corner area 105 is represented by a dashed line.

A typical headlight device is fixed to a vehicle body. Thus, when the vehicle corners, on the road (in FIG. 17B, left side) in the traveling direction, the headlight device illuminates an area below the road surface. Thus, the corner area 105 is not sufficiently illuminated and is dark.

Figure 18:
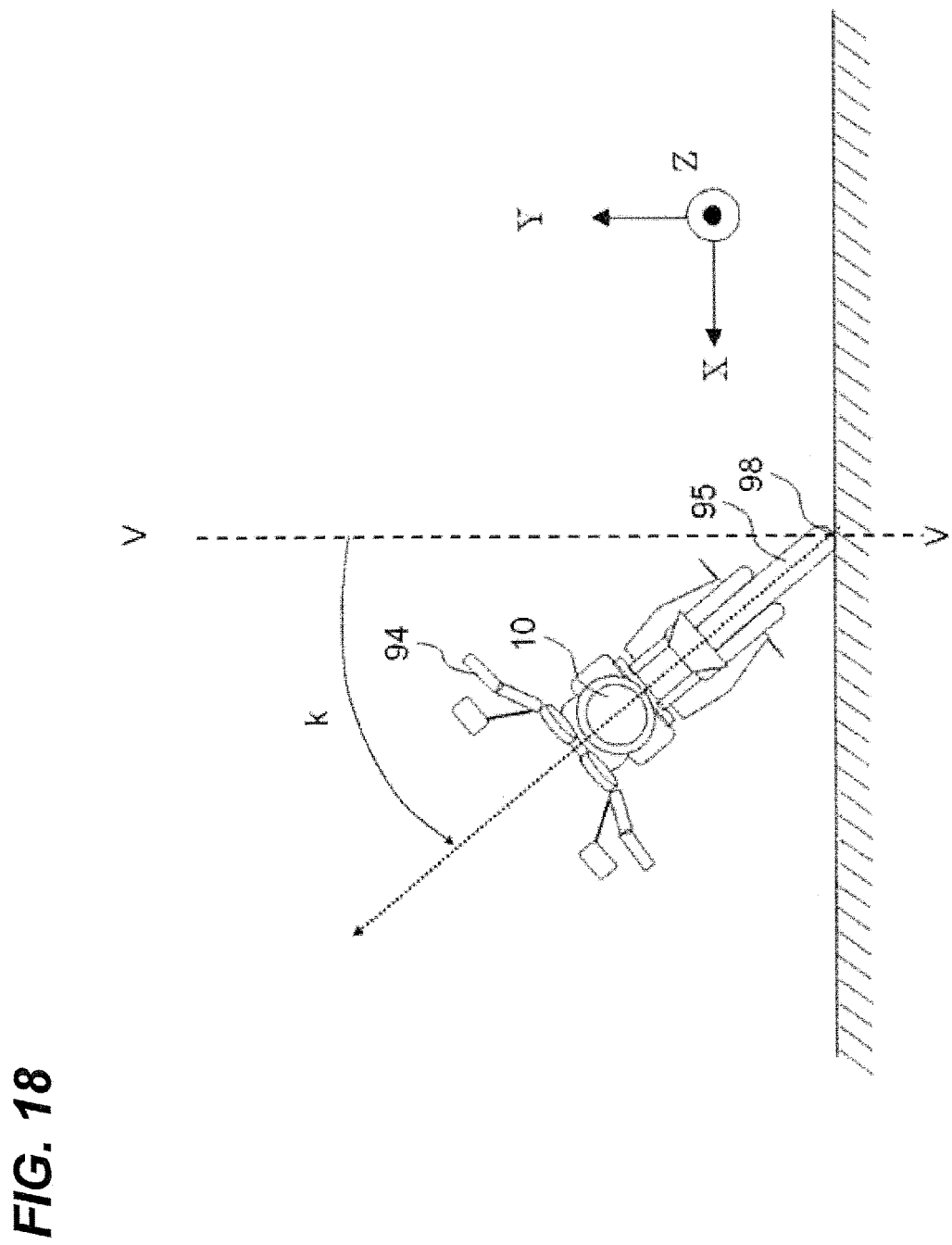
FIG. 18 is a schematic diagram illustrating a state in which a vehicle body of a motorcycle 94 is tilted.

Further, when the vehicle corners, on the road (in FIG. 17B, right side) in a direction opposite to the traveling direction, the typical headlight device illuminates a position above the road surface. Thus, the headlight device FIG. 18 is an explanatory diagram illustrating the tilt angle k of the vehicle body. FIG. 18 is a schematic diagram illustrating a state in which the vehicle body of the motorcycle 94 is tilted, as viewed from the front of the motorcycle 94. The motorcycle 94 rotates to the left or right about a position 98 at which a wheel 95 makes contact with the ground. The tilt angle k of the vehicle body relative to the line V-V of the motorcycle is referred to as the bank angle. The tilt direction of the vehicle body is also referred to as the "bank direction."

FIG. 18 illustrates a state in which the motorcycle 94 is tilted by the tilt angle k to the right with respect to the traveling direction. In FIG. 18, the motorcycle 94 is rotated counterclockwise by the angle k about the position 98 at which the wheel 95 makes contact with the ground, as viewed from the +Z axis direction. In this case, it can be seen that the headlight device 10 is also tilted by the tilt angle k.

The headlight module 150 according to the third embodiment solves such a problem with small and simple structure.

<Configuration of Headlight Module 150>

As illustrated in FIG. 16, the rotation mechanism 7 of the headlight module 150 according to the third embodiment supports the light guide projection optical element 3 rotatably about the optical axis $C_1$.

The rotation mechanism 7 includes, for example, a stepping motor 71, gears 72 and 73, and a shaft 74. The stepping motor 71 may be replaced with, for example, a DC motor or the like.

The control circuit 6 sends a control signal to the stepping motor 71. The control circuit 6 controls a rotation angle and a rotation speed of the stepping motor 71.

The control circuit 6 is connected to a vehicle body tilt sensor 65 for detecting the tilt angle k of the motorcycle 94. The vehicle body tilt sensor 65 is, for example, a sensor, such as a gyro, or the like.

The control circuit 6 receives a signal of the tilt angle k of the vehicle body detected by the vehicle body tilt sensor 65. The control circuit 6 performs calculation based on the detected signal to control the stepping motor 71.

If the motorcycle 94 is tilted by the tilt angle k, the control circuit 6 rotates the light guide projection optical element 3 by the angle k in a direction opposite to the tilt direction of the vehicle body. The direction in which the light guide projection optical element 3 is rotated is opposite to the tilt direction of the vehicle body.

The gear 73 is mounted on the light guide projection optical element 3 to surround the light guide projection optical element 3. That is, the gear 73 is disposed around the light guide projection optical element 3. In FIG. 16, the gear 73 is disposed to surround the light guide projection optical element 3. However, the gear 73 may be disposed at a part of the circumference of the light guide projection optical element 3.

A rotational axis of the gear 73 coincides with the optical axis $C_1$ of the light guide projection optical element 3.

The shaft 74 coincides with a rotational axis of the stepping motor 71. The shaft 74 is mounted to a rotation shaft of the stepping motor 71. The shaft 74 is disposed in parallel with the optical axis $C_1$ of the light guide projection optical element 3.

The gear 72 is mounted on the shaft 74. A rotational axis of the gear 72 coincides with the shaft 74. The gear 72 meshes with the gear 73.

Since the rotation mechanism 7 is configured in this manner, as the rotation shaft of the stepping motor 71 rotates, the shaft 74 rotates. As the shaft 74 rotates, the gears 72 rotates. As the gear 72 rotates, the gear 73 rotates. As the gear 73 rotates, the light guide projection optical element 3 rotates about the optical axis $C_1$. The rotation angle of the light guide projection optical element 3 depends on the numbers of teeth of the gears 72 and 73 or the like.

The rotation mechanism 7 is not limited to the above and may be other rotation mechanisms.

The conjugate plane PC of the light guide projection optical element 3 is in an optically conjugate relation with the irradiated surface 9. Thus, if the light guide projection optical element 3 is rotated about the optical axis $C_1$, the light distribution pattern illuminating the irradiated surface 9 is also rotated by the same rotational amount as that of the light guide projection optical element 3. Further, the rotational direction of the light distribution pattern is the same as the rotational direction of the light guide projection optical element 3.

Thus, by rotating the light guide projection optical element 3 in a direction opposite to the tilt direction of the vehicle body by the same amount as the tilt angle k, it is possible to correctly compensate the tilt of the light distribution pattern due to the tilt of the vehicle body of the motorcycle 94.

FIGS. 19A and 19B are schematic diagrams illustrating cases where the light distribution pattern is corrected by the headlight module 150. FIG. 19A illustrates a case of cornering to the left while traveling in the left lane. FIG. 19B illustrates a case of cornering to the right while traveling in the left lane. As described above, the control circuit 6 rotates, for example, the light distribution pattern 104 illustrated in FIG. 17B, in accordance with the tilt angle k of the vehicle body.

The light distribution pattern 106 in FIG. 19A is obtained by rotating the light distribution pattern 104 illustrated in FIG. 17B by the tilt angle k clockwise as viewed in the traveling direction.

The light distribution pattern 106 in FIG. 19B is obtained by rotating the light distribution pattern 104 by the tilt angle k counterclockwise as viewed in the traveling direction. In the case of FIG. 19B, before rotation of the light guide projection optical element 3, the light distribution pattern 104 was radiated while being tilted in such a manner that the right side is down and the left side is up, contrary to the case of FIG. 17B.

Whether the vehicle body tilts to the left or right, the headlight module 150 can provide the same light distribution pattern 106 as in the case where the vehicle body is not tilted, as a result.

In this manner, the headlight module 150 according to the third embodiment rotates the light guide projection optical element 3 in accordance with the tilt angle k of the vehicle body. Thereby, the tilted light distribution pattern on the conjugate plane PC rotates about a rotational axis of the light guide projection optical element 3.

In the third embodiment, the rotational axis of the light guide projection optical element 3 coincides with the optical axis $C_1$ of the light guide projection optical element 3.

The emitting surface 33 of the light guide projection optical element 3 magnifies and projects light of the rotated light distribution pattern 106. The light distribution pattern 104 on the irradiated surface 9 is rotated in accordance with the light distribution pattern on the conjugate plane PC.

Thereby, the headlight module 150 can illuminate an area (corner area 105) in the traveling direction toward which the driver's gaze is directed. Further, since the light guide projection optical element 3, which is relatively small as compared to a conventional optical component, is rotated, it is possible to drive it with a small driving force, as compared to a case of rotating a light source and a large lens that are provided in a conventional headlight device. Further, it becomes unnecessary to rotatably support a large-diameter lens. From these, the rotation mechanism 7 can be downsized.

Further, the headlight module 150 according to the third embodiment rotates the light guide projection optical element 3 about the optical axis $C_1$ by the angle k in a direction opposite to the tilt direction in accordance with the tilt angle k of the vehicle body. However, this is not mandatory, and the rotation angle may be an angle other than the tilt angle k of the vehicle body.

For example, the light guide projection optical element 3 may be rotated about the optical axis $C_1$ by an angle greater than the tilt angle k. Thus, the light distribution pattern can be intentionally tilted as necessary, instead of being always horizontal.

For example, by tilting the light distribution pattern so as to raise the corner area 105 side of the light distribution, it is possible to make it easy for the driver to observe an area in the traveling direction of the vehicle. Further, for example, in the case of a left hand corner, by tilting the light distribution pattern so as to lower a side opposite to the corner area 105 side of the light distribution, it is possible to reduce dazzling of an oncoming vehicle due to projection light.

In the third embodiment, the light guide projection optical element 3 is rotated about the optical axis $C_1$. However, the light guide projection optical element 3 may be rotated about an axis other than the optical axis $C_1$.

For example, one end of the rotational axis may pass through the emitting surface 33. Further, the other end of the rotational axis may pass through a surface formed by the incident surface 31, reflecting surface 32, and incident surface 34. In this manner, an axis passing through the surfaces at both ends in a direction of the optical axis $C_1$ of the light guide projection optical element 3 may be set as the rotational axis. This rotational axis is inclined with respect to the optical axis $C_1$.

However, when the rotational axis coincides with the optical axis $C_1$, since the rotational axis of the light distribution pattern can be set to the optical axis $C_1$, the control of the light distribution is easy.

In the example described in the third embodiment, the rotation mechanism 7 and control circuit 6 are added to the headlight module 100 of the first embodiment. However, the rotation mechanism 7 and control circuit 6 may be added to the headlight modules 110, 120, 130, 140, 160, 170, 180, and 190 described in the other embodiments.

In the third embodiment, the vehicle is described as the two-wheeler. However, the headlight module 150 is applicable to a three-wheeled vehicle that allows most of the vehicle body including a front wheel and a driver seat to be tilted in the left-right direction.

The headlight module 150 is also applicable to a four-wheeled vehicle. For example, when it corners to the left, the vehicle body tilts to the right. Further, when it corners to the right, the vehicle body tilts to the left. This is due to centrifugal force. In this respect, it is opposite in the bank direction to a two-wheeler. However, a four-wheeled vehicle may also detect the bank angle of the vehicle body to correct the irradiated area. Further, when the vehicle body tilts because, for example, only a wheel or wheels on one side drive over an obstacle or the like, it is also possible to obtain the same irradiated area as when the vehicle body is not tilted.

Fourth Embodiment

FIGS. 20A and 20B are configuration diagrams illustrating a configuration of a headlight module 160 according to a fourth embodiment of the present invention. Elements that are the same as in FIGS. 1A and 1B will be given the same reference characters, and descriptions thereof will be omitted. The elements that are the same as in FIGS. 1A and 1B are the light source 1 and condensing optical element 2.

As illustrated in FIGS. 20A and 20B, the headlight module 160 according to the fourth embodiment includes the light source 1 and a light guide projection optical element 301. The headlight module 160 may also include the condensing optical element 2. The headlight module 160 differs from the headlight module 100 according to the first embodiment in having the light guide projection element 301 in place of the light guide projection element 3. The light guide projection element 301 differs in shape from the light guide projection element 3.

<Loss Light L>

In the headlight module 100, part or all of the light entering through the incident surface 31 of the light guide projection element 3 is reflected by the reflecting surface 32 and emitted from the emitting surface 33. If only part of the light entering through the incident surface 31 is reflected by the reflecting surface 32, the other of the light entering through the incident surface 31 needs to be directly emitted from the emitting surface 33 without being reflected by the reflecting surface 32. Here, "the other of the light" refers to the light that is not reflected by the reflecting surface 32.

However, to cause the other of the light entering through the incident surface 31 to reach the emitting surface 33, the emitting surface 33 needs to have a large diameter. If the emitting surface 33 has a small diameter, the other of the light entering through the incident surface 31 reaches a bottom surface 39 of the light guide projection optical element. Light that is not emitted from the emitting surface 33, such as light that is not reflected by the reflecting surface 32 and passes through the bottom surface 39, becomes loss light.

Figure 21:
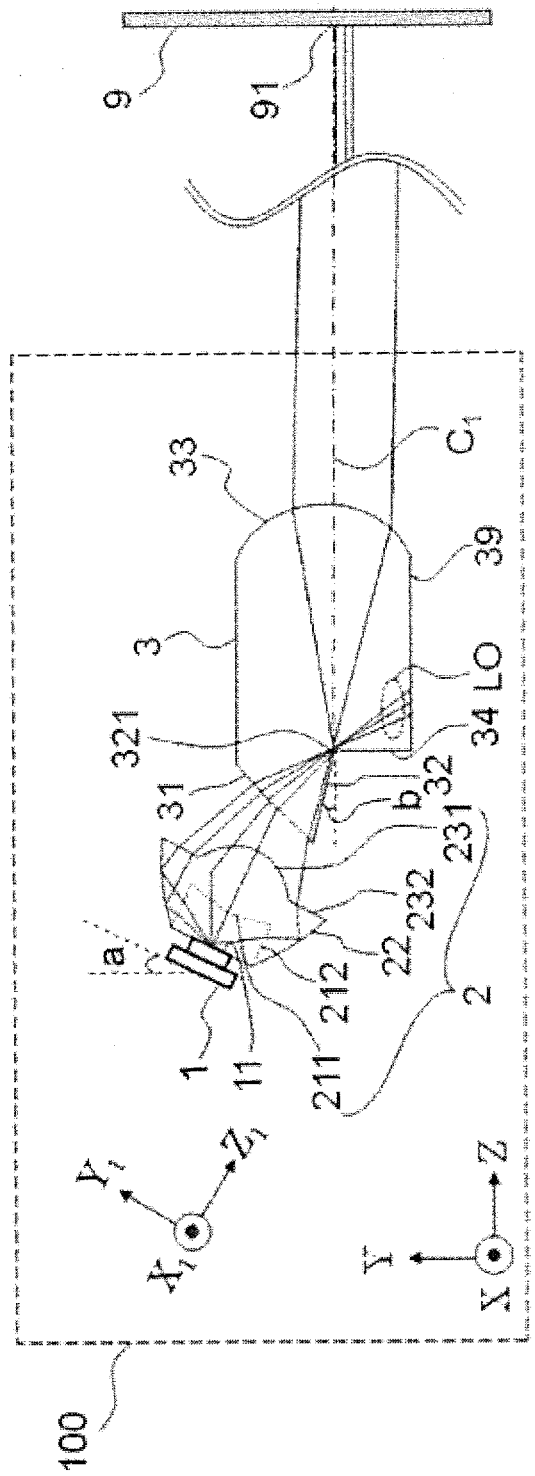
FIG. 21 is a diagram for explaining loss light LO of the headlight module 100.

FIG. 21 is a diagram for explaining loss light LO of the headlight module 100. As illustrated in FIG. 21, part of the light passing through the +Z axis direction side of the end portion (ridge line 321) on the +Z axis side of the reflecting surface 32 reaches the bottom surface 39; or light passing through the +Z axis direction side of the end portion (ridge line 321) on the +Z axis side of the reflecting surface 32 reaches the bottom surface 39.

Such light reaching the bottom surface 39 occurs when the height (length in the Y axis direction) of the emitting surface 33 is insufficient. This is because, if the emitting surface 33 has a large diameter, the light passing through the +Z axis direction side of the end portion (ridge line 321) on the +Z axis side of the reflecting surface 32 does not reach the bottom surface 39 and is emitted from the emitting surface 33.

Light reaching the bottom surface 39 without reaching the emitting surface 33 is not emitted from the emitting surface 33, so it is loss light LO. That is, the light reaching the bottom surface 39 without reaching the emitting surface 33 is not effective light for the light distribution of the headlight.

The loss light LO is, for example, light passing through the bottom surface 39. The loss light LO is, for example, light that is reflected by the bottom surface 39 and emitted from the portion other than the emitting surface 33.

The headlight module 160 according to the fourth embodiment solves such a problem. The headlight module 160 provides a small and simple headlight module having reduced loss light LO and high light use efficiency.

<Light Guide Projection Element 301>

Figure 22:
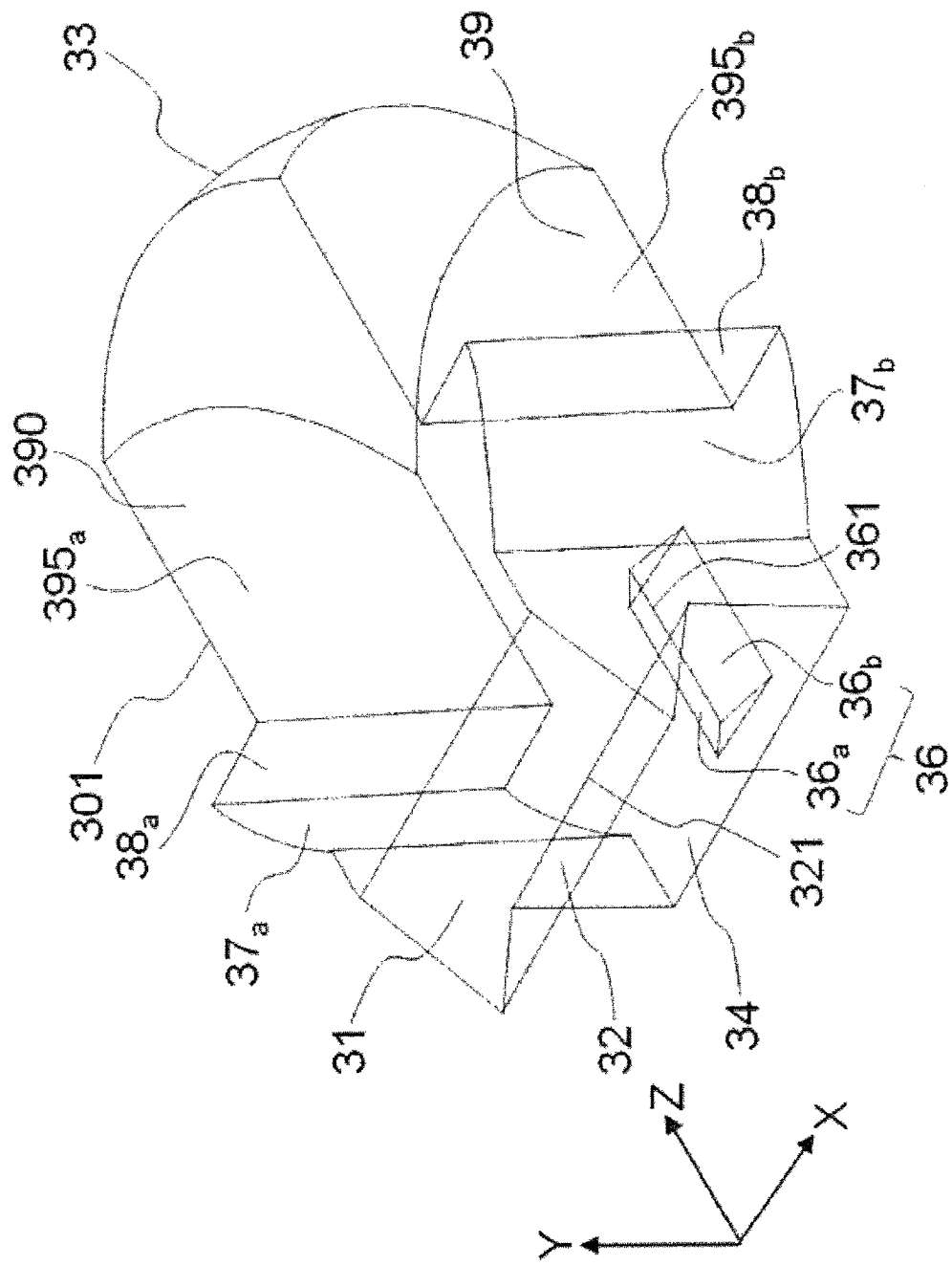
FIG. 22 is a perspective view of a light guide projection optical element 300 of the headlight module 160 according to the fourth embodiment.

FIG. 22 is a perspective view of the light guide projection optical element 301. The light guide projection optical element 301 includes the reflecting surface 32, the emitting surface 33, reflecting surfaces 36, and reflecting surfaces 37. The light guide projection optical element 301 may include the incident surface 31, emitting surfaces 38, or the bottom surface 39.

The reflecting surfaces 36 collectively represent a reflecting surface $36_a$ and a reflecting surface $36_b$. The reflecting surfaces 37 collectively represent a reflecting surface $37_a$ and a reflecting surface $37_b$. The emitting surfaces 38 collectively represent an emitting surface $38_a$ and an emitting surface $38_b$.

The light guide projection optical element 301 has a shape obtained by adding the reflecting surfaces 36, reflecting surfaces 37, and emitting surfaces 38 to the shape of the light guide projection optical element 3. Elements that are the same as those of the light guide projection optical element 3 will be given the same reference characters, and descriptions thereof will be omitted. The elements that are the same as those of the light guide projection optical element 3 are the incident surfaces 31 and 34, reflecting surface 32, and emitting surface 33. The bottom surface 39 of the light guide projection optical element 301 is the same as the bottom surface 39 of the light guide projection optical element 3, which is not described in the description of the light guide projection optical element 3. In an example described below, the incident surface 31 of the light guide projection optical element 301 is a flat surface having no power.

The fourth embodiment is applicable to the light guide projection optical element 300 described in the modification example of the second embodiment.

The light guide projection optical element 301 receives light emitted from the condensing optical element 2. The light guide projection optical element 301 emits the received light in the forward direction (+Z axis direction).

The light guide projection optical element 301 is made of transparent resin, glass, silicone material, or the like.

The inside of the light guide projection optical element 301 illustrated in the fourth embodiment is filled with refractive material.

The reflecting surfaces 36 have a concave shape obtained by hollowing out the bottom surface 39 of the light guide projection optical element 301. The reflecting surfaces 36 have a concave shape as viewed from the −Y axis direction.

The reflecting surfaces 36 are formed by, for example, two surfaces (the reflecting surfaces $36_a$ and $36_b$) with a ridge line portion 361 therebetween. The two surfaces (reflecting surfaces $36_a$ and $36_b$) of the reflecting surfaces 36 and the bottom surface 39 has a triangular shape as viewed from the Z axis direction. The two surfaces (reflecting surfaces $36_a$ and $36_b$) correspond to two sides of the triangular shape. The ridge line portion 361 corresponds to the vertex between the two sides.

In FIG. 22, the lengths of the two surfaces (reflecting surfaces $36_a$ and $36_b$) in the X axis direction are equal to each other. In FIG. 22, the two surfaces (reflecting surfaces $36_a$ and $36_b$) of the reflecting surfaces 36 and the bottom surface 39 have an isosceles triangular shape as viewed from the Z axis direction. However, the above shape is not mandatory, and the two surfaces (reflecting surfaces $36_a$ and $36_b$) of the reflecting surfaces 36 may have different shapes and sizes. The two surfaces (reflecting surfaces $36_a$ and $36_b$) may be curved surfaces.

The reflecting surfaces 37 are, for example, reflecting surfaces formed on side surfaces 395 of the light guide projection optical element 301. The "side surfaces" are surfaces formed on sides in the X axis direction of the light guide projection optical element 301. When a surface opposite the bottom surface 39 is referred to as the top surface 390, the side surfaces 395 are surfaces extending in a direction of the optical axis $C_1$ and joining the bottom surface 39 and the top surface 390.

The reflecting surface $37_a$ is a reflecting surface formed in a side surface $395_a$ on the −X axis side of the light guide projection optical element 301. The reflecting surface $37_b$ is a reflecting surface formed in a side surface $395_b$ on the +X axis side of the light guide projection optical element 301.

The reflecting surfaces 37 are located between the incident surface 31 and the emitting surface 33 in the direction of the optical axis $C_1$.

The reflecting surfaces 37 are located between the ridge line portion 321 and the emitting surface 33 in the direction of the optical axis $C_1$.

The reflecting surfaces 37 have, for example, a parabolic shape in a Z-X cross section. The reflecting surfaces 37 have a shape such that they separate from the optical axis $C_1$ in the +Z axis direction. The optical axis $C_1$ is an optical axis of the emitting surface 33.

The reflecting surfaces 36 and 37 may be mirror surfaces obtained by mirror deposition. However, the reflecting surfaces 36 and 37 desirably function as total reflection surfaces, without mirror deposition. This is because total reflection surfaces are higher in reflectance than mirror surfaces, contributing improvement in light use efficiency. Further, elimination of the step of mirror deposition can simplify the manufacturing process of the light guide projection optical element 301, contributing reduction in the manufacturing cost of the light guide projection optical element 301.

The emitting surfaces 38 are surfaces through which light reflected by the reflecting surfaces 37 is emitted from the light guide projection optical element 301. The emitting surfaces 38 have, for example, a planar shape parallel to an X-Y plane.

End portions on the optical axis $C_1$ sides of the emitting surfaces 38 are connected to the side surfaces 395. End portions on sides opposite to the optical axis $C_1$ sides of the emitting surfaces 38 are connected to ends on the +Z axis sides of the reflecting surfaces 37.

The emitting surface $38_a$ is an emitting surface formed in the side surface on the −X axis side of the light guide projection optical element 301. An end portion on the +X axis side of the emitting surface $38_a$ is connected to the side surface $395_a$ on the −X axis side. An end portion on the −X axis side of the emitting surface $38_a$ is connected to an end on the +Z axis side of the reflecting surface $37_a$.

The emitting surface $38_b$ is an emitting surface formed in the side surface on the +X axis side of the light guide projection optical element 301. An end portion on the −X axis side of the emitting surface $38_b$ is connected to the side surface $395_b$ on the −X axis side. An end portion on the +X axis side of the emitting surface $38_b$ is connected to an end on the +Z axis side of the reflecting surface $37_b$.

<Behavior of Light Rays>

The behavior of light rays reflected by the reflecting surface 32 of the light guide projection optical element 301 is the same as that of the light guide projection optical element 3 in the first embodiment. Thus, the description of the light guide projection optical element 3 in the first embodiment applies thereto. Here, the behavior of light rays that are not reflected by the reflecting surface 32 of the light guide projection optical element 301 will be described.

As illustrated in FIGS. 20A and 20B, light concentrated by the condensing optical element 2 is incident on the incident surface 31 of the light guide optical element 301. For example, in FIGS. 20A and 20B, the incident surface 31 is a refractive surface. The light incident on the incident surface 31 is refracted at the incident surface 31. In the fourth embodiment, the incident surface 31 has a planar shape.

Part of light that enters through the incident surface 31 and is not reflected by the reflecting surface 32 reaches the reflecting surfaces 36. Part of light passing through the +Z axis direction side of an end portion (the ridge line portion 321) on the +Z axis side of the reflecting surface 32 reaches the reflecting surfaces 36.

The reflecting surfaces 36 reflect light guided to the reflecting surfaces 36 toward the side surfaces 395 of the light guide projection optical element 301. The reflecting surface $36_a$ reflects light toward the side surface $395_a$ on the −X axis side. The reflecting surface $36_b$ reflects light toward the side surface $395_b$ on the +X axis side. The reflecting surfaces 36 divide the incident light into two with the ridge line 361 as a center.

The light reflected by the reflecting surfaces 36 reaches the reflecting surfaces 37. The light reflected by the reflecting surface $36_a$ reaches the reflecting surface $37_a$. The light reflected by the reflecting surface $36_b$ reaches the reflecting surface $37_b$.

Light rays reflected by the reflecting surfaces 37 travel in the forward direction (+Z axis direction). Light reflected by the reflecting surfaces 37 is emitted from the emitting surfaces 38 ahead of the vehicle (in the +Z axis direction).

Light reflected by the reflecting surface $37_a$ reaches the emitting surface $38_a$. The light reaching the emitting surface $38_a$ is emitted from the emitting surface $38_a$ ahead of the vehicle (in the +Z axis direction). Light reflected by the reflecting surface $37_b$ reaches the emitting surface $38_b$. The light reaching the emitting surface $38_b$ is emitted from the emitting surface $38_b$ ahead of the vehicle (in the +Z axis direction).

As illustrated in FIG. 20B, the light rays are controlled by the reflecting surfaces 37 to have a desired divergence angle. Here, "desired divergence angle" refers to a divergence angle for forming an appropriate light distribution pattern on the irradiated surface 9. "Appropriate" refers to, for example, a light distribution pattern specified in road traffic rules or the like.

FIGS. 23A and 23B are explanatory diagrams for explaining the control of the divergence angle by the reflecting surfaces 37. As illustrated in FIGS. 23A and 23B, the divergence angle of the light rays can be arbitrarily controlled by changing the curvatures of the reflecting surfaces 37.

FIG. 23A illustrates an example in which the divergence angles are 0 degrees. That is, FIG. 23A illustrates an example in which the light is substantially collimated.

FIG. 23B illustrates an example in which the divergence angles are not 0 degrees. In FIG. 23B, the light rays reflected by the reflecting surfaces 37 concentrate after emitted from the emitting surfaces 38. After that, the concentrated light diverges.

In FIGS. 20B, 23A, and 23B, the reflecting surfaces 37 have curved surface shapes. However, the reflecting surfaces 37 may have planar shapes. The reflecting surfaces 37 may also have polygonal shapes as viewed from the Y axis direction.

As illustrated in FIG. 20A, for example, it is possible to cause the light emitted from the emitting surfaces 38 to irradiate an area on the upper side (+Y axis side) of the cutoff line 91 on the irradiated surface 9. Thus, it is possible to irradiate an area on the upper side of the cutoff line 91 with weak light.

In a light distribution pattern specified in road traffic rules or the like, it is required to form a light distribution for overhead signs. The "light distribution for overhead signs" irradiates an area on the upper side of the cutoff line with weak light to improve visibility of overhead signs at night.

The headlight module 160 according to the fourth embodiment can, for example, easily form a light distribution for overhead signs.

In the above description, the emitting surfaces 38 have planar shapes parallel to an X-Y plane. However, this is not mandatory.

The optical element 301 includes the reflecting surfaces 36 and reflecting surfaces 37. The reflecting surfaces 36 reflect light that is emitted from the light source 1 and passes through the emitting surface 33 side of the edge portion 321. The reflecting surfaces 37 are located between the reflecting surface 32 and the emitting surface 33, and reflect the light reflected by the reflecting surfaces 36.

In the fourth embodiment, as an example, the optical element 301 is described as the light guide projection optical element 301. Further, as an example, the edge portion 321 is described as the ridge line portion 321.

The optical element 301 includes the emitting surfaces 38 for emitting light reflected by the reflecting surfaces 37. The emitting surfaces 38 have refractive power.

<First Modification Example>

Figure 24:
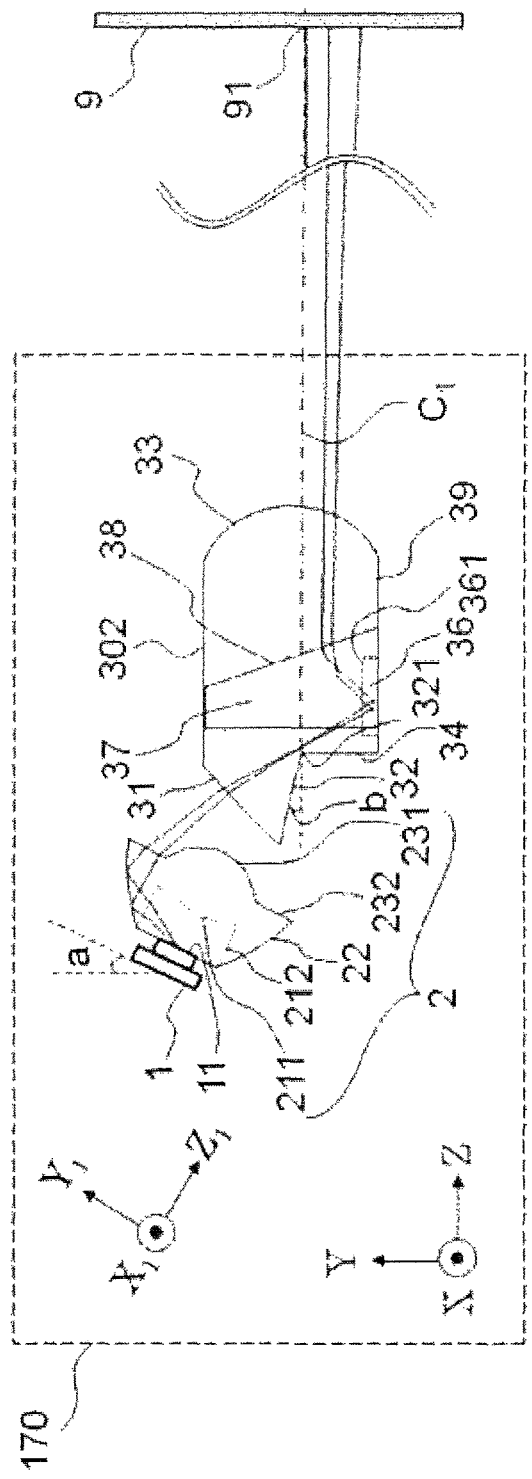
FIG. 24 is a configuration diagram illustrating a configuration of the headlight module 160 according to the fourth embodiment.

FIG. 24 is a configuration diagram illustrating a configuration of a headlight module 170. As illustrated in FIG. 24, for example, light emitted from the emitting surfaces 38 can irradiate an area on the lower side of the cutoff line 91 on the irradiated surface 9. Thus, it is possible to increase the amount of light of a light distribution on the lower side of the cutoff line 91.

For example, like a light guide projection optical element 302 illustrated in FIG. 24, the emitting surfaces 38 may have planar shapes inclined counterclockwise with respect to an X-Y plane as viewed from the +X axis direction. With this configuration, when viewed in a Y-Z plane, light rays are refracted at the emitting surfaces 38 in the −Y axis direction. Light emitted from the emitting surfaces 38 make a light distribution on the lower side of the light distribution pattern on the irradiated surface 9.

When the emitting surfaces 38 are inclined counterclockwise with respect to an X-Y plane as viewed from the +X axis direction, light reaches the emitting surfaces 38 from the +Y axis direction side of perpendicular lines of the emitting surfaces 38. According to the law of refraction (Snell's law), emission angles at which light is emitted from the emitting surfaces 38 are greater than incident angles at which the light reaches the emitting surfaces 38. Thus, light is refracted at the emitting surfaces 38 in the −Y axis direction.

Such a function of arbitrarily adjusting the height of the light emitted from the emitting surfaces 38 in the light distribution pattern may be provided by the light guide projection optical element 302 of the headlight module 170 as a whole. Thus, these functions may be shared by optical surfaces of the light guide projection optical element 302. For example, it is possible to arbitrarily control the height of the light distribution pattern by adjusting the inclinations of the reflecting surfaces 37.

The emitting surfaces 38 are inclined with respect to a plane perpendicular to the optical axis $C_1$ of the emitting surface 33.

<Second Modification Example>

Figure 25:
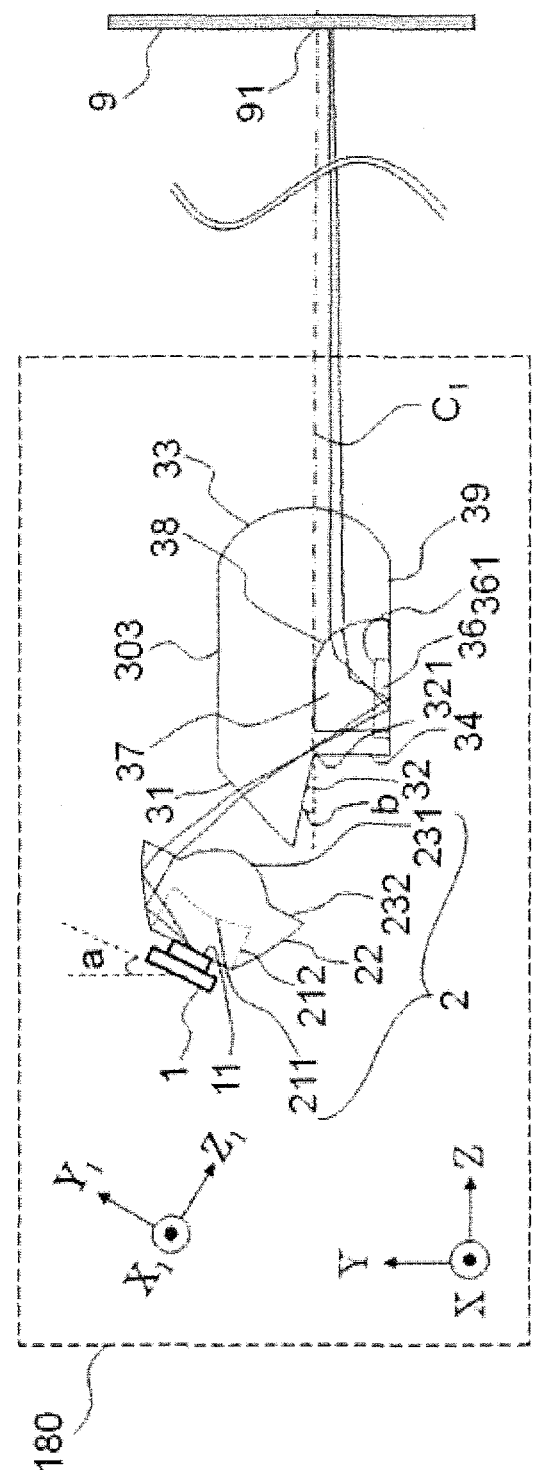
FIG. 25 is a configuration diagram illustrating a configuration of the headlight module 160 according to the fourth embodiment.

FIG. 25 is a configuration diagram illustrating a configuration of a headlight module 180. In the above description, the emitting surfaces 38 have planar shapes. However, like a light guide projection optical element 303 illustrated in FIG. 24, the emitting surfaces 38 may have curved surface shapes. For example, in FIG. 25, the emitting surfaces 38 have convex shapes in the +Z axis direction as viewed from the +X axis direction. The emitting surfaces 38 may be curved surfaces as illustrated in FIG. 25.

In FIG. 25, for example, the emitting surfaces 38 have cylindrical surface shapes having positive power only in the Y axis direction. In the headlight module 180 illustrated in FIG. 25, the emitting surfaces 38 have positive power in the Y axis direction.

FIG. 25 illustrates an example in which the height of the light distribution in the vertical direction (Y axis direction) on the irradiated surface 9 is small. "Height of the light distribution" refers to the length of the light distribution pattern in the vertical direction (Y axis direction) on the irradiated surface 9. "Height of the light distribution" is also referred to as the "thickness of the light distribution." In the headlight module 180 illustrated in FIG. 25, the height of the light distribution on the irradiated surface 9 is reduced.

The emitting surfaces 38 may also have cylindrical surface shapes having positive power only in the X axis direction.

When the emitting surfaces 38 have positive power, light emitted from the emitting surfaces 38 concentrates at an arbitrary position in front of the vehicle. When the light concentration position is located near the emitting surfaces 38, the light diverges in front (on the +Z axis side) of the vehicle after the light concentration position. Thus, the width or height of the light distribution can be made large. On the other hand, when the light concentration position is located near the irradiated surface 9, the light concentrates near the irradiated surface 9. Thus, the width or height of the light distribution can be made small. When the light concentration position is located away from the emitting surfaces 38, the width or height of the light distribution can be made small as compared to when the light concentration position is located near the emitting surfaces 38.

Contrary to the example illustrated in FIG. 25, the emitting surfaces 38 may have cylindrical surface shapes having negative power only in the Y axis direction. The headlight module 180 may have negative power in the Y axis direction at the emitting surfaces 38. Thereby, the headlight module 180 can increase the height of the light distribution on the irradiated surface 9.

Similarly, the emitting surfaces 38 may also have cylindrical surface shapes having negative power only in the X axis direction. Thereby, the headlight module 180 can increase the width of the light distribution on the irradiated surface 9. "Width of the light distribution" refers to the length in the horizontal direction (X axis direction) of the light distribution pattern on the irradiated surface 9.

As such, in the headlight module 180 illustrated in FIG. 25, the height of the light distribution in the vertical direction (Y axis direction) of light emitted from the emitting surfaces 38 is controlled. In the headlight module 180, by forming the emitting surfaces 38 into curved surface shapes, the height of the light distribution pattern in the vertical direction (Y axis direction) on the irradiated surface 9 is arbitrarily controlled.

Further, in the headlight module 180, the width of the light distribution pattern in the horizontal direction (X axis direction) on the irradiated surface 9 can be arbitrarily controlled.

Such a function of arbitrarily adjusting the width or height of the light distribution pattern of the light emitted from the emitting surfaces 38 may be provided by the light guide projection optical element 303 of the headlight module 180 as a whole. These functions may be shared by optical surfaces of the light guide projection optical element 303.

For example, the width and height of the light distribution pattern can be arbitrarily controlled by adjusting the curvatures of the reflecting surfaces 37. However, the light distribution can be easily and correctly controlled by forming the emitting surfaces 38 into curved surface shapes.

The light guide projection optical elements 301, 302, and 303 can reduce the loss light LO to improve the light use efficiency with a small and simple structure. In the light guide projection optical element 302, the light distribution pattern can be arbitrarily controlled by adjusting the inclinations of the reflecting surfaces 37 and 38. In the light guide projection optical element 303, the light distribution pattern can be arbitrarily controlled by adjusting the curvatures of the emitting surfaces 36 and 37.

Fifth Embodiment

FIGS. 26A and 26B are configuration diagrams illustrating a configuration of a headlight module 190 according to a fifth embodiment of the present invention. Elements that are the same as in FIGS. 1A and 1B will be given the same reference characters, and descriptions thereof will be omitted. An element that is the same as in FIGS. 1A and 1B is the light source 1.

As illustrated in FIGS. 26A and 26B, the headlight module 190 according to the fifth embodiment includes the light source 1 and a light guide projection optical element 304. The headlight module 190 according to the fifth embodiment is different in that the condensing optical element 2 and light guide projection optical element 3 of the headlight module 100 according to the first embodiment are integrated.

Elements that are the same as those of the light guide projection optical element 3 will be given the same reference characters, and descriptions thereof will be omitted. The elements that are the same as those of the light guide projection optical element 3 are the incident surface 34, reflecting surface 32, and emitting surface 33. Like the incident surface 31, an incident surface 311 has positive power. However, the incident surface 311 is different from that of the first embodiment in that it is formed in a partial region of the incident surface 31.

In general, the greater the number of optical components, the lower the light use efficiency. In the case of refractive material, a major factor thereof is loss due to Fresnel reflection. "Fresnel reflection" refers to a reflection phenomenon that occurs at an interface between media having different refractive indexes. As the number of optical components increases, the number of interfaces between air and refractive material increases, and thus loss due to Fresnel reflection increases. As a result, the light use efficiency decreases.

The headlight module 190 according to the fifth embodiment solves such a problem. The headlight module 190 provides a small and simple headlight module having high light use efficiency.

The light guide projection optical element 304 has a shape obtained by integrating the condensing optical element 2 and light guide projection optical element 3 of the headlight module 100 according to the first embodiment without a gap therebetween. "Gap" refers to a space between two objects.

The light guide projection optical element 304 includes the incident surface 311, an incident surface 312, a reflecting surface 313, the reflecting surface 32, and the emitting surface 33. The incident surfaces 311 and 312 and reflecting surface 313 will be referred to as the condensing optical portion 350.

The inside of the light guide projection optical element 304 described in the fifth embodiment is filled with refractive material, for example.

To facilitate explanation of the light source 1 and condensing optical portion 350, $X_1Y_1Z_1$-coordinates will be used. The $X_1Y_1Z_1$-coordinates are coordinates obtained by inclining the XYZ-coordinates clockwise about the X axis by an angle a as viewed from the +X axis direction.

In the fifth embodiment, the optical axis $C_2$ of the condensing optical portion 350 is parallel to the $Z_1$ axis. The optical axis $C_2$ of the condensing optical portion 350 also coincides with the optical axis of the light source 1.

The incident surface 311 corresponds to the incident surface 211 of the condensing optical element 2. The incident surface 311 has the same function as the incident surface 211 of the condensing optical element 2 of the headlight module 100 according to the first embodiment.

The incident surface 311 can be considered as the incident surface 211. The description of the incident surface 211 in the description of the condensing optical element 2 in the first embodiment is used in place of the description of the incident surface 311. The description of the incident surface 211 in the first embodiment is used in place of the description of the incident surface 311.

However, since the fifth embodiment does not include the emitting surfaces 231 and 232, the description about the relationship with the emitting surfaces 231 and 232 is not used.

The optical properties of the incident surface 311 may be different from the optical properties of the incident surface 211 of the condensing optical element 2.

The incident surface 311 is an incident surface formed at a central part of the condensing optical portion 350. "Central part of the condensing optical portion 350" indicates that the optical axis $C_2$ of the condensing optical portion 350 has an intersection on the incident surface 311.

The incident surface 311 has, for example, positive power. The incident surface 311 has a convex shape. The power is also referred to as the refractive power.

As described above, the headlight module 190 according to the fifth embodiment is different in that the condensing optical element 2 and light guide projection optical element 3 of the headlight module 100 according to the first embodiment are formed integrally. Thus, compared with the condensing optical element 2 of the headlight module 100 according to the first embodiment, the light guide projection optical element 304 includes no surface corresponding to the emitting surface 231 of the condensing optical element 2.

However, the function of the emitting surface 231 may be added to the incident surface 311 of the light guide projection optical element 304. This may be achieved by increasing the power of the incident surface 311. Thereby, the function of the condensing optical element 2 of the headlight module 100 according to the first embodiment can be achieved by the incident surfaces 311 and 312 and reflecting surface 313.

The incident surface 312 corresponds to the incident surface 212 of the condensing optical element 2. The incident surface 312 has the same function as the incident surface 212 of the condensing optical element 2 of the headlight module 100 according to the first embodiment.

The incident surface 312 can be considered as the incident surface 212. The description of the incident surface 212 in the description of the condensing optical element 2 in the first embodiment is used in place of the description of the incident surface 312. The description of the incident surface 212 in the first embodiment is used in place of the description of the incident surface 312.

The optical properties of the incident surface 312 may be different from the optical properties of the incident surface 212 of the condensing optical element 2.

The incident surface 312 has, for example, a shape that is a part of the surface shape of a solid of revolution obtained by rotating an ellipse about its major or minor axis. A solid of revolution obtained by rotating an ellipse about its major or minor axis is referred to as a "spheroid." The rotational axis of the spheroid coincides with the optical axis $C_2$.

The incident surface 312 has a surface shape obtained by cutting off both ends of the spheroid in the direction of the rotational axis. Thus, the incident surface 312 has a tubular shape.

One end (end on the $+Z_1$ axis direction side) of the tubular shape of the incident surface 312 is connected to the outer periphery of the incident surface 311. The tubular shape of the incident surface 312 is formed on the light source 1 side ($-Z_1$ axis side) of the incident surface 311.

The reflecting surface 313 corresponds to the reflecting surface 22 of the condensing optical element 2. The reflecting surface 313 has the same function as the reflecting surface 22 of the condensing optical element 2 of the headlight module 100 according to the first embodiment.

The reflecting surface 313 can be considered as the reflecting surface 22. The description of the reflecting surface 22 in the description of the condensing optical element 2 in the first embodiment is used in place of the description of the reflecting surface 313. The description of the reflecting surface 22 in the first embodiment is used in place of the description of the reflecting surface 313.

The optical properties of the reflecting surface 313 may be different from the optical properties of the reflecting surface 22 of the condensing optical element 2.

The reflecting surface 313 has a tubular shape whose cross-sectional shape in an $X_1$-$Y_1$ plane is, for example, a circular shape centered on the optical axis $C_2$. In the tubular shape of the reflecting surface 313, the diameter of the circular shape in the $X_1$-$Y_1$ plane at the end on the $-Z_1$ axis direction side is smaller than the diameter of the circular shape in the $X_1$-$Y_1$ plane at the end on the $+Z_1$ axis direction side. The diameter of the reflecting surface 313 increases in the $+Z_1$ axis direction.

The reflecting surface 313 has, for example, the shape of the side surface of a circular truncated cone. The shape of the side surface of the circular truncated cone in a plane including the central axis is a linear shape. However, the shape of the reflecting surface 313 in a plane including the optical axis $C_2$ may be a curved line shape.

One end (end on the $-Z_1$ axis direction side) of the tubular shape of the reflecting surface 313 is connected to the other end (end on the $-Z_1$ axis direction side) of the tubular shape of the incident surface 312. The reflecting surface 313 is located on the outer peripheral side of the incident surface 312.

The incident surfaces 311 and 312 receive light emitted from the light source 1. The reflecting surface 313 reflects light entering through the incident surface 312.

The reflecting surface 32 reflects light concentrated by the incident surface 311, 312, or reflecting surface 313. The reflecting surface 32 has the same function as the reflecting surface 32 of the light guide projection optical element 3 of the headlight module 100 according to the first embodiment. Thus, the reflecting surface 32 of the fifth embodiment can be considered as the reflecting surface 32 of the first embodiment.

The description of the reflecting surface 32 of the light guide projection optical element 3 in the first embodiment is used in place of the description of the reflecting surface 32 of the fifth embodiment. However, the optical properties of the reflecting surface 32 of the fifth embodiment may be different from the optical properties of the reflecting surface 32 of the light guide projection optical element 3.

The emitting surface 33 projects light ahead of the vehicle. The emitting surface 33 of the fifth embodiment has the same function as the emitting surface 33 of the light guide projection optical element 3 of the headlight module 100 according to the first embodiment. Thus, the emitting surface 33 of the fifth embodiment can be considered as the emitting surface 33 of the first embodiment.

Thus, the description of the emitting surface 33 of the light guide projection optical element 3 in the first embodiment is used in place of the description of the emitting surface 33 of the fifth embodiment. However, the optical properties of the emitting surface 33 of the fifth embodiment may be different from the optical properties of the emitting surface 33 of the light guide projection optical element 3.

As described above, the headlight module 190 according to the fifth embodiment can achieve the functions of the condensing optical element 2 and light guide projection optical element 3 of the headlight module 100 according to the first embodiment only by the light guide projection optical element 304. This reduces the loss due to Fresnel reflection, which increases with increase in the number of optical components. Then, it is possible to provide a small headlight module having high light use efficiency.

The optical element 304 includes the incident portion 350 for receiving light emitted from the light source 1. The incident portion 350 includes the refractive surfaces 311 and 312 having refractive power.

In the fifth embodiment, as an example, the optical element 304 is described as the light guide projection optical element 304. As an example, the incident portion 350 is described as the condensing optical portion 350. As an example, the refractive surfaces 311 and 312 are described as the incident surfaces 311 and 312.

The incident portion 350 includes the reflecting surface 313.

The reflecting surface 313 is a total reflection surface.

Sixth Embodiment

In a sixth embodiment, a headlight device 10 using the headlight module 100, 110, 120, 130, 140, 150, 160, 170, 180, or 190 described in the first to fifth embodiments will be described.

In the first to fifth embodiments, the embodiments of the headlight modules 100, 110, 120, 130, 140, 150, 160, 170, 180, and 190 are described. FIG. 27 is a configuration diagram illustrating a configuration of the headlight device 10 including the headlight module 100, 110, 120, 130, 140, 150, 160, 170, 180, or 190.

FIG. 27 illustrates an example having the headlight modules 100. All or a subset of the headlight modules 100 may be replaced with the headlight module 100, 110, 120, 130, 140, 150, 160, 170, 180, or 190.

<Configuration of Headlight Device 10>

The headlight device 10 includes a housing 97. The headlight device 10 may also include a cover 96.

The headlight modules 100 are housed inside the housing 97. In FIG. 27, as an example, the three headlight modules 100 are housed. The number of headlight modules 100 is not limited to three. The number of headlight modules 100 may be one or three or more.

In FIG. 27, the headlight modules 100 are housed inside the box-shaped housing 97. However, the housing 97 need not have a box shape. In the case of a four-wheeled automobile or the like in particular, the housing 97 may consist of a frame or the like and have a configuration in which the headlight modules 100 are fixed to the frame. This is because in the case of a four-wheeled automobile or the like, the housing 97 is disposed inside the vehicle body. The frame or the like may be a part constituting the vehicle body. In this case, the housing 97 is a housing part that is a part constituting the vehicle body.

The headlight modules 100 are arranged in the X axis direction inside the housing 97. Arrangement of the headlight modules 100 is not limited to the arrangement in the X axis direction. In view of the design, function, or the like, the headlight modules 100 may be displaced from each other in the Y or Z axis direction.

In the case of a motorcycle, the housing 97 is disposed near the handlebar. In the case of a four-wheeled automobile, the housing 97 is disposed inside the vehicle body.

The cover 96 is made of transparent material. The cover 96 is disposed at a surface part of the vehicle body and exposed on the outside of the vehicle body. The cover 96 is disposed on the +Z axis side of the housing 97.

The cover 96 is provided to protect the headlight modules 100 from weather, dust, or the like. However, if the emitting surfaces 33 of the light guide projection optical elements 3 are configured to protect the components inside the headlight modules 100 from weather, dust, or the like, there is no need to provide the cover 96.

Light emitted from a headlight module 100 passes through the cover 96 and is emitted in front of the vehicle. In FIG. 27, the light emitted from the cover 96 is superposed with light emitted from the adjacent headlight modules 100 to form a single light distribution pattern.

As described above, when the headlight device 10 has multiple headlight modules 100, it is an assembly of the headlight modules 100. When the headlight device 10 has a single headlight module 100, it is equal to the headlight module 100. That is, the headlight module 100 is the headlight device 10.

The above-described embodiments use terms, such as "parallel" or "perpendicular", indicating the positional relationships between parts or the shapes of parts. These terms are intended to include ranges taking account of manufacturing tolerances, assembly variations, or the like. Thus, recitations in the claims indicating the positional relationships between parts or the shapes of parts are intended to include ranges taking account of manufacturing tolerances, assembly variations, or the like.

Further, although the embodiments of the present invention are described as above, the present invention is not limited to these embodiments.

REFERENCE SIGNS LIST 10 headlight device, 100, 110, 120, 130, 140, 150, 160, 170 headlight module, 1, $1_a$, $1_b$, $1_c$, 4 light source, 11, 41 light emitting surface, 15, $15_a$, $15_b$, $15_c$ light source module, 2, 5 condensing optical element, 20 condensing lens, 211, 212, 511, 512 incident surface, 22, 52 reflecting surface, 231, 232, 531, 532 emitting surface, $232_a$, $232_b$ region, 3, 30, 300, 301, 302 light guide projection optical element, 31, 34, 311, 312 incident surface, 32, 35, 36, 37, $37_a$, $37_b$, 313, 320 reflecting surface, 321, $321_a$, $321_b$, 361 ridge line portion, 33, 38, $38_a$, $38_b$, 330 emitting surface, 39 bottom surface, 350 condensing optical portion, 6 control circuit, 65 vehicle body tilt sensor, 7 rotation mechanism, 71 stepping motor, 72, 73 gear, 74 shaft, 9 irradiated surface, 91 cutoff line, 94 motorcycle, 95 wheel, $95_a$ position at which it makes contact with the ground, 96 cover, 97 housing, 101 line, 102 center line, 103, 104, 106 light distribution pattern, 105 corner area, a, b, c, d, e angle, $C_1$, $C_2$, $C_3$ optical axis, k inclination angle, $m_1$, $m_2$, $m_3$, $m_4$ perpendicular line, PH light concentration position, PC conjugate plane, $S_1$, $S_3$, $S_4$, $S_6$ incident angle, $S_2$, $S_5$, reflection angle, $S_{out}$, $S_{out1}$, $S_{out2}$ emission angle, H-H, V-V line, Q point.

The invention claimed is:

1. A headlight module comprising:
a first light source for emitting first light;
a condensing optical element for concentrating the first light emitted from the first light source; and
an optical element including a first incident surface for receiving the concentrated light, a first reflecting surface for reflecting the received first light, and a first emitting surface for emitting the light reflected by the first reflecting surface,
wherein the condensing optical element changes a divergence angle of the first light to form a light distribution pattern,
wherein the reflected light and light that enters the optical element and is not reflected by the first reflecting surface are superposed on a first plane including a point located at a focal position of the first emitting surface in a direction of an optical axis of the first emitting surface and being perpendicular to the optical axis, thereby forming a high luminous intensity region in the light distribution pattern on the first plane, and wherein the first emitting surface has positive refractive power and projects the light distribution pattern formed on the first plane.

2. A vehicle headlight device comprising the headlight module of claim 1.

3. The headlight module of claim 1, wherein the first reflecting surface is inclined so that an optical path in the optical element becomes wider in a direction in which the received first light travels in the optical element.

4. A headlight module comprising:
a first light source for emitting first light;
a condensing optical element for concentrating the first light emitted from the first light source; and
an optical element including a first incident surface for receiving the first light, a first reflecting surface for reflecting the received first light, and a first emitting surface for emitting the light reflected by the first reflecting surface,
wherein the first incident surface changes a divergence angle of the first light to form a light distribution pattern,
wherein the reflected light and light that enters the optical element and is not reflected by the first reflecting surface are superposed on a first plane including a point located at a focal position of the first emitting surface in a direction of an optical axis of the first emitting surface and being perpendicular to the optical axis, thereby forming a high luminous intensity region in the light distribution pattern on the first plane,
wherein the first emitting surface has positive refractive power and projects the light distribution pattern formed on the first plane, and
wherein the concentrated light enters the optical element through the first incident surface.

5. The headlight module of claim 4, wherein when viewed in a second plane that is a plane parallel to the optical axis and perpendicular to the first reflecting surface, the first incident surface has positive refractive power.

6. The headlight module of claim 5, wherein the first incident surface has a first light concentration position in the second plane,
wherein when viewed in a third plane that is a plane parallel to the optical axis and perpendicular to the second plane, the first incident surface has positive refractive power so as to have a second light concentration position, and
wherein in a direction in which the optical element emits light, the second light concentration position is different from the first light concentration position.

7. The headlight module of claim 4, wherein the first light source is a semiconductor light source having directivity.

8. The headlight module of claim 7, wherein a shape of a light emitting surface of the first light source is projected.

9. A vehicle headlight device comprising the headlight module of claim 4.

10. A headlight module comprising:
a first light source for emitting first light; and
an optical element including a first incident surface for receiving the first light, a first reflecting surface for reflecting the received first light, and a first emitting surface for emitting the light reflected by the first reflecting surface,
wherein the first incident surface changes a divergence angle of the first light to form a light distribution pattern,
wherein the reflected light and light that enters the optical element and is not reflected by the first reflecting surface are superposed on a first plane including a point located at a focal position of the first emitting surface in a direction of an optical axis of the first emitting surface and being perpendicular to the optical axis, thereby forming a high luminous intensity region in the light distribution pattern on the first plane,
wherein the first emitting surface has positive refractive power and projects the light distribution pattern formed on the first plane,
wherein when viewed in a second plane that is a plane parallel to the optical axis and perpendicular to the first reflecting surface, the first incident surface has positive refractive power, and
wherein when viewed in a third plane that is a plane parallel to the optical axis and perpendicular to the second plane, the first incident surface has negative refractive power.

11. The headlight module of claim 10, wherein the first light source is a semiconductor light source having directivity.

12. The headlight module of claim 11, wherein a shape of a light emitting surface of the first light source is projected.

13. A vehicle headlight device comprising the headlight module of claim 10.

14. A headlight module comprising:
a first light source for emitting first light; and
an optical element including a first incident surface for receiving the first light, a first reflecting surface for reflecting the received first light, and a first emitting surface for emitting the light reflected by the first reflecting surface,
wherein the first incident surface changes a divergence angle of the first light to form a distribution pattern,
wherein the reflected light and light that enters the optical element and is not reflected by the first reflecting surface are superposed on a first plane including a point located at a focal position of the first emitting surface in a direction of an optical axis of the first emitting surface and being perpendicular to the optical axis, thereby forming a high luminous intensity region in the light distribution pattern on the first plane,
wherein the first emitting surface has positive refractive power and projects the light distribution pattern formed on the first plane, and
wherein the reflected light has undergone no reflection after entering the optical element, except for the reflection by the first reflecting surface.

15. The headlight module of claim 14, wherein the reflected light reaches the first emitting surface without undergoing further reflection.

16. The headlight module of claim 14, wherein the first reflecting surface is a total reflection surface.

17. A vehicle headlight device comprising the headlight module of claim 14.

18. A headlight module comprising:
a first light source for emitting first light and
an optical element including a first incident surface for receiving the first light, a first reflecting surface for reflecting the received first light, and a first emitting surface for emitting the light reflected by the first reflecting surface,
wherein the first incident surface changes a divergence angle of the first light to form a light distribution pattern,
wherein the reflected light and light that enters the optical element and is not reflected by the first reflecting surface are superposed on a first plane including a point located at a focal position of the first emitting surface in a direction of an optical axis of the first emitting surface and being perpendicular to the optical axis, thereby forming a high luminous intensity region in the light distribution pattern on the first plane, and wherein the first emitting surface has positive refractive power and projects the light distribution pattern formed on the first plane, and wherein the first reflecting surface is inclined so that an optical path in the optical element becomes wider in a direction in which the received first light travels in the optical element.

19. The headlight module of claim 18, wherein the first reflecting surface is a total reflection surface.

20. A vehicle headlight device comprising the headlight module of claim 18.

* * * * *